United States Patent [19]

Fujioka et al.

[11] Patent Number: 5,610,720
[45] Date of Patent: Mar. 11, 1997

[54] BOOK DOCUMENT READING DEVICE HAVING A PAGE TURNING CAPABILITY

[75] Inventors: Tetsuya Fujioka, Yokohama; Hiroshi Takahashi, Kawasaki; Kazunori Bannai, Tokyo; Kazushige Taguchi, Warabi; Susumu Shiina, Tokyo, all of Japan

[73] Assignee: Ricoh Company, Ltd., Tokyo, Japan

[21] Appl. No.: 201,458

[22] Filed: Feb. 24, 1994

[30] Foreign Application Priority Data

Feb. 24, 1993 [JP] Japan .................. 5-035820

[51] Int. Cl.⁶ .......... H04N 1/04; G03B 27/32; G03B 27/62
[52] U.S. Cl. .......... 358/296; 358/474; 358/498; 355/25; 355/75
[58] Field of Search .......... 358/296, 474, 358/494, 496–498; 382/312; 355/25, 75, 233–236, 308, 309, 311

[56] References Cited

U.S. PATENT DOCUMENTS

| | | |
|---|---|---|
| 4,080,070 | 3/1978 | Spence-Bate ............. 355/75 |
| 4,208,123 | 6/1980 | Stevenson ............... 355/25 |
| 4,275,423 | 6/1981 | Takahashi et al. ........ 358/474 |
| 4,816,921 | 3/1989 | Akiyama et al. ........ 358/474 X |
| 4,942,482 | 6/1990 | Kakinuma et al. ...... 358/474 |
| 5,325,213 | 6/1994 | Takahashi et al. ...... 358/474 |
| 5,390,033 | 2/1995 | Bannai et al. ........ 358/498 |
| 5,471,277 | 11/1995 | Fujioka et al. ........ 355/25 |

FOREIGN PATENT DOCUMENTS

| | | |
|---|---|---|
| 61-184527 | 8/1986 | Japan . |
| 63-58427 | 3/1988 | Japan .......... G03B 27/62 |
| 5-19563 | 1/1993 | Japan . |
| 6-202246 | 7/1994 | Japan . |

*Primary Examiner*—Eric Frahm
*Attorney, Agent, or Firm*—Oblon, Spivak, McClelland, Maier & Neustadt, P.C.

[57] ABSTRACT

A miniature and reliable device capable of reading a book document while turning the pages thereof. A book document is laid on a document table in a spread position face up. The document table is pressed upward while a scanning unit is restricted in movement in the up-and-down direction. The scanning unit, therefore, receives the surface of the book document pressed upward.

4 Claims, 58 Drawing Sheets

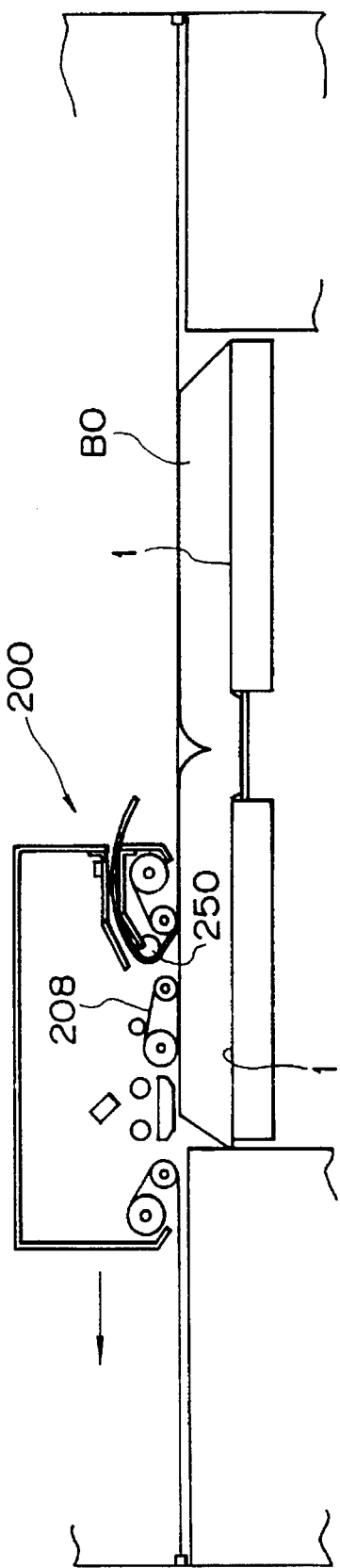
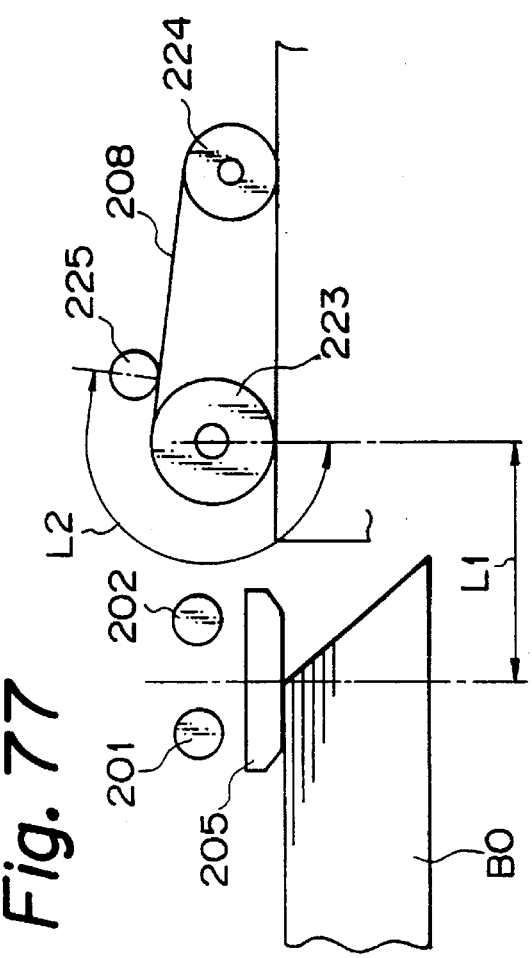

BOOK DOCUMENT READING DEVICE HAVING A PAGE TURNING CAPABILITY

BACKGROUND OF THE INVENTION

The present invention relates to an image reading device installed in a copier, facsimile apparatus or similar image forming apparatus and, more particularly, to a device for reading the images of a book document and having a page turning capability.

An automatic document feeder (ADF) is extensively used with an image forming apparatus of the kind described as an image reading device. The ADF automatically transports a sheet document to a reading position, reads the image of the document, and then discharges the document from the reading device. So far as the document is a sheet document, the ADF can read it automatically. However, regarding a book document, it is extremely difficult to automate the page turning operation of the ADF. The only measure left at the present stage of development is to turn the pages of a book manually. Although various methods and means have, of course, been proposed for reading a book document automatically, most of them are merely conceptual and far from practicality.

In the light of this, Japanese Patent Laid-Open publication (Kokai) 5-19563 corresponding to Japanese Patent Application No. No. 2-193589 discloses a device capable of reading a book document while turning the pages thereof with a page turning and reading unit, or scanning unit as referred to hereinafter. The scanning unit has thereinside page receiving means, page attracting means, page separating means, reading means, etc. Specifically, the scanning unit has a page turning belt extending along the surface of a document table. While a document is laid on the document table in a spread position between the surface of the table and the belt, the scanning unit is moved relative to the document while causing the belt to form a roundabout portion moving away from the table. With this kind of device, it is possible to fully automate the page turning and image reading operation which has heretofore been time and labor consuming and, therefore, to implement a multifunction image reading system remarkably enhancing the productivity of, for example, a copier.

However, in the device described above, the right and left parts of a book spread on the document table are simply laid flat in the same plane. This brings about a problem that when the surfaces of the right and left parts of the spread book are different in height, the scanning surface of the document has a stepped portion and causes the scanning unit to move up and down at such a portion. As a result, both the image reading operation and the page turning operation of the scanning unit are unstable. Therefore, to stabilize such operations, it is preferable that the surfaces of the right and left parts of the spread book be positioned in the same flat plane.

For positioning the surfaces of the right and left parts of the spread book in the same flat plane, Japanese Patent Laid-Open Publication No. 61-184527, for example, teaches a see-saw type document supporting device. This type of device has a single flat glass plate and presses the right and left surfaces of the spread book against the glass plate from below. However, the problem with this device is that the glass plate intervening between the scanning unit and the book prevents the pages of the book from being automatically turned over, although only the spread pages may be read. Moreover, the see-saw type device relies on manual operation in pressing the book against the glass plate, it is difficult to exert an adequate pressure against the document surface stably. For these reasons, this type of device is not feasible for a unit scanning type apparatus intended for a fully automatic image reading and page turning procedure.

The right and left parts of the spread book may be laid on a right and a left document table, respectively, and pressed against the scanning unit from below independently of each other. This approach, however, has a drawback that the right or left part of the document not being read by the scanning unit is not restricted in elevation and, therefore, causes the associated table to rise more than necessary. This causes an inclination or a step to occur on the spread document.

Further, when the spread document is received by the scanning unit, as stated above, the resistance of the scanning unit acting on a unit support section when the unit is pressed increases, reducing the scanning ability. In this case, therefore, it is necessary to support the scanning unit such that the resistance decreases. In addition, in such a condition, the resistance of the scanning unit acting on the document when the unit is pressed increases. This, coupled with the fact that the ability of the scanning unit to follow the undulations of the spread book is lowered, aggravates the fall of scanning ability. Hence, it is also necessary to reduce the resistance of the scanning unit acting on the document.

Another drawback with the previously stated see-saw type document supporting device is that the manual document pressing arrangement increases the overall size of the device and renders the image reading or page turning operation of the scanning unit unstable.

SUMMARY OF THE INVENTION

It is, therefore, an object of the present invention to provide a miniature and reliable book document reading device having a page turning capability which presses a document table loaded with a book document upward and causes a scanning unit, whose movement in the up-and-down direction is restricted, to receive the surface of the document.

It is another object of the present invention to provide a book document reading device having a page turning capability which restricts the up-down movement of one of document tables, where a scanning unit is absent, so as to prevent a document surface existing on that table from rising above the scanning surface of the scanning unit, thereby enhancing the scanning ability of the unit during continuous scanning.

It is another object of the present invention to provide a book document reading device having a page turning capability which allows a scanning unit to move surely and accurately relative to a support section when a document table is pressed.

It is another object of the present invention to provide a book document reading device having a page turning capability which allows a scanning unit to surely scan a document surface while accurately following it when a document table is pressed.

It is another object of the present invention to provide a miniature and reliable book document reading device having a page turning capability which promotes stable image reading and page turning of a scanning unit.

In accordance with the present invention, a device for reading a book document and having a page turning capability comprises a document table for setting the book document in a spread position face up, a scanning unit for reading the image of the book document set on the document table or turning the pages of the book document, and a device for restricting the movement of the scanning unit in the up-and-down direction and pressing the document table upward to thereby cause the scanning unit to receive the surface of the book document which is raised by the document table.

Also, in accordance with the present invention, a device for reading a book document comprises a document table made up of a right and a left table for setting the book document in a spread position face up, an image reading device for reading the surface of the book document laid on the document table, a scanning unit supporting the image reading device such that the image reading device is capable of scanning the surface of the book document, a support mechanism supporting the scanning unit in such a manner as to substantially restrict, in a portion above the document table, the position of the scanning unit in the vertical direction and to allow the unit to freely scan the surface of the book document, biasing members for constantly biasing the right and left tables upward independently to thereby press the surface of the book document against the scanning unit, and a fixing device for selectively fixing, when the scanning unit is moved to read the surface of the book document, the right or left table, where image reading is not under way, in the up-and-down direction.

Further, in accordance with the present invention, a device for reading a book document comprises a document table for setting the book document in a spread position face up, a pressing mechanism for pressing the document table upward, a scanning unit disposed above the document table for scanning the surface of the book document in contact therewith, an image reading device disposed in the scanning unit for reading, when the scanning unit is moved, the image of the surface of the book document by illuminating it, and a support mechanism supporting the scanning unit such that unit is freely movable relative to the surface of the book document. The support mechanism has rail members extending horizontally in parallel to the document table, pressing members respectively positioned at opposite sides of the scanning unit to be movable up and down and rotatable, the pressing members respectively pressing the upper surfaces of the rail members to thereby provide the scanning unit with a tendency to move upward, and positioning members rotatably positioned at opposite sides of the scanning unit and respectively contacting, due to the tendency of the scanning unit, the lower surfaces of the rail members to thereby position the scanning unit in a raised position.

Further, in accordance with the present invention, a device for reading a book document and capable of turning over the pages of the book document comprises a document table for setting the book document in a spread position face up, a scanning unit for reading the image of the book document set on the document table or turning the pages of the book document, and an X-link supporting the document table and having a single stationary shaft and three slidable shafts.

Further, in accordance with the present invention, a device for reading a book document comprises a document table for setting a document in a spread position face up, and an image reading device for reading the image of the surface of the book document by illuminating it. The image reading device is pressed against the surface of the book document at a position where a plurality of rotatable members are arranged in the image reading direction. The image reading device has an illuminating and reading section located between the plurality of rotatable members.

Furthermore, in accordance with the present invention, a device for reading a book document and capable of turning the pages of the book document comprises a document table for setting the book document in a spread position face up, a scanning unit for reading the image of the book document set on the document table or turning the pages of the book document, and a pressing and fixing device comprising a mechanism for selectively pressing the document table upward or fixing it in position. The pressing and fixing device bifunctions as a retracting device for retracting the document table to a lowered position.

Moreover, in accordance with the present invention, a device for reading a book document and capable of turning the pages of the book document comprises a document table for setting the book document in a spread position face up, a scanning unit for reading the image of the book document set on the document table or turning the pages of said book document, and a pressing and fixing device comprising a mechanism for selectively pressing the document table upward or fixing it in position. The pressing and fixing device has a spring constantly biasing the document table upward, a wire for restricting the movement of the document table in the up-and-down direction, a pulley for controlling the movement of the wire, a one-way clutch for causing the pulley and a shaft of the pulley to rotate only in one direction, and a motor for rotating the shaft of the pulley. The motor is selectively energized or deenergized to press the document table upward or fix it in position.

In addition, in accordance with the present invention, a device for reading a book document and capable of turning the pages of the book document comprises a document table for setting the book document in a spread position face up, and a scanning unit for reading the image of the book document set on the document table or turning the pages of the book document. The document table is made up of a right and a left table. The device is selectively operable in a press mode for causing the right and left tables to press the book document upward independently of each other, or in a fix mode for causing them to fix the book document in place without pressing it.

BRIEF DESCRIPTION OF THE DRAWINGS

The above and other objects, features and advantages of the present invention will become more apparent from the following detailed description taken with the accompanying drawings in which:

FIGS. 71–76 are views each showing the scanning unit in a particular condition to occur during page turn mode operation of the unit;

FIG. 77 is a fragmentary view indicative of the reading section of the scanning unit and the timing for charging the turn belt in the page turn mode;

DESCRIPTION OF THE PREFERRED EMBODIMENTS

A preferred embodiment of the book document reading device in accordance with the present invention will be described hereinafter. While the present invention allows an image reading function and a page turning function implemented independently of each other, the illustrative embodiment will be described as incorporating the two functions in a single unit by way of example.

Figure 1:
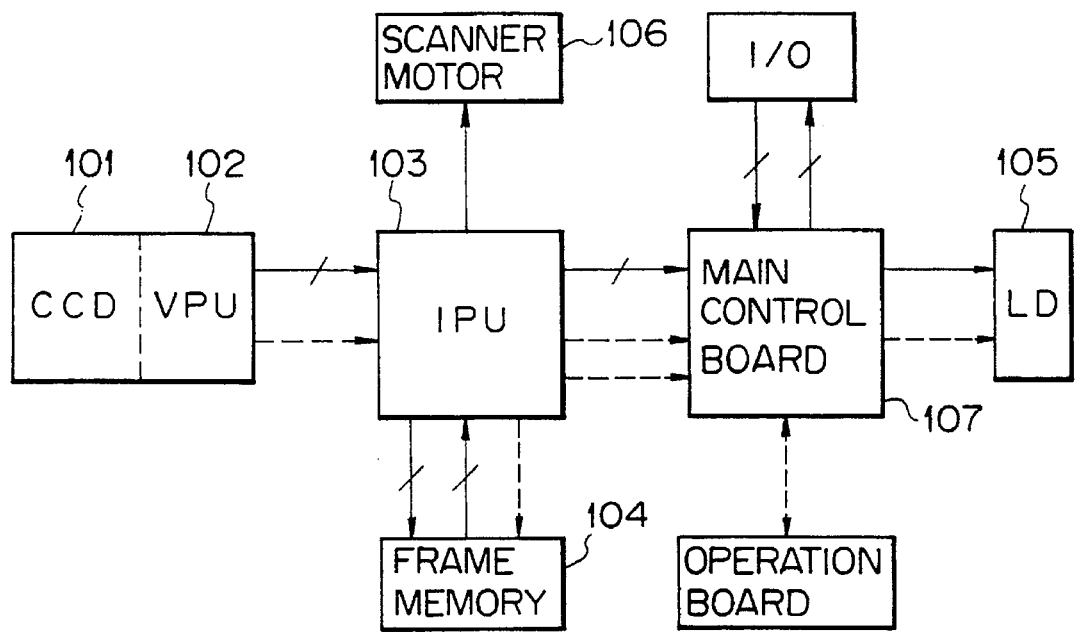
FIG. 1 is a block diagram schematically showing the flow of data to occur in a book document reading device embodying the present invention.

Referring to FIG. 1, there is shown a specific system in which a document reading function embodying the present invention and having a page turning capability (referred to as a TPS (Turn the Page Scanner) hereinafter) reads a book document and outputs the resulting image data to an electrophotographic printer. As shown, the system is generally made up of an image reading or scanning section and an image data processing section which belong to the TPS, and an image forming section. Located at the right end position of a carriage, the scanning section has a CCD (Charge Coupled Device) image sensor 101 and a VPU (Video processing Unit) 102. The VPU 102 generates a signal for driving the image sensor 101, corrects analog output data of the image sensor 101, and then transforms the corrected analog data to a digital signal. Specifically, the VPU 102 outputs image data in the form of dots each having eight dots to an IPU (Image Processing Unit) 103 at a rate of about 7.5 MHz in synchronism with a clock and a horizontal or main scan and a vertical or subscan gate signal. The IPU 103 executes magnification change and other editing and electrophotographic quality enhancement with the input image data. Finally, the IPU 103 executes tonality processing, including gamma correction, so as to output video data having four bits per dot and feasible for writing. The processed video data are written to a frame memory 104.

In the illustrative embodiment, the TPS reads a book document and a sheet document at rates of 90 mm/sec and 120 mm/sec, respectively, while an image is formed at a rate of 180 mm/sec. Hence, use is made of a frame memory 104, capable of accommodating a single page of size A3. Also, the frame memory 104 serves to project a document in a repeat copy mode and implements a broad range of magnification change in the subscanning direction. Further, the frame memory 104 is used in a page sequential mode which causes the right and left pages to be printed independently of each other. Specifically, taking advantage of the adaptability of the IPU 103 to speed, the embodiment locates the frame memory 104 having a four bits per dot configuration after the IPU 103 and writes the processed data therein. This halves the capacity required of the frame memory 104 for the eight dots per read data.

The frame memory 104 of the TPS has a capacity of 128 megabits corresponding to a single page of size A3 in terms of image data of 400 dots per inch (dpi), and it is implemented by a DRAM (Dynamic Random Access Memory). Two dots of image data are input to the frame memory 104 in parallel at a time; data are sequentially input at a rate of about 3.8 MHz. The image data stored in the frame memory 104 are output, two dots at a time, at a rate of about 7.5 MHz in synchronism with a clock and a horizontal and a vertical scan gate signal fed from the IPU 103. The image data from the memory 104 are applied to the IPU 103. The IPU 103 couples data output to the image forming speed of the printer at high speed by the frame memory 104 to serial data of about 15 MHz, further increases the speed in the horizontal scanning direction by using a FIFO (First In First Out) memory, and synchronizes them to a write clock of about 18 MHz. The four bits per dot data are converted to light emission data by pulse width modulation (PWM). The PWM data are sent to an LD (Laser Diode) controller, not shown, in synchronism with the write clock. The LD controller has an LD driver, not shown, and causes it to drive an LD 105. As a result, the LD 105 emits a laser beam to scan a photoconductive element, not shown, thereby forming a latent image thereon.

The IPU 103 controls the movement of a read carriage or scanning unit, not shown, as well. Specifically, the IPU 103 drives a scanner motor, or stepping motor, such that the carriage moves at a constant scanning speed of 120 mm/sec for a sheet document or at a constant scanning speed of 90 mm/sec for a book document, moves at a speed of 180 mm/sec in the event of a return to a home position, or moves at a speed of 120 mm/sec in the event of page turning. A main control board 107 controls an image forming sequence in response to the outputs of sensors joining in image formation and the outputs of motors, solenoids, clutches, etc.

How the embodiment reads an image and processes the resulting signal is as follows. The CCD image sensor 101 is capable of reading about 5,000 pixels at a resolution of 400 dpi and reads one line of reflections from a document in the main scanning direction at the same time. The optical data stored in the image sensor 101 are converted to an electric signal, subjected to clamping or similar waveform correction, amplified, and then subjected to analog-to-digital conversion. The digitized data are fed to the IPU 103 as an 8-bit digital signal. Specifically, the analog data are output from the image sensor 101 over two different lines EVEN and ODD. A switching IC (Integrated Circuit), not shown, is constituted by an analog switch and combines the data on the lines EVEN and ODD to produce a serial analog signal. In a book scan mode, one pixel of the combined signal is transferred at a rate of about 7.5 MHz; in synchronism with this transfer, an analog-to-digital converter (ADC), not shown, converts the analog signal to an 8-bit digital signal having 256 tones. On the other hand, to compensate for changes in the quantity of output light of a fluorescent lamp for exposure, a variable amplifier, not shown, has the amplification thereof controlled on the basis of data read out of a white reference plate.

Figure 2:
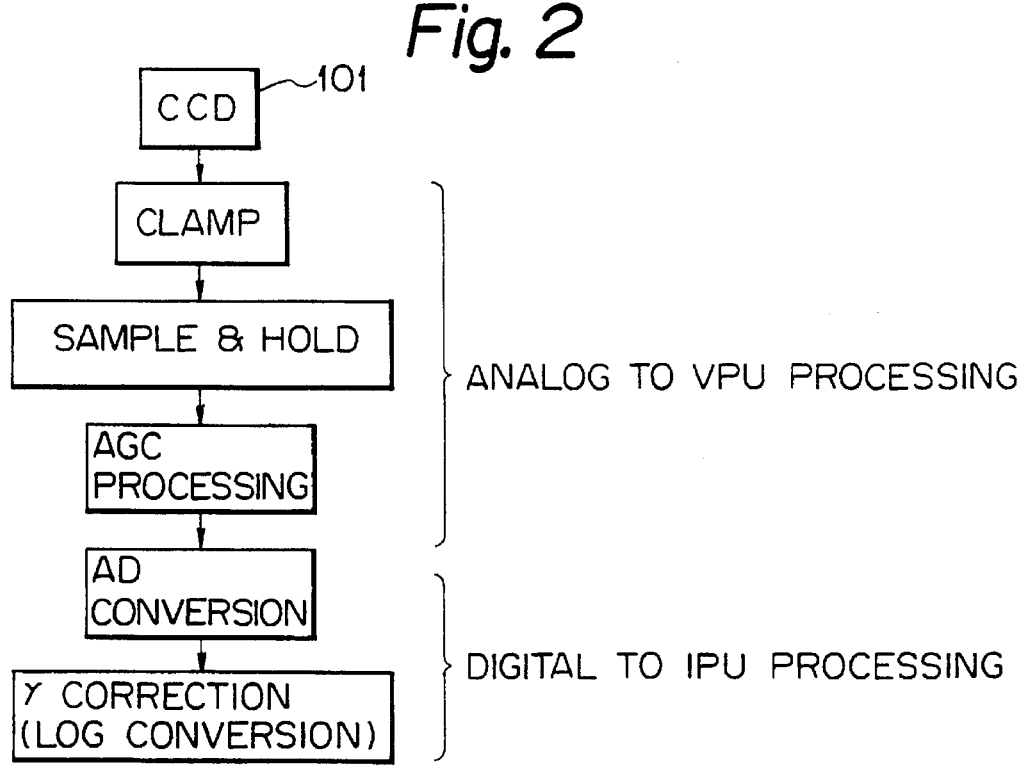
FIG. 2 is a flowchart demonstrating a scanner data processing procedure particular to the embodiment.

FIG. 2 demonstrates the procedure in which the scanning section processes data. As shown, analog data read out by the image sensor 101 and continuous in the main scanning direction are clamped to have the base level of its waveform adjusted. Then, the clamped analog data are sampled and held in synchronism with a pixel clock. This is followed by AGC (Automatic Gain Control) processing which changes the amplification of the data on the basis of the quantity of light for illumination and data level. The data undergone AGC processing is transformed to 8-bit digital data. The read data linear to the reflection density from the document is subjected to logarithmic conversion in order to handle tonality efficiently in matching relation to visual sensitivity. For the logarithmic conversion, use is made of an LUT (Look UP Table) having an input and an output of eight bits per dot.

The pixel-by-pixel digital signal representative of image densities is input to the IPU 103 to be processed thereby. The IPU 103 is made up of a plurality of LSIs (Large Scale Integrated circuits) and performs, in addition to image editing, various kinds of processing for quality enhancement, as follows:

(1) Shading correction: In the embodiment, the scanner is provided with a fluorescent lamp, or linear light source, for illumination. This, coupled with the fact that a lens is used to converge reflections, causes the quantity of light to become maximum at the center of the image sensor 101 and decrease at opposite end portions. Moreover, the CCDs constituting the image sensor 101 are different from each other in respect of sensitivity. In the light of this, the IPU 103 performs, on the basis of pixel-by-pixel data read out of the white reference plate, shading correction with both the reference plate data and the read data, thereby correcting the read data;

(2) MTF (Modulation Transfer Function) correction: In optics including a lens, peripheral pixel information are effected by, for example, the ability of the lens with the result that the corresponding output of the image sensor 101 appears blurred. To obviate this problem, the IPU 103 corrects each pixel data on the basis of the levels of pixels surrounding it, thereby producing a highly reproducible image;

(3) Magnification change in main scanning direction: In the embodiment, an image is read and written at the same resolution of 400 dpi. However, the pixel frequency of the frame memory 104 is about 15 MHz in the event of reading or about 18 MHz in the event of writing. Hence, the IPU 103 converts the frequency. In addition, the IPU 103 changes the magnification in the range of from 50% to 200% in both of the main and subscanning directions. To change the magnification, the IPU 103 performs calculation with surrounding pixel data;

(4) Gamma correction: Regarding an electrophotographic laser printer, since the density reproducing characteristic (gamma characteristic) is not linear, image densities cannot be reproduced faithfully if image data are directly applied to the printer. For faithful image reproduction, the IPU 103 selects a quantity of writing light matching a printing characteristic by referencing a conversion table.

Moreover, the IPU 103 executes other processing including masking, trimming, mirroring, black-and-white reversal or similar image conversion, detection of document size, position and density, and detection of a marker or similar extra image.

The LD 105 transforms the image data sent from the IPU 103 to corresponding optical energy. In the illustrative embodiment, the printer section optically writes an image on a photoconductive element by steering the laser beam with a polygon mirror. Specifically, the laser beam scans the photoconductive element to form an electrostatic latent image thereon. The LD 105 may be modulated by either of a pulse modulation system and a power modulation system which are conventional. The pulse modulation system modulates the exposing time in one dot while the power modulation system modulates the intensity of exposure. The embodiment uses the pulse modulation system. With such a system, the embodiment insures quality images having resolution and tonality.

Figure 3:
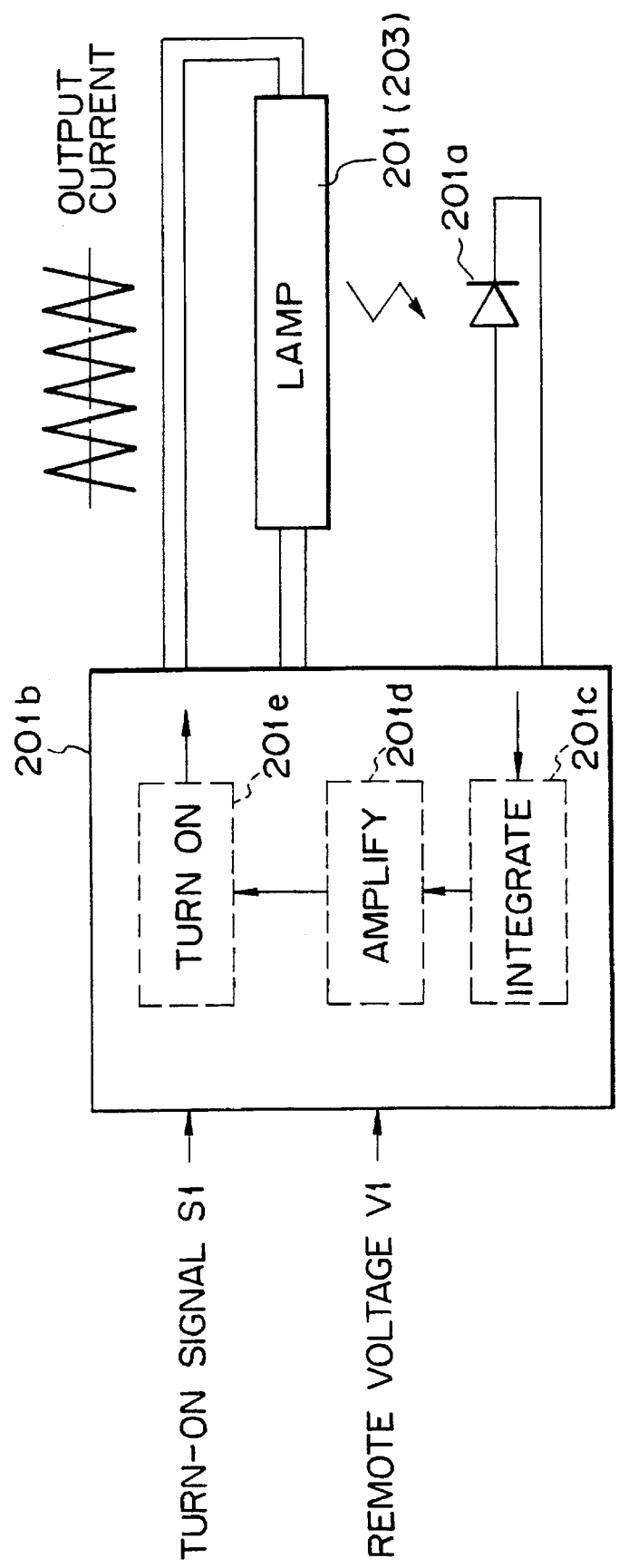
FIG. 3 is a schematic block diagram showing light control circuitry built in a scanning unit included in the embodiment.
Figure 4:
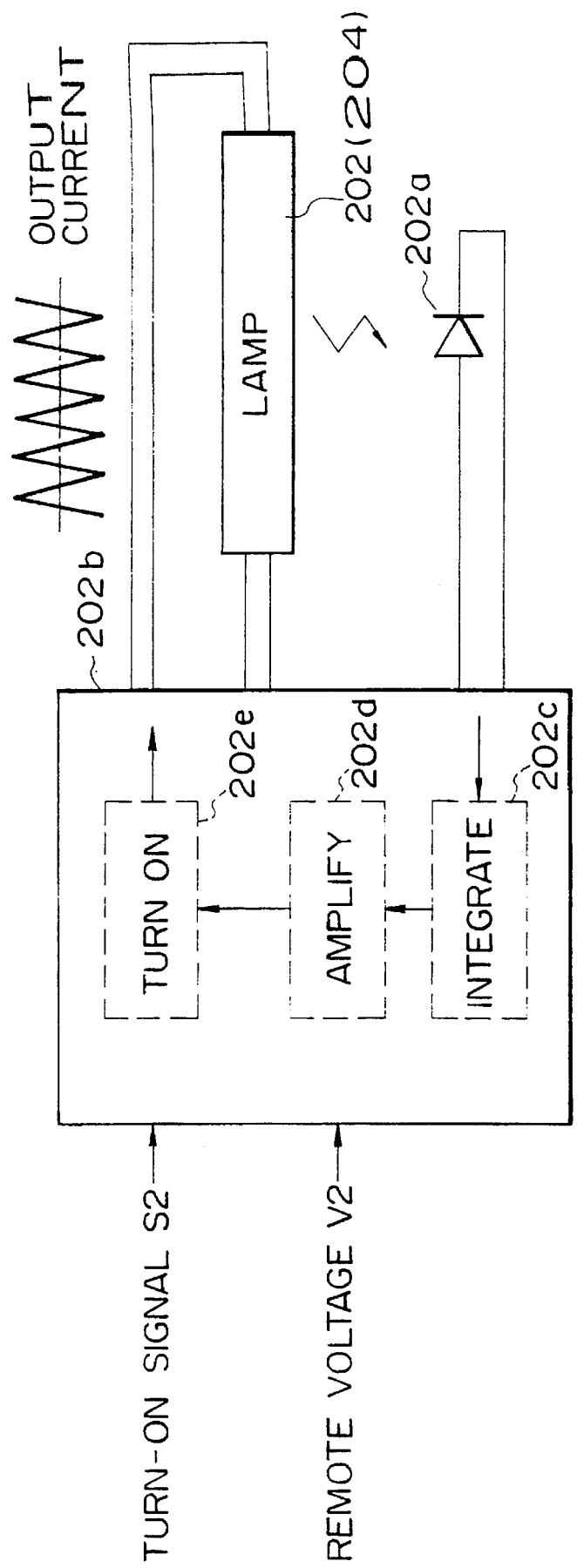
FIG. 4 is a schematic block diagram showing alternative light control circuitry.
Figure 34:
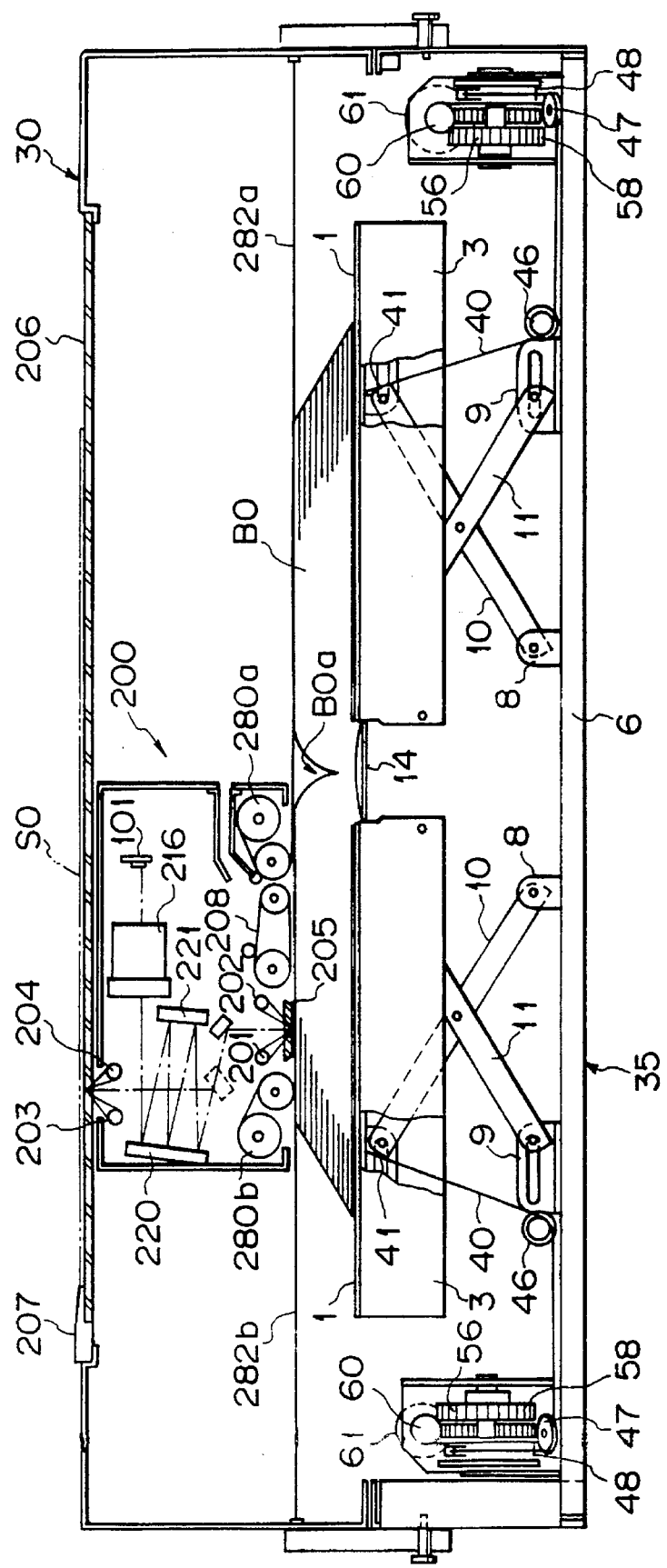
FIG. 34 is a section showing the general construction of the embodiment.

The TPS illuminates a book document, or simply book as referred to hereinafter, with the following arrangement and procedure. FIGS. 3 and 4 show light control circuitry for adjusting the quantity of light to issue from a fluorescent lamp. As shown, the embodiment has two fluorescent lamps 201 and 202 for illuminating a book, and two fluorescent lamps 203 and 204 for illuminating a sheet document. The light circuitry associated with the lamps 201, 202, 203 and 204 are identical; that is, the TPS has four fluorescent lamps and four light control circuits which are controllable independently of each other. As shown in FIG. 34, a scanning unit, or carriage, 200 has a glass platen 205 at a slit position for reading a book; the slit position extends in the direction perpendicular to the scanning direction of the carriage 200. The lamps 201 and 202 assigned to books are fixed in place above and at both sides of the glass platen 205. The lamps 201 and 202 illuminate a book BO from both sides via the glass platen 205. This eliminates, when the book BO is read, irregularities in density attributable to the right/left page as well as shadow attributable to the bound portion BOa of the book BO. As also shown in FIG. 34, the lamps 203 and 204 assigned to sheet documents are located at an upper portion of the carriage 200 and in the vicinity of a slit for reading a sheet document SO; this slit also extends in the direction perpendicular to the scanning direction of the carriage 200. A glass platen 206 is mounted on the top of the TPS. When the sheet document SO is set on the glass platen 206 by a scale 207, the lamps 203 and 204 illuminate it from both sides via the glass platen 206 for the same purpose as described in relation to the lamps 201 and 202.

The light control circuitry shown in FIGS. 3 and 4 respectively have, in addition to the lamps 201 and 202, sensors 201a and 202a responsive to the quantities of light issuing from the lamps 201 and 202, and light control circuits 201b and 202b. Implemented by photodiodes, the sensors 201a and 202a are each positioned at the rear side of the associated lamp 201 or 202 in the illuminating direction and substantially at the center in the scanning direction. The sensors 201a and 202a respectively monitor the quantities of light issuing from the lamps 201 and 202, which change with ambient temperature, so that quantities of light are controlled to a predetermined adequate quantity by feed back control. The control circuits 201b and 202b respectively have integrators 201c and 202c, amplifiers 201d and 202d, and turn-on control circuits 201e and 202e. The integrators 201c and 202c respectively average the quantities of light represented by the outputs of the sensors 201a and 202a. The amplifiers 201d and 202d respectively amplify the resulting outputs of the integrators 201c and 202c. The turn-on control circuits 201e and 202e respectively drive the lamps 201 and 202 on the basis of the differences between the target quantity of light and the actual quantities of light. Use is made of a rippleless light control system which changes the amplitude of a drive current and, therefore, the quantity of light in synchronism with the sampling of the image sensor 101, thereby preventing the density read out of a document from becoming irregular. In the illustrative embodiment, the lamps 101 and 102 are driven at a frequency of 40 kHz while the light adjusting frequency is about 1 kHz.

To set a target light quantity, a microcomputer, not shown, outputs set signals 0–255 in matching relation to a mode. A digital-to-analog converter (DAC), not shown, converts the signals 0–255 to an analog value. Remote voltages V1 and V2 are respectively applied to the remote voltage terminals of the light control circuits 201b and 202b in analog levels. Also, turn-on signals S1 and S2 go high at the beginning of a scanning operation and go low at the end of the same, thereby selectively turning on or turning off the associated lamps 201 and 202. In this way, since the TPS has an independent light control circuit for each lamp, it can turn on and turn off the individual lamps independently and change their light quantities with the turn-on signals S1 and S2 and remote voltage signals V1 and V2.

Figure 10:
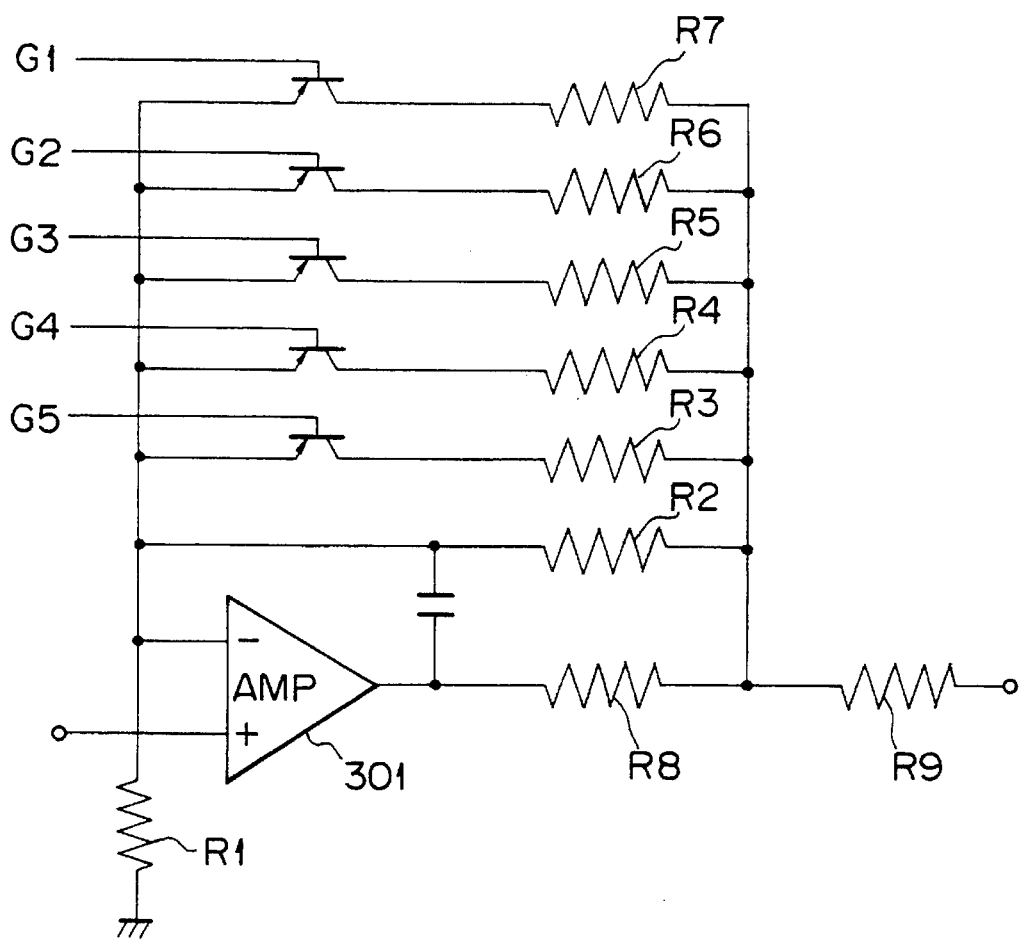
FIG. 10 is a circuit diagram showing a specific circuit included in the embodiment for amplifying scanner data.

The scanning unit 200 scans a sheet document and a book at rates of 120 mm/sec and 90 mm/sec, respectively, as mentioned previously. A charge accumulated in the image sensor 101 is determined by a product of incident optical power and accumulation time. Hence, the light control circuits 201b and 202b correct the difference in light accumulation time attributable to the difference in the linear velocity of the scanning unit 200. Specifically, assuming that an illumination value P is set for a book, a sheet document is scanned by an illumination value of 1.33P. Then, density data derived from a book and density data derived from a sheet document can be dealt with in the same manner. Further, when a circuit shown in FIG. 10 is used to set up a 1.33 times greater gain for a sheet document than for a book, the same light control effect is achievable.

Figure 5:
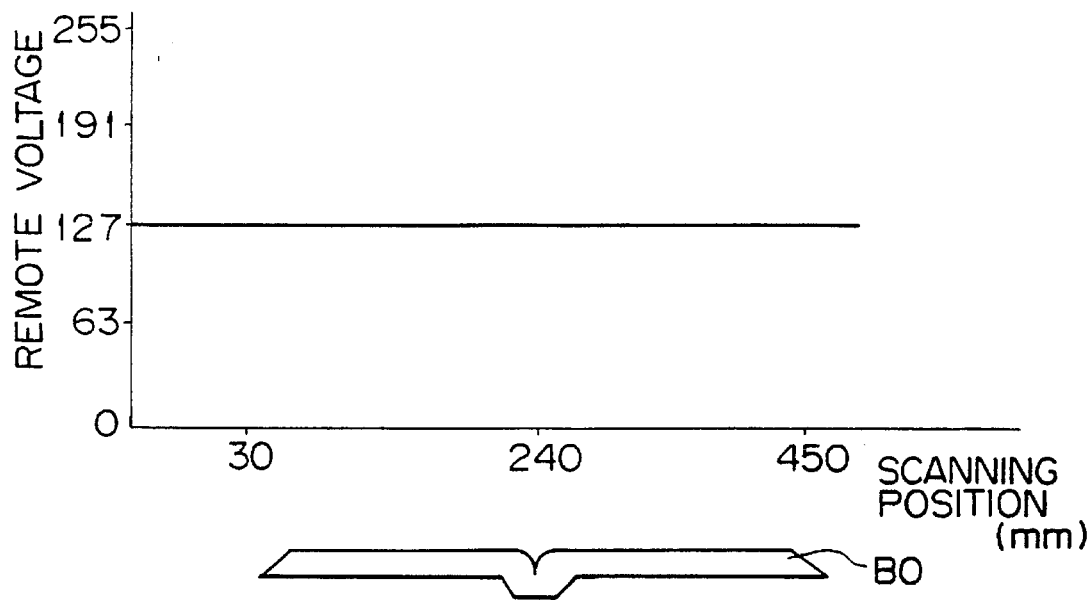
FIGS. 5 and 6 each shows quantities of light for illumination to issue in a particular condition.

Referring to FIGS. 5–9, specific light quantity distributions available with the above-described lamp drive system will be described. To begin with, FIG. 5 shows a case wherein both the lamps 101 and 102 are operated with a constant set light quantity from the beginning to the end of scanning.

Figure 6:
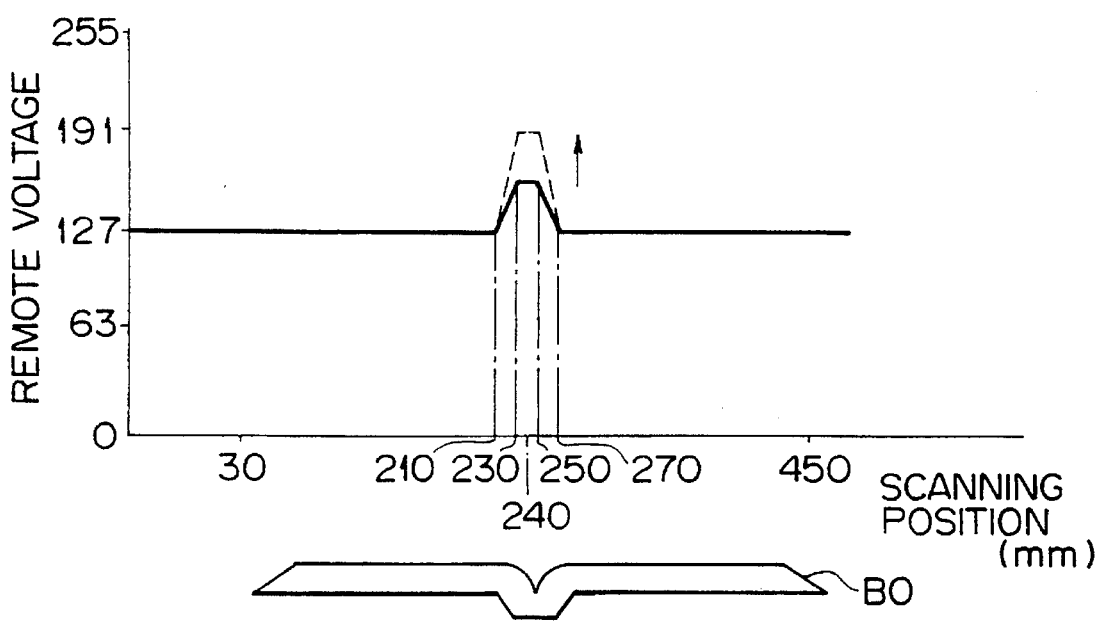
Figure 7:
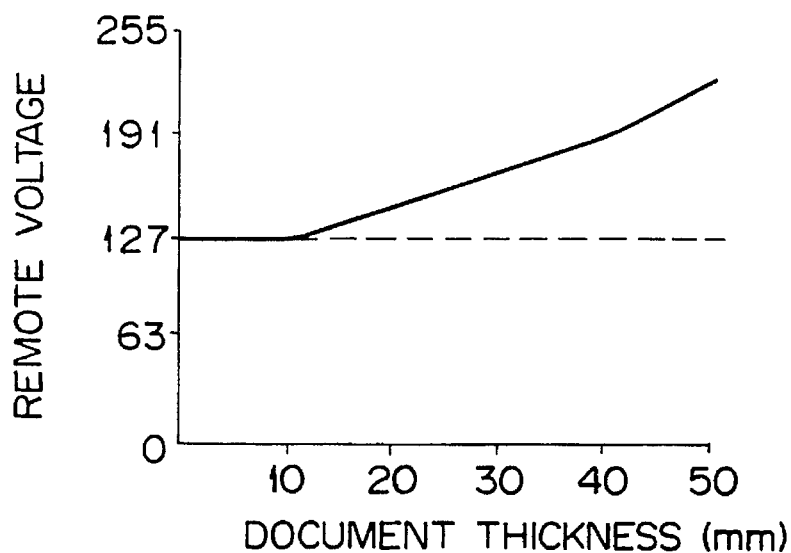
FIG. 7 is a graph indicative of a relation between the quantity of light for illumination and the thickness of a book document.

FIG. 6 shows a case wherein a remote voltage signal is manipulated to increase the light quantity at the bound portion BOa of the book BO. To increase the light quantity, a remote voltage signal is changed on the basis of a distance from a position where the scanning unit 200 starts scanning the document BO. Specifically, in FIG. 6, a remote voltage signal is sequentially increased from the scanning address of 210 mm to the scanning address of 230 mm of the scanning unit 200, thereby sequentially increasing the light quantity. Subsequently, the remote voltage signal is sequentially reduced from an address of 250 mm to an address of 270 mm, thereby sequentially reducing the light quantity. Alternatively, since the bound portion BOa of the book BO sequentially shifts in the right-and-left direction due to page turning, the light quantity may be controlled by calculating the position of the bound portion BOa on the basis of the result of edge detection, which will be described. The procedure shown in FIG. 6 prevents the density from increasing, i.e., the light quantity from decreasing despite the shadow appearing at the bound portion BOa. Furthermore, as indicated by a dashed line in FIG. 6, if the light quantity is increased depending on the thickness of the book BO, it is possible to correct short illumination attributable to the curvature of the bound portion BOa, and irregularities in density attributable to the scanning lens. For this correction, a sensor, not shown, senses the amount of opening or closing of a pair of slide plates of document tables, which will be described, which are used to support the bound portion BO (i.e. thickness of the bound portion BO). Then, as shown in FIG. 7, the light quantity of each lamp is increased at the bound portion BOa in matching relation to the thickness of the book BO.

Figure 8:
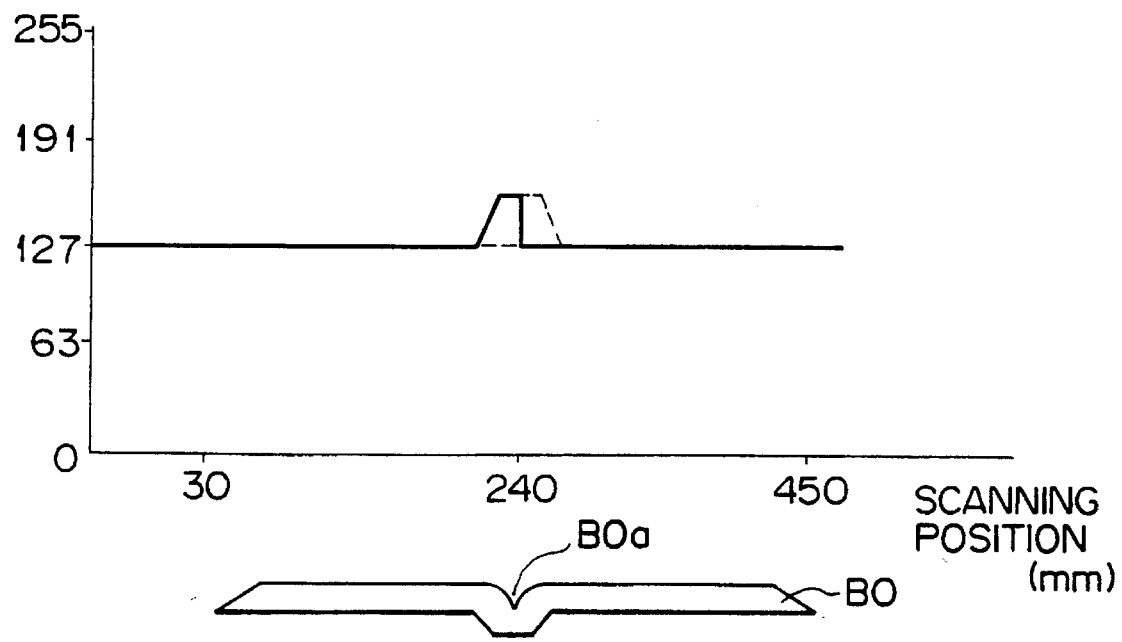
FIG. 8 is a graph showing quantities of light distributed asymmetrically at the bound portion of a book document.

FIG. 8 shows a case wherein the light quantities of the two lamps are increased asymmetrically in the right-and-left direction so as to prevent the density from increasing at the bound portion BOa of the book BO. In the figure, a solid line and a dashed line are respectively representative of set light quantities assigned to the right and left lamps. As shown, when the reading section of the scanning unit 200 approaches the bound portion BOa of the book BO and the document surface begins to incline downward to the right, the set light quantity of the right lamp is sequentially increased, as indicated by the solid line. As a result, the quantity of light incident to the document surface from the right perpendicularly thereto is increased to provide the background of the bound portion BOa with the same density as the background of the other portion. As soon as the reading section arrives at the center of the bound portion BOa, the light quantity of the right lamp is restored to the original value. Next, the set light quantity of the left lamp is sequentially increased from the position where the document surface begins to incline downward to the left, as indicated by the phantom line in the figure. As a result, the quantity of light incident to the document surface from the left perpendicularly thereto is increased to provide the background of the bound portion BOa with the same density as the background of the other portion. Subsequently, when the reading section arrives at the end of the right curved part of the bound portion BOa, the light quantity of the left lamp is restored to the original value. Thereafter, the lamps constantly emit the original set quantity of light.

Figure 9:
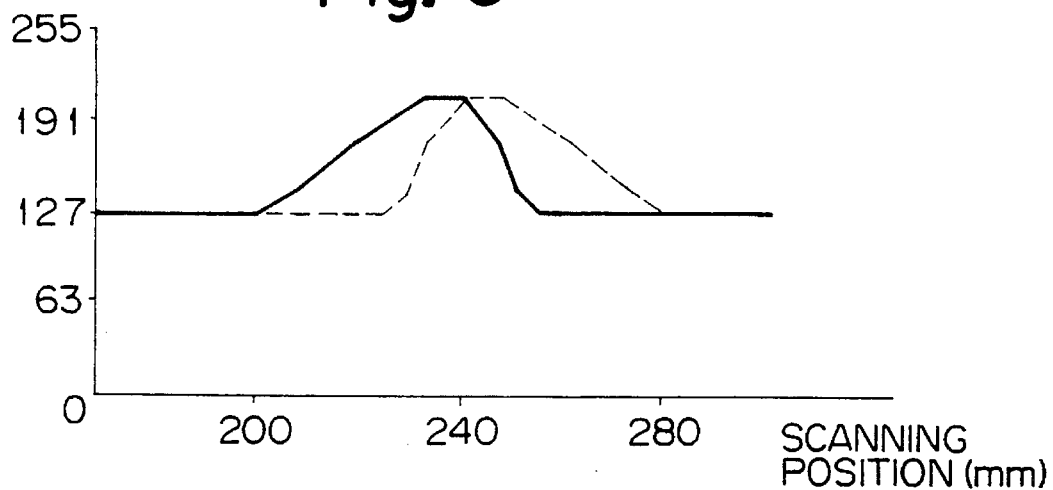
FIG. 9 is a graph similar to FIG. 8.

FIG. 9 plots in an enlarged scale the transitions of the quantities of light issuing from the right and left lamps as shown in FIG. 8. As the plot indicates, when the light quantities of the two lamps are sequentially changed, the density can be corrected in matching relation to the curvatures, or inclinations, of the bound portion BOa of the book BO. This eliminates stripe-like irregularity due to the jumps of density in the subscanning direction which are in turn attributable to the changes in light quantity at the bound portion BOa. When the light quantities of the two lamps are sequentially variable over 256 steps, as shown in FIG. 9 specifically, even the procedure shown in FIG. 6 achieves the same advantage.

How an irregular density distribution is corrected by the previously mentioned amplifying circuit, which amplifies image data read by the TPS, will be described hereinafter.

FIG. 10 shows a specific construction of the amplifying circuit. Briefly, as charges accumulated in the CCD image sensor 101 are transferred in the main scanning direction and subjected to clamping, sampling and holding, EVEN/ODD pixel combination and other waveform correction, the amplifying circuit variably amplifies the resulting analog signal. The amplified signal is digitized and then transferred to the IPU 103 as digital data. Specifically, as shown in FIG. 10, the amplifying circuit has an amplifier 301 which receives the analog image signal at an input VIN thereof, amplifies it, and then produces the amplified signal on an output VOUT. Labeled G1–G5 are 5-bit signal inputs for setting a data amplification value. Usually, an adequate gain calculated by shading correction is set on the inputs G1–G5 while an image is read. The amplification of the non-inverting amplifying circuit shown in FIG. 10 is determined by a resistance R defined by a resistor R1 and parallel resistors R2–R7 and is expressed as:

$$VOUT=VIN(1+R/R1)$$

Therefore, with the amplifying circuit of FIG. 10, it is possible to select a magnification in thirty-two different steps, i.e., from about 6 magnifications to 450 magnifications, depending on the set value represented by the inputs G1–G5.

In the above condition, an alternative embodiment of the present invention adjusts the gain on the inputs G1–G5 so as to obviate irregularities in density attributable to the curvatures and shadows of the bound portion BOa of the book BO. Specifically, the amplification gain of input image data is increased depending on the distance from the position where the scanning unit 200 starts scanning the book BO. More specifically, when the scanning unit 200 approaches the bound portion BOa, the embodiment shifts the image data to a low density side for thereby maintaining the background density constant. For data correction, the embodiment manipulates the amplification value in the same manner as in the procedure of FIG. 6, i.e., increases the image data at the bound portion BOa, thereby reducing the image density. In detail, the amplification value of image data is sequentially increased from a scanning address of 210 mm to a scanning address of 230 mm of the scanning unit 200, and then sequentially reduced from an address of 250 mm to an address of 270 mm to the original value. This eliminates an increase in density due to the shadows to appear at the bound portion BOa. Further, by increasing the amplification value on the basis of the thickness of the book BO, it is possible to eliminate irregularities in density attributable to short illumination, which is in turn attributable to the curvatures of the bound portion BOa, as well as to the lens. For this purpose, a sensor, not shown senses the amount of opening or closing of a pair of slide plates used to support the book BO (i.e. thickness of the book), and the amplification value is increased at the bound portion BOa based on the thickness of the book BO, as described in relation to FIG. 7. Moreover, by sequentially changing the amplification value in the scanning direction, it is possible to correct density in matching relation to the curvatures or inclinations of the bound portion BOa and, therefore, to eliminate stripe-like irregularity due to the jumps of density in the subscanning direction which is in turn attributable to changes in light quantity at the bound portion BOa.

While the embodiment has been shown and described as changing the amplification value of analog image data, digitized image data may be shifted by subtraction or multiplication.

Generally, the curvatures and shadows of the bound portion BOa of the book BO occur at the same position in the main scanning direction. To reduce the irregularity in density attributable to the bound portion BOa, another alternative embodiment of the present invention samples image data in the main scanning direction, and then corrects image data on a main scanning line by real time processing based on a minimum density which is representative of the background of the book BO. Specifically, the embodiment determines the gain of the amplifying circuit shown in FIG. 10 on the basis of the peak value of image data on the preceding main scanning line. Alternatively, the embodiment may delay one line of image data with a FIFO memory, calculate the peak of minimum densities of sampled image data in the main scanning direction and representative of the background of the book BO, and then shift or multiply digital data on the basis of the peak such that the background density at the bound portion BOa becomes equal to that of page portions. Since the page portions of the book BO generally have a constant background density, the embodiment effects only a small amount of density correction in the page portions. Hence, using the minimum density representative of the background of the book BO has a minimum of side effect.

Figure 11:
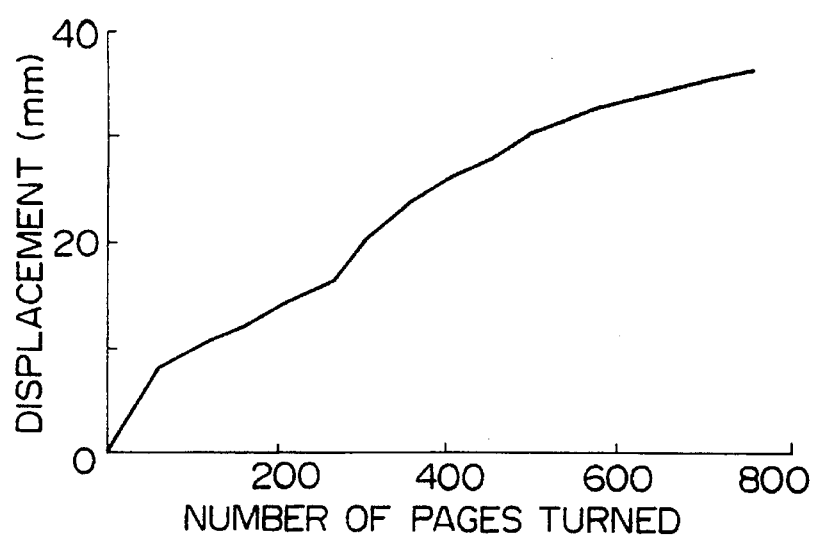
FIG. 11 is a graph representative of the transition of the left edge of a book document attributable to the page turning operation of the scanning unit.
Figure 12:
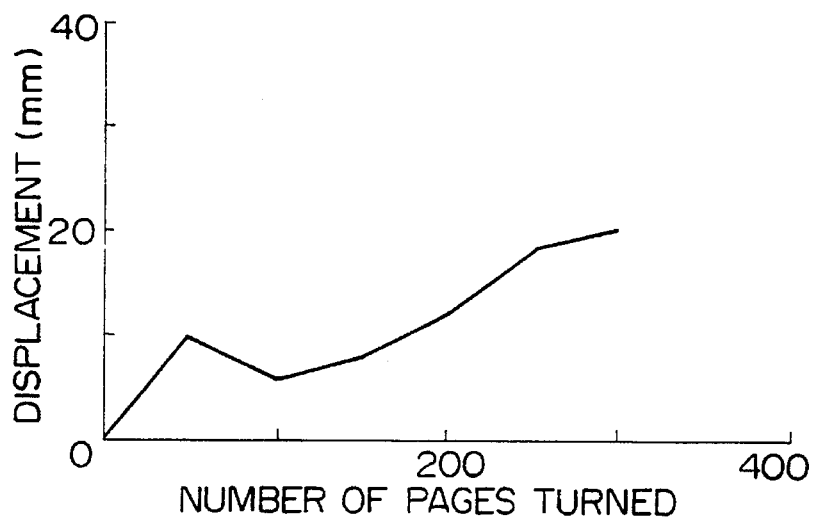
FIG. 12 is a graph similar to FIG. 11, showing a transition to occur when the bound portion of a book document is displaced.
Figure 13:
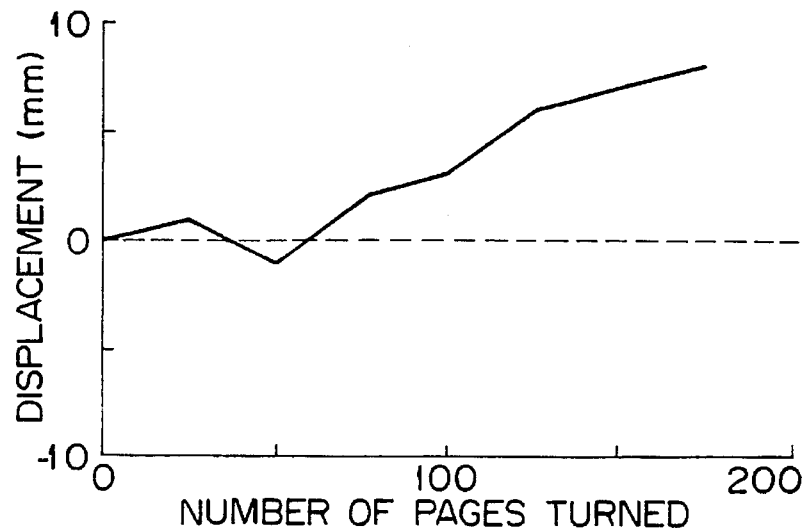
FIG. 13 is a graph also similar to FIG. 11, showing a transition to occur when the bound portion of a book document is thin.

Assuming that an official gazette or similar book is laid in a spread position, then the number of left pages sequentially increases as the pages are turned over, and the left edge of the document sequentially shifts upward and rightward away from the cover of the document. At the same time, the number of right pages sequentially decreases while the right edge of the document shifts downward and rightward. FIGS. 11–13 each shows a specific relation between the number of pages turned over and the position of the left edge of a document. In the figures, the initial position of the left edge of a book laid in a spread position is assumed to be "0", and the amount of rightward shift of the left edge of the document is represented by a displacement. Further, in the figures, the rightward displacement of the left edge is assumed to be positive (plus) and shown in millimeters. FIGS. 11, 12 and 13 respectively pertain to a book which is 20 mm thick and has 750 pages in total, a book which is 12 mm thick and has 300 pages, and a book which is 9 mm thick and has 80 pages; all the books are of size B4 in a spread position. As FIGS. 11–13 indicate, although the left edge of a book sequentially shifts to the right as the pages thereof are turned over, the displacement does not always increase monotonously since the shape of the bound portion changes due to the displacement. Moreover, as shown in FIGS. 12 and 13, the displacement of the left edge locally decreases since the bound portion slides in the right-and-left direction while the pages are turned over. As for the thin book shown in FIG. 13, the left edge shifts even to the left (negative or minus direction). In addition, the displacement depends on the size and thickness of a book as well as on the quality of paper.

In the light of the above, the illustrative embodiment detects the edge of the spread page of a book on the basis of information read by the CCD image sensor 101 and, by using the edge position as a reference, determines the valid effective image range of the book (page surface of the spread book). This is successful in obtaining a valid image range suitable for inputting and printing an image without regard to the displacement of the edge of the document. In the embodiment, assuming that the book is of size A3 in a spread position, the edge of the book (edge of the cover) is about 210 mm remote from the central setting position and about 30 mm remote from the home position of the scanning unit, or paging turning unit, 200 with respect to the reading position.

Figure 14:
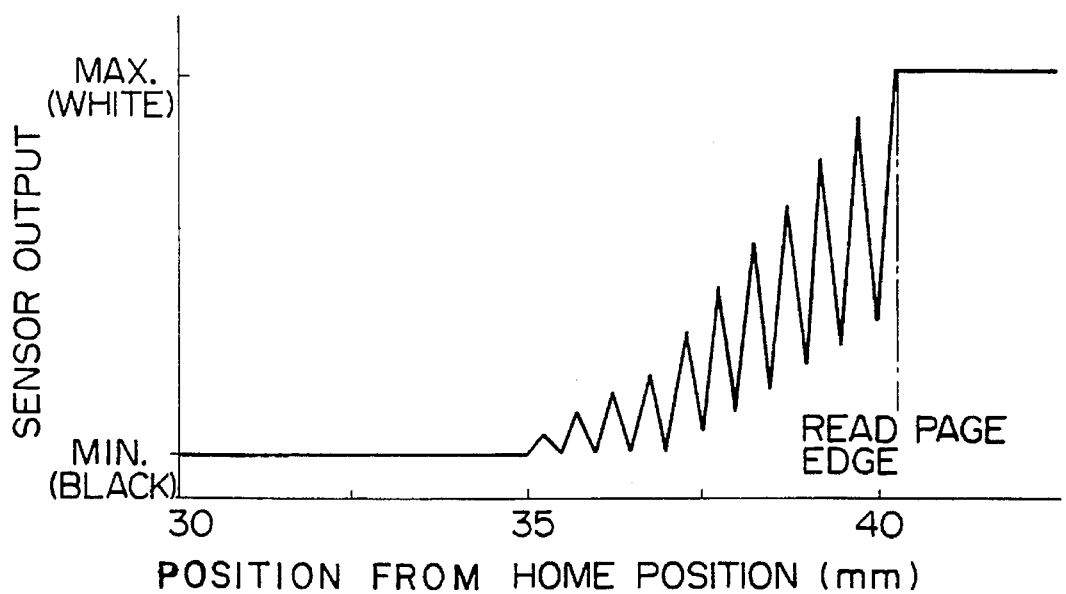
FIG. 14 is a graph indicative of data read from the edge portion of a book document by the scanning unit.

The embodiment detects the edge on the basis of changes, in the subscanning direction, in the information read by a particular pixel of the image sensor 101. FIG. 14 shows data read by the image sensor 101 at the edge portion of a book. An image representative of the left edge portion of a document is slightly blurred since the document surface is located below the focusing point of the image sensor 101. While the reading position is short of a book, the image sensor 101 reads a document table or the back cover of the book and, therefore, outputs data of the same level as black data. When the reading position reaches the edge portion of the book, a stripe pattern representative of the edges of the pages is sensed. Generally, most books have white background on their pages and have no text or graphic image over a distance of several ten millimeters as measured from the edge. Hence, when such a single color (white) continuously appears, the embodiment determines that the edge portion of the book has been detected. This is done by scanning the book in the opposite direction to the image reading direction at the end of a page turning operation.

By the above-described procedure, the embodiment is capable of determining a valid image range suitable for inputing and printing an image with no regard to the displacement of the edge of a book.

Figure 15:
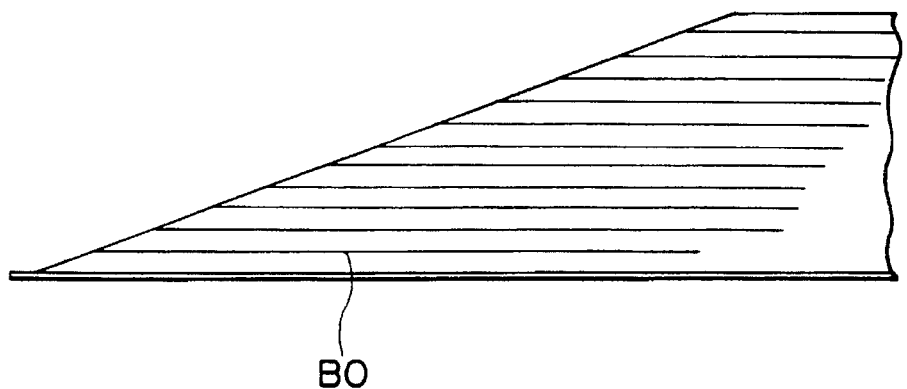
FIG. 15 is a fragmentary enlarged view of the edge portion of a book document.

As shown in FIG. 15, the edge portion of the spread book BO is made up of the edges of pages which are stacked in an inclined position. When illuminated in the direction opposite to the inclination of the edge portion, shadows appear at the edges of the pages with the result that a stripe pattern formed by the edges of the pages is read in an enhanced condition. The TPS illuminates the surface of a book with a pair of lamps from the right and left in order to read the right and left pages evenly and to read even the curvatures of the bound portion BOa of the book B. The embodiment, therefore, detects the edge of the book BO by turning off one of the two lamps or reducing the light issuing therefrom, thereby enhancing the stripe pattern formed by the edges of the page. This promotes accurate detection of the edge portion of the book BO. Specifically, during the latter half of a page turning operation which occurs from the right to the left, the turn-on signal S2 and remote voltage V2 of the light control circuit FIG. 3, are manipulated to turn on only the right lamp 202. Also, when the edge of the right page of the spread document BO should be detected to lift the right page, as will be described, the turn-on signal S2 and remote voltage V2 are manipulated to turn off only the right lamp 202 at the end of the movement for reading the surface of the book BO.

The problem with the edge detection based on the edges of pages as described above is that an image pattern similar to the stripe pattern formed by the edges of the pages may exist on the pages of the book BO. Considering such an occurrence, another system for detecting the edge of the book BO compares an image derived from the illumination by the two lamps and an image derived from the illumination by only one of them. This successfully promotes accurate detection of the edge of the book BO. Specifically, the alternative system has a first mode in which one of the two lamps is turned off or reduced in light quantity to enhance the stripe pattern formed by the edges of the pages, and a second mode in which both of the lamps are turned on to enhance the stripe pattern. The system switches over the two modes and compare data read in the first and second modes. If the data derived from the first and second modes are different, the system determines that they are representative of the edge portion of the book BO. If the two data differ little, the system determines that they are representative of an image pattern existing on a flat surface, i.e., printed on the page of the book BO. More specifically, at the latter half of paging turning operation of the scanning unit 200 which occurs from the right to the left, the turn-on signals S1 and S2 and remote voltages V1 and V2 of the light control circuit, FIG. 3, are manipulated to switch over the turn-on of the lamps. At this instant, the lamps may be switched over every line, or the book BO may be scanned twice to store and compare the resulting data. If desired, such an alternative system may be executed only when the result of detection is questionable. In this way, the second system promotes accurate detection of the edge portion of the book BO.

A reference will be mode to FIGS. 16–20 for describing specific book copy modes available with the TPS. Numerals appearing in these figures are representative of the page numbers of the book BO being read; pages 2 and 3 and pages 4 and 5 respectively appear together on the surface of the book BO. Regarding the frame memory 104, a signal memory R is shown as including a right page R and a left page L. All the modes to be described are assumed to read a book whose page size is A4, read the spread two pages continuously by a single scanning movement of the scanning unit 200, store data contained in a size A3 in the frame memory 104, read the data out of the memory 104, writes them on a photoconductive element, and then record the resulting image in a paper.

Figure 16:
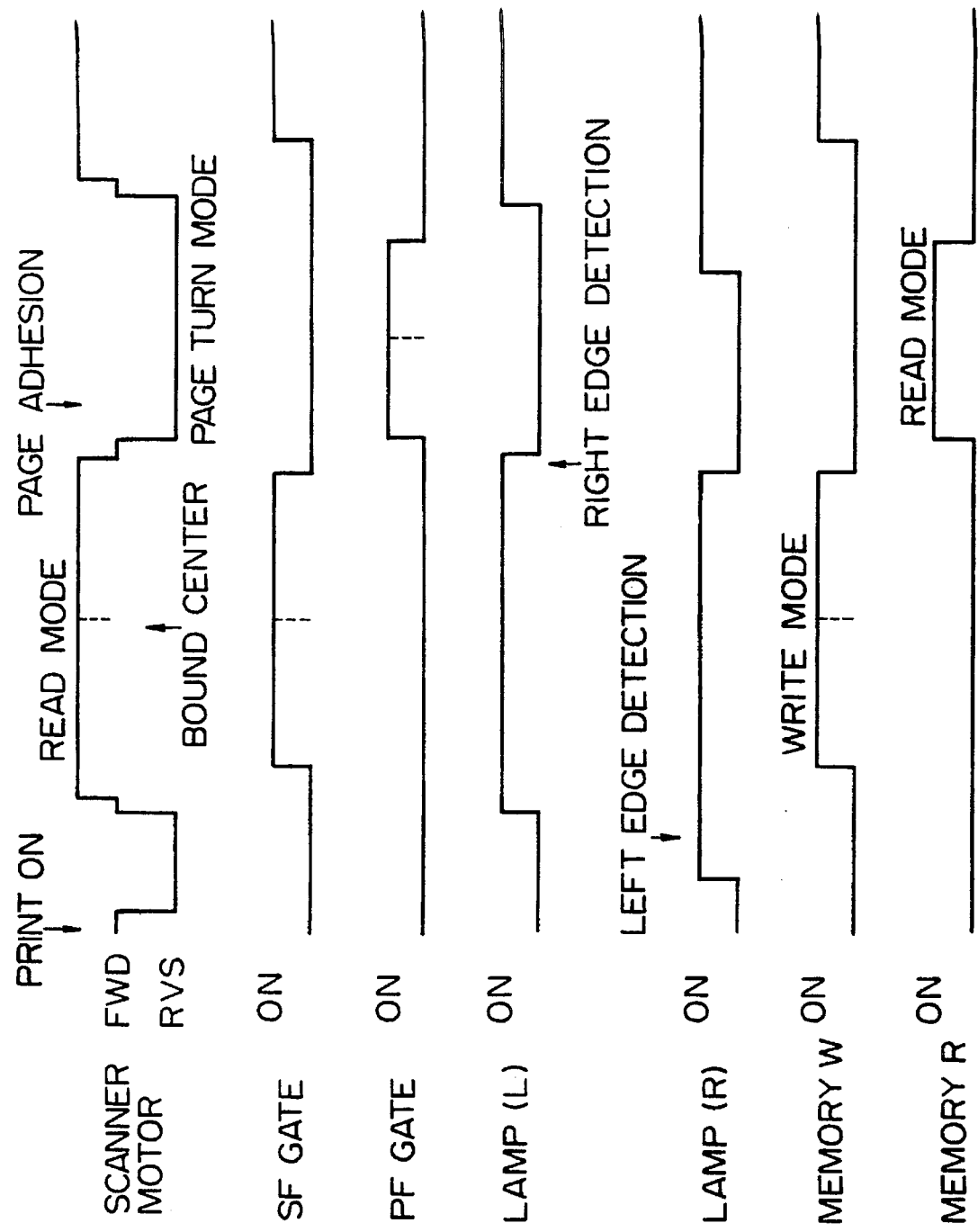
FIG. 16 is a timing chart demonstrating a book mode operation particular to the embodiment and effected in a spread output one-to-one copy mode.
Figure 17:
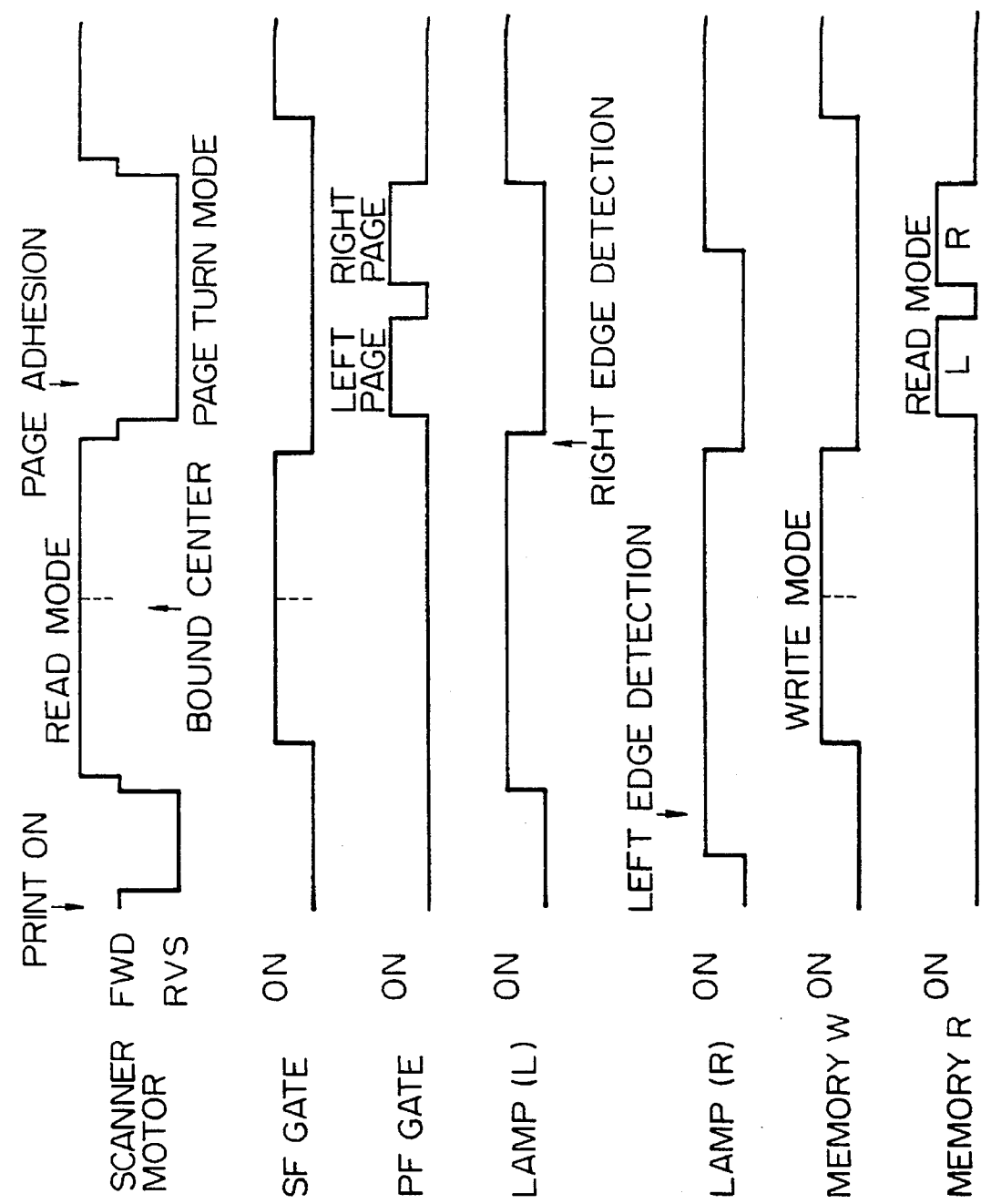
FIG. 17 is a timing chart demonstrating another book mode operation to be effected in an independent output one-to-one copy mode.
Figure 18:
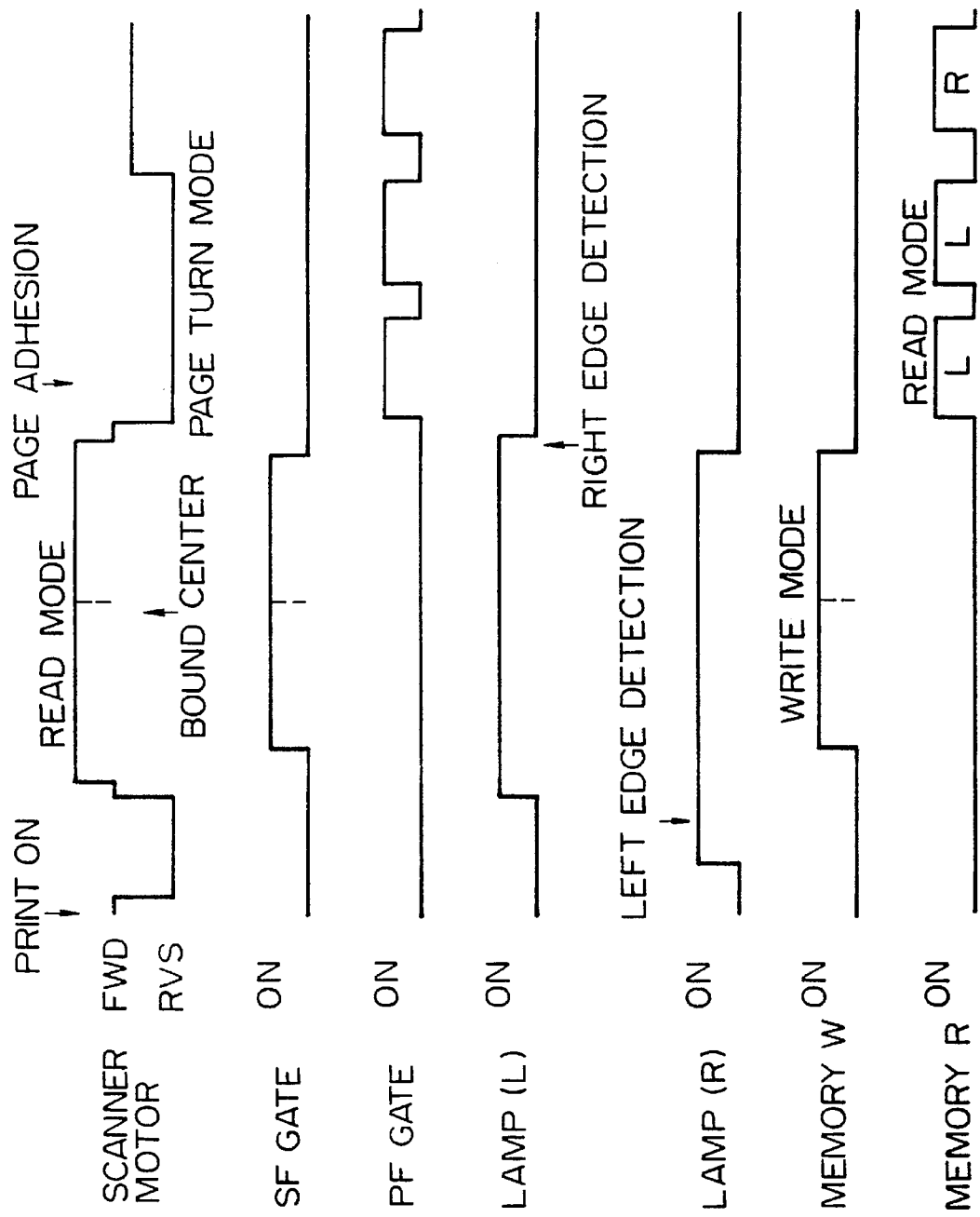
FIG. 18 is a timing chart demonstrating still another book mode operation to be effected in an independent page output two-copy mode.

In detail, FIG. 16 shows a one-to-one copy mode for outputing an image representative of the spread two pages on a single paper of size A3 and producing a single copy of the book BO. FIG. 17 shows a one-to-one copy mode for outputing each of the spread two pages on a respective paper of size A4 and producing a single copy of the book BO. FIG. 18 shows a two copy mode similar to the mode of FIG. 17 except that two copies of the book BO are produced.

In FIG. 16, when a print key is pressed to enter a copy start command, the scanner motor 106 is driven in the reverse direction with the result that the scanning unit 200 located at the center is moved in toward a read start position. While the unit 200 is so moved, the right lamp 202 is turned on, and the image sensor 101 is driven. The unit 200, therefore, detects the edge portion of the book BO by scanning the left page of the book BO, as stated earlier. When the unit 200 arrives at the read start position which is about 30 mm short of the edge of the left page, the scanner motor 106 is driven in the forward direction, and the two lamps 201 and 202 are turned on. In this condition, the unit 200 starts reading the left page of the book BO. The resulting data are dealt with as a document image from the edge of the left page detected by the previous movement of the unit 200. At the same time, a valid image range signal SFGATE assigned to the subscanning direction is generated. In response to the signal SFGATE, a write signal memory W associated with the frame memory 104 is manipulated to control the data writing range. The center of the bound portion BOa of the book BO is identified on the basis of the control address of the scanner motor 106 and may be used as a reference for the second page in a page-independent output mode or to form an image at the center of a paper in a spread output mode. Subsequently, as soon as the unit 200 arrives at the edge of the right page, the right edge portion of the right page is detected with the right lamp 202 turned off. As a result, a position for attracting the right page is calculated to implement a page turning movement to follow. After the spread document has been read by the above sequence of steps, the unit 200 starts returning while causing the right page to adhere thereto while, at the same time, image formation begins. The data read signal memory R associated with the frame memory 104 is manipulated by a valid image range signal RFGATE generated by the printer and assigned to the subscanning direction, whereby the image data are output in synchronism with the operation of the printer. While the unit 200 turns over the page, it sans the edge of the left page to detect the edge of the book BO. The procedure described above is repeated to copy the spread pages of the book BO while turning over the pages automatically.

In the one-to-one or page-independent mode shown in FIG. 17, the TPS also reads the spread pages of the book BO according to the timing chart or FIG. 16. When image data should be output during page turning, the data read signal memory R associated with the frame memory 104 is operated by two signals PFGATE in matching relation to two consecutive papers. As a result, the image data are output page by page. At this instant, regarding the right page of image data, an address counter associated with the frame memory 104 is masked or stopped by the signal PFGATE. As a result, image data contiguous with the first image on the left page is read out by the second signal PFGATE at a timing matching the interval between the two consecutive papers.

In the page-independent mode of FIG. 18, which is similar to the mode of FIG. 17, the TPS also reads the spread pages of the book BO according to the timing chart of FIG. 16. When image data should be output during page turning, the data read signal memory R is manipulated by a plurality of signals PFGATE in matching relation to consecutive papers. As a result, a plurality of pages of image data are output page by page. In the specific procedure of FIG. 18, the image data of the left page are output twice, and then the image data of the right page are output twice. While the printer is in operation, the scanning unit 200 fully turns over the page and is brought to and stopped at the read start position. At this position, the unit 200 waits for the next movement for reading an image.

Figure 19:
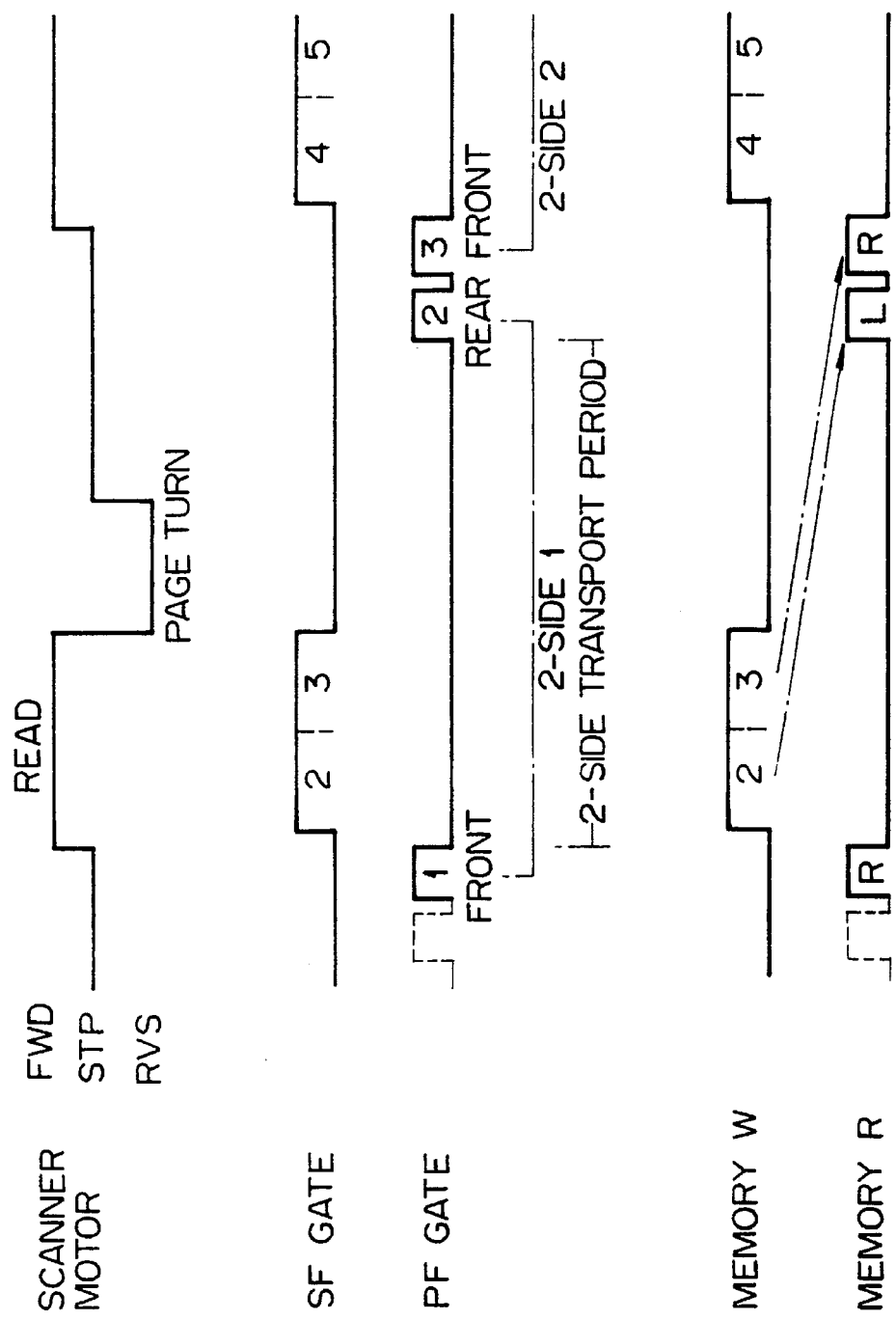
FIG. 19 is a timing chart representative of a conventional book two-side copy mode operation.

FI6S. 19 and 20 each shows a particular two-sided copy mode for reproducing the front and rear pages of a leaf on the front and rear of a paper. Specifically, FIG. 19 shows a conventional mode in which the pages of the book BO are copied in the same order as they are read. In this mode operation, data on the right page of the spread document BO are read out of the frame memory 104 and then formed on the front of a paper. Subsequently, the paper is turned over and then transported to an intermediate stacking position by way of a particular path. The TPS turns the page once by a leftward movement thereof, reads the next spread page, and then writes the resulting data in the frame memory 104. Then, the paper carrying an image on one side thereof, i.e., one-sided copy is fed from the intermediate stacking position while the data of the left page are read out of the frame memory 104. Consequently, the data of the left page are printed on the rear of the paper to complete a two-sided copy. The problem with this conventional system is that since the paper has to be turned over and routed through a particular transport path, a substantial period of time is necessary for the one-sided copy to be refed from the intermediate position, resulting in low productivity.

Figure 20:
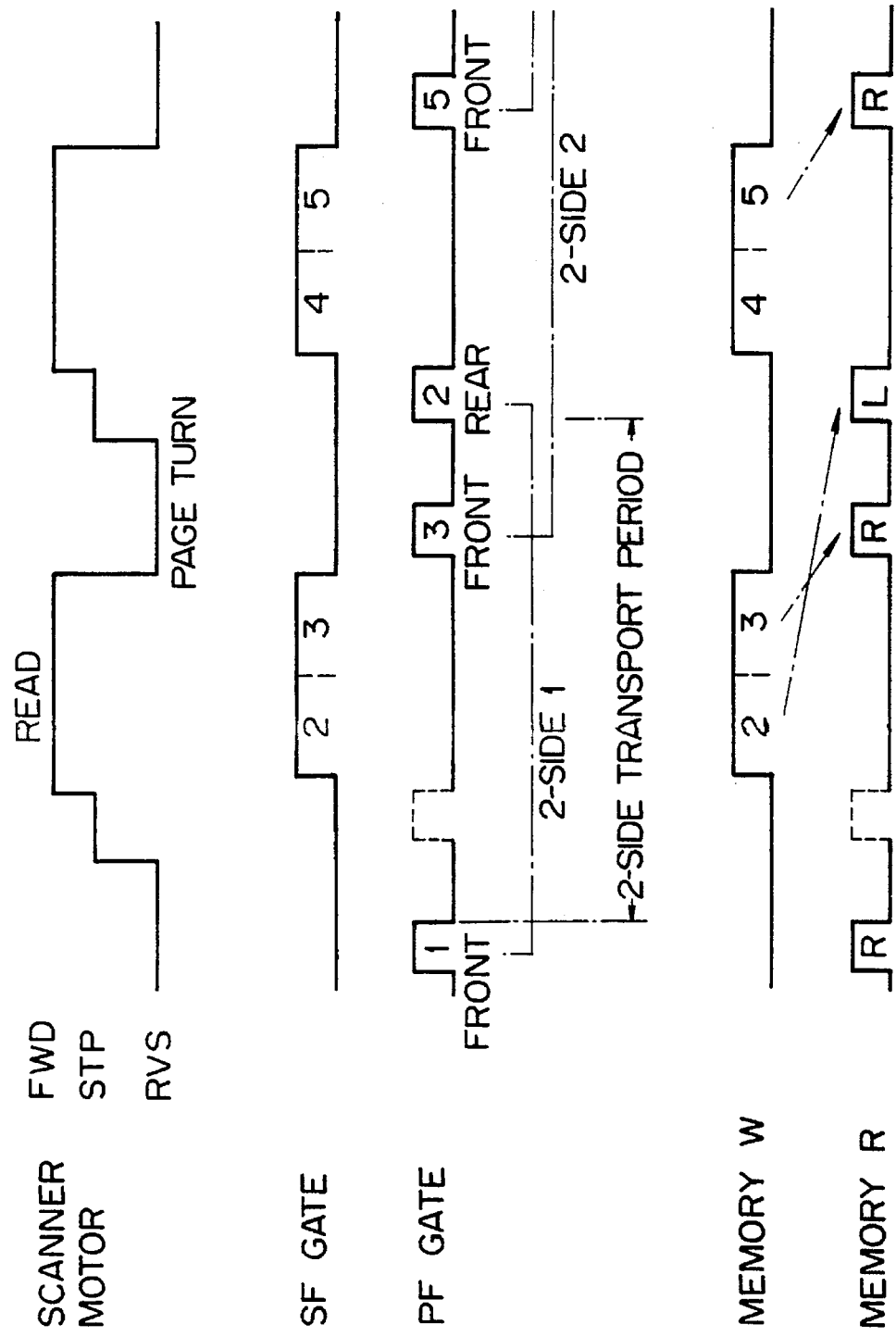
FIG. 20 is a timing chart representative of a book mode operation particular to the embodiment and effected in a one-to-one high-speed two-side copy mode.

FIG. 20 demonstrates a one-to-one high-speed two-sided copy mode particular to the present invention and allowing images to be formed in a page order different from the reading order with the frame memory 104. Specifically, this mode operation begins with a step of reproducing the right or first page of the spread book BO on the front of a first paper. The resulting one-sided copy is transported to an intermediate stacking position. Then, the second and third spread pages are read and written to the frame memory 104. Subsequently, the third page is read out of the frame memory 104 and reproduced on the front of a second paper. This one-sided copy is also transported to the intermediate stacking position. Thereafter, the first paper is referred from the stacking position while the second page is read out of the frame memory 104. After the second page has been reproduced on the rear of the first paper, the paper or copy is driven out of the printer. Thereafter, the pages stored in the frame memory 104 are output in the order opposite to the reading order. This allows the book BO to be reproduced on both sides of papers at high speed. Specifically, although the mode of FIG. 20 needs the same period of time as the mode of FIG. 19 in respect of the refeed of a paper, the former mode allows an image to be formed on the second paper while the first paper is transported toward the intermediate stacking position, thereby obviating the waste of time. The procedure of FIG. 20 implements 1.5 times to 2 times higher productivity than the conventional mode of FIG. 10.

Figure 21:
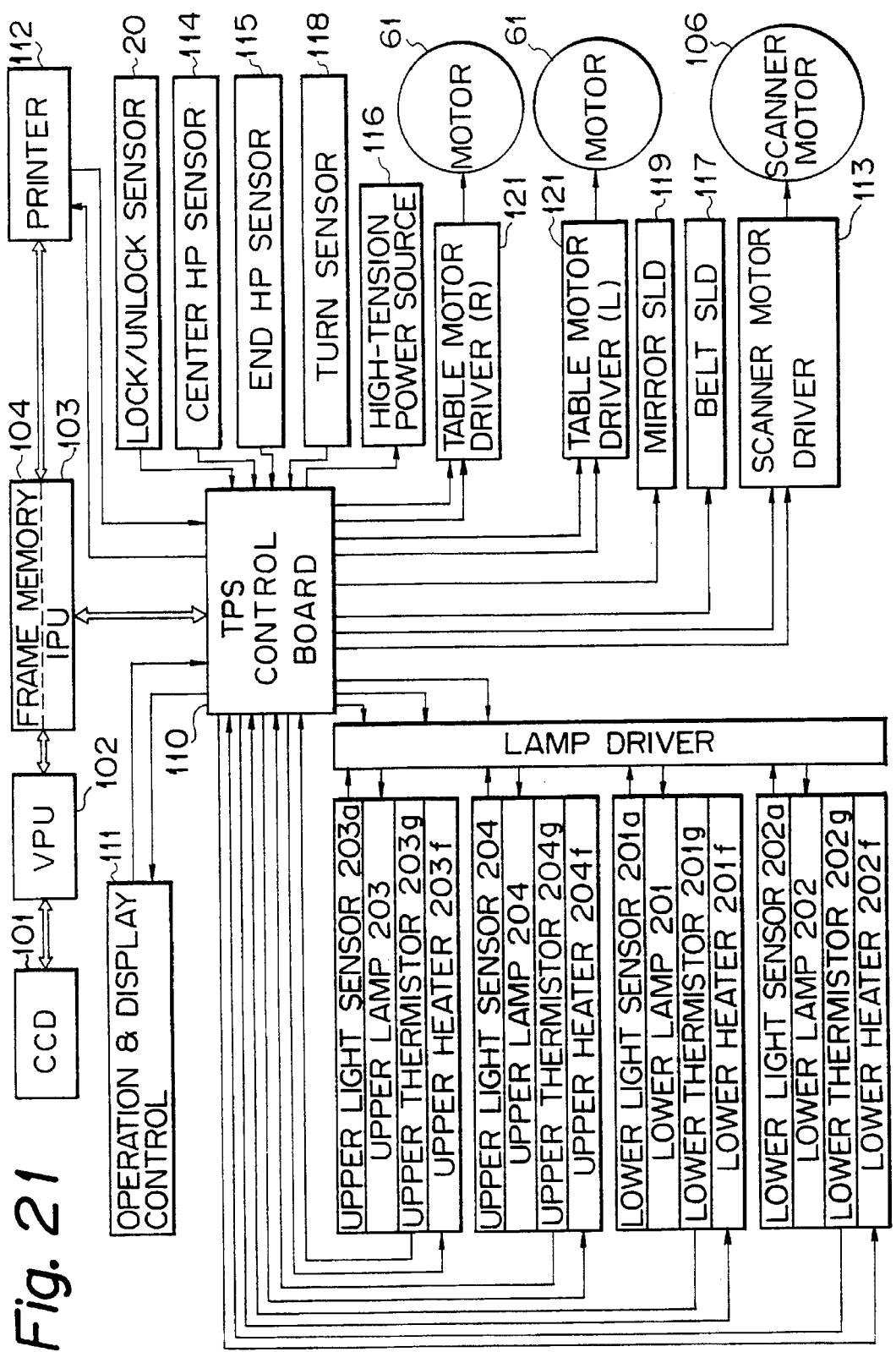
FIG. 21 is a block diagram schematically showing drive control means included in the embodiment.

Referring to FIG. 21, an electrical arrangement built in the TPS will be described. As shown, the TPS has a TPS control board 110 which controls the entire TPS and has a one-chip CPU, an external ROM, a RAM, I/O ports, a timer, and a serial interface. The TPS control board 110 is connected to an operation and display control section 111 and a printer section 112 by the serial interface so as to interchange commands and data therewith. A scanning unit driver 113 reversibly drives the scanner motor 106 and, therefore, the scanning unit 200. A center HP (Home Position) sensor 114 and an edge HP sensor 115 each senses the home position of the scanning unit 200 before the scanning unit 200 starts scanning a document. In a book mode, the position sensed by the center HP sensor 114 is the position where the scanning unit 200 starts moving. As shown in FIG. 34, a turn belt 208 is disposed in the scanning unit 200 for turning the pages of the book BO by electrostatic adhesion. When a charge pattern is formed on the belt 208 by a high-tension power source 116, the page or leaf of the book BO electrostatically adheres to the belt 208. Referring again to FIG. 21, a belt up-down solenoid 117 causes the turn belt 208 carrying the page of the book BO therewith to rise and lift the edge of the page toward the scanning unit 200. At this instant, a turn sensor 118 determines whether or not the page has been turned over. When the turn sensor 118 does not sense the turn-over of the page at a predetermined time, the page turning movement is effected again.

A mirror switching solenoid 119 selects either of a lower optical path for reading the book BO and an upper optical path for reading a sheet document or similar ordinary document. Implemented by a keep solenoid, the solenoid 119 is energized only when the optical path should be switched. The lower fluorescent lamps 201 and 202 and upper fluorescent lamps 203 and 204 are used as light sources. Light sensors 201a, 202a, 203a and 204a are respectively associated with the lamps 201, 202, 203 and 204, and each senses the quantity of light from the associated lamp. The outputs of the light sensors 201a–204a are fed back to the TPS control board 110 via a lamp driver, thereby maintaining the output light constant. Heaters 201f, 202f, 203f and 204f and thermistors 201g, 202g, 203g and 204g are respectively mounted on the lamps 201, 202, 203 and 204 in order to control the temperature of the lamps. Although four lamps are connected to the lamp driver 120, a device for turning on the lamps is implemented by only two circuits. The lamp driver 120 is provided with a circuit for switching the connection of the upper and lower lamps in response to a control signal frown the TPS control board 110.

When the lamps 201 and 202 or the lamps 203 and 204 illuminate a document, an imagewise reflection is routed through mirrors and a lens to the CCD image sensor 101 which is connected to the VPU 102, as will be described in detail later. The VPU 102 generates a clock for driving the image sensor 101, converts an analog image signal output from the image sensor 101 to a digital value with an ADC, and sends the digital value to the printer 112 via the frame memory 104 and IPU 103. At this instant, the frame memory 104 is used to arbitrate the read linear speed of the TPS and the process linear speed of the printer section 112. The IPU 103 processes input image data.

Hereinafter will be described a document table unit included in the TPS of the present invention.

Figure 22:
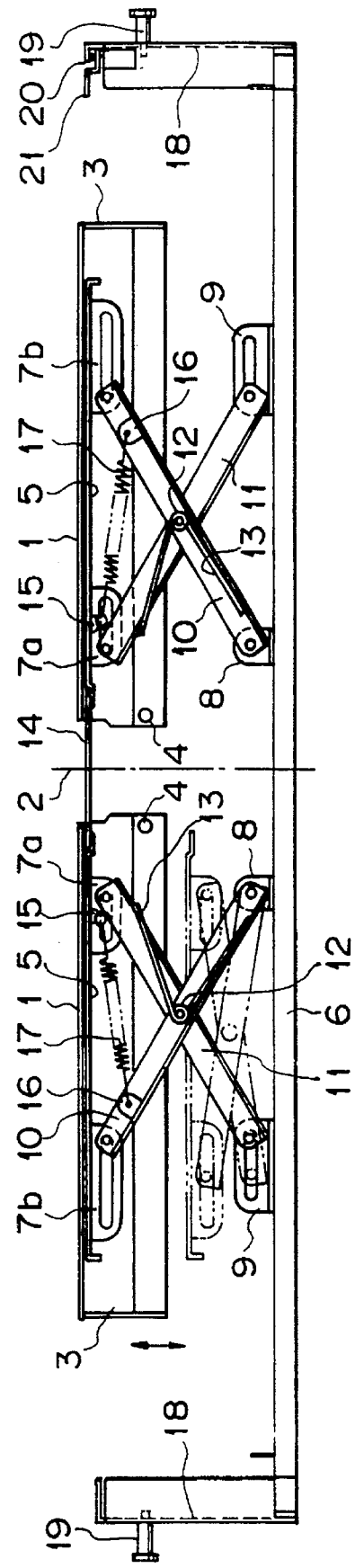
FIG. 22 is a side elevation showing a document table unit included in the embodiment.
Figure 23:
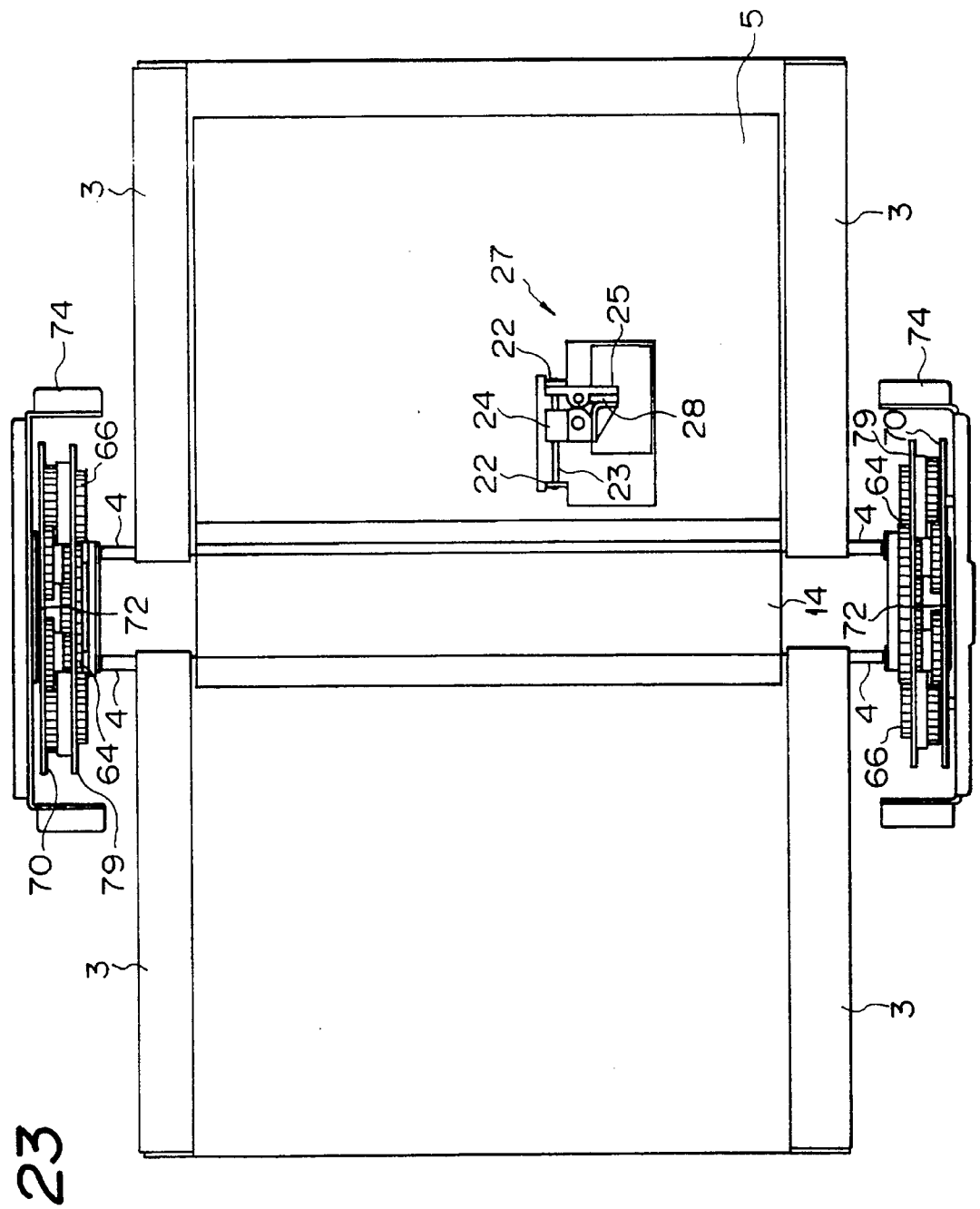
FIG. 23 is a plan view of document tables included in the embodiment.
Figure 24:
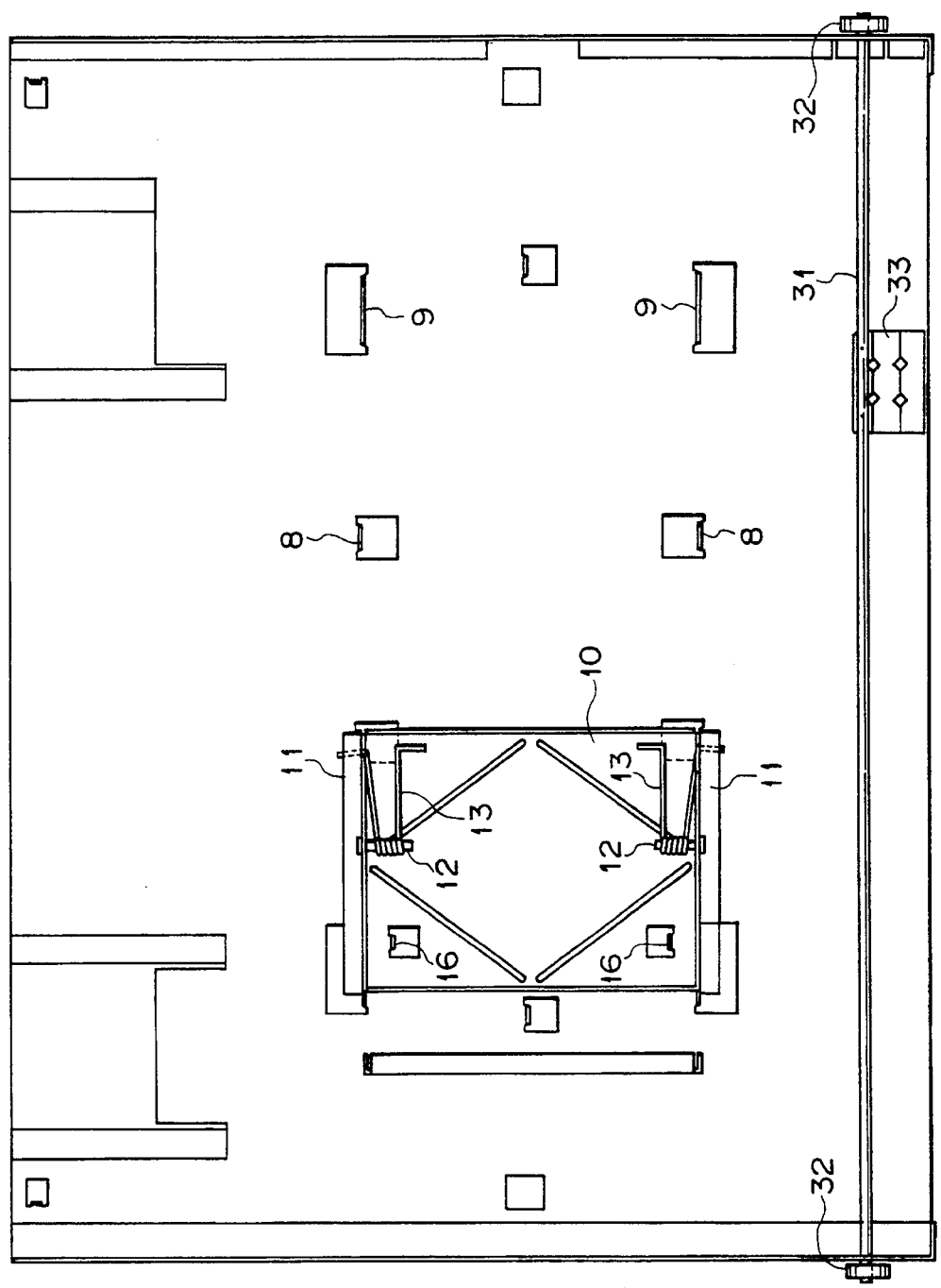
FIG. 24 is a plan view of the document table unit.

Referring to FIGS. 22–24, a document table 1 is implemented by a 2 mm thick plate made of resin. An extremely thin material having a great coefficient of friction, e.g., rubber is bonded to the upper surface of the document table 1. If desired, such a material may be provided on the table 1 by lamination, coating, or spraying. In the illustrative construction, two tables 1 each having a document laying surface (upper surface) of size A4 are located at both sides of the center 2 of the TPS. A slide plate 3 is affixed to the underside of each table 1. Each slide plate 3 is constituted by a sheet metal bent downward at the front and rear ends and the outer side. An adjust stud 4 is affixed to the side of one end of each slide plate 3 which adjoins the center 2 of the TPS. The studs 4 are each formed with a hole at the end thereof for receiving a pin of a slider which will be described later.

Up-down plates 5 each has an upper surface provided with a small coefficient friction. The lower surface of each slide plate 3 rests on the tapper surface of the associated up-down plate 5. The upper starface of each up-down plate 5 is provided with ribs made of Teflon or similar resin and is smoothly movable relative to the slide plate 3 in the right-and-left direction. A size stop 27, which will be described, fixes the associated slide plate 3 and up-down plate 5 relative to each other. Four angle members 7a and 7b (only two are visible) are mounted on the underside of each up-down plate 5, and each is formed with an elongate slot extending in the right-and-left direction. The document table unit has a base 6. Angle members 8 each having a fixed axis of rotation and angle members 9 each having an elongate slot are affixed to the base 6. A link plate 10 is rotatably supported by the angles 8 and 7b while a link arm 11 is rotatably supported by the angles 9 and 7a. At the same time, the link plate 10 and link arm 11 are smoothly slidable relative to the angle members 7a, 7b and 9 in the right-and-left direction. When the document table unit is viewed from the front, the combination of the link plate 10 and link arm 11 is provided at each of the front and rear ends. The associated link plate 10 and link arm 11 are rotatable relative to each other by being joined together by a stud 12 in a form of letter "X". A torsion spring 13 is anchored to the link plate 10 and link arm 11 at opposite ends thereof; the stud 12 defines the center of torsion. The torsion spring 13 constantly biases the up-down plate 5 upward, as viewed in FIG. 22. The elevation of the up-down table 5 is restricted when the surface of a book laid on the document table unit abuts against the scanning unit 200, which is not movable up and down. In this condition, the pressure to act on a scanner unit 30, which will be described later, is maintained constant without regard to the thickness of a book.

The ends of the two up-down plates 5 adjoining the center 2 are connected to each other by a back support sheet 14 made of rubber or similar elastic material. The back of the book BO is set on the back support sheet 14. Tension springs 17, which will be described later, constantly bias the back support sheet 14 in the right-and-left direction. Specifically, the tension springs 17 each connects the angle 16 of the associated link plate 10 to a hook 15 provided on the up-down table 5. As a result, the right and left up-down plates 5 are constantly biased away from each other. Therefore, the back support sheet 14 is capable of supporting the back of the book BO without slackening.

Side plates 18 are affixed to opposite sides of the base 6 and implemented by sheet metals. Pins 19 are studded on the side plates 18 for catching lock pawls 32 provided on the scanner unit 30. A leaf spring 21 and a lock sensor 20 are affixed to one of the side walls 18. The leaf spring 21 urges the scanner unit 30 upward when the unit 30 is closed, while the lock sensor 20 senses the closed position of the unit 30.

Figure 25:
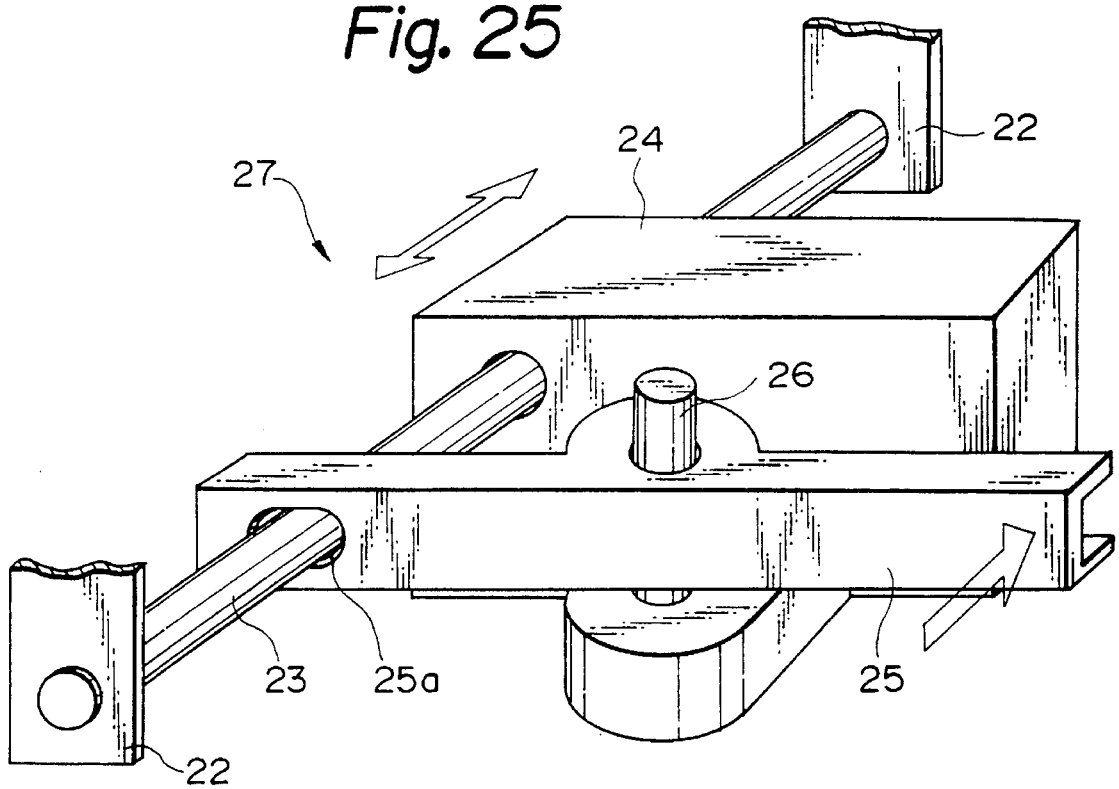
FIG. 25 is a perspective view of a size stop included in the embodiment.
Figure 26:
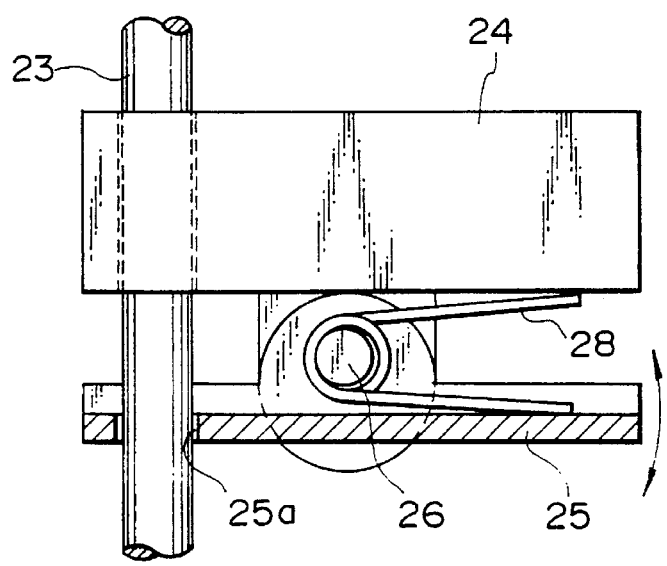
FIG. 26 is a plan view of the size stop.

The size stops 27 adjust the distance between the right and left tables 1 in matching relation to the thickness of the book BO, and fix the slide plates 3 (tables 1) and up-down plates 5 in position relative to each other. In this condition, the associated table 1 and plate 5 are movable integrally with each other. FIGS. 25 and 26 show one of the size stops 27 specifically. As shown in FIG. 23, a pair of angle members 22 are affixed to the underside of each up-down plate 5 and spaced a predetermined distance from each other. As shown in FIG. 25, a rod 23 is affixed to the angle members 22 at opposite ends thereof. A slidable body 24 is mounted on the rod 23 in such a manner as to be smoothly slidable in the axial direction of the rod 23. A stub 26 is studded on the body 24 to extend perpendicularly to the rod 23. A stop 25 is rotatably supported by the stub 26. The stop 25 is formed with a lock hole 25a and loosely coupled over the rod 23. The other end of the stop 25 is extended such that it can be held by fingers.

When the stop 25 is inclined relative to the rod 23, the rod 23 and the lock hole 25a are locked to each other. This allows the slidable body 24 to be locked to the rod 23 at a desired position. Specifically, since the stop 25 is usually inclined by the lock spring 28, the rod 23 and stop 25 are held integrally with each other to lock the body 24 to the rod 23. However, when the operator rotates the extended end of the stop 25 against the action of the lock spring 28, as shown in FIG. 26, the rod 23 and the lock hole 25a of the stop 25 are released from each other with the result that the body 24 can be moved along the rod 23 together with the stop 25. Further, the body 24 is affixed to the slide plate 3, not shown. In this configuration, when the body 24 is locked to the rod 23 at a given position, the slide plate 3, i.e., table 1 and the up-down plate 5 are locked at a desired position relative to each other via the body 24 and rod 23.

Figure 27:
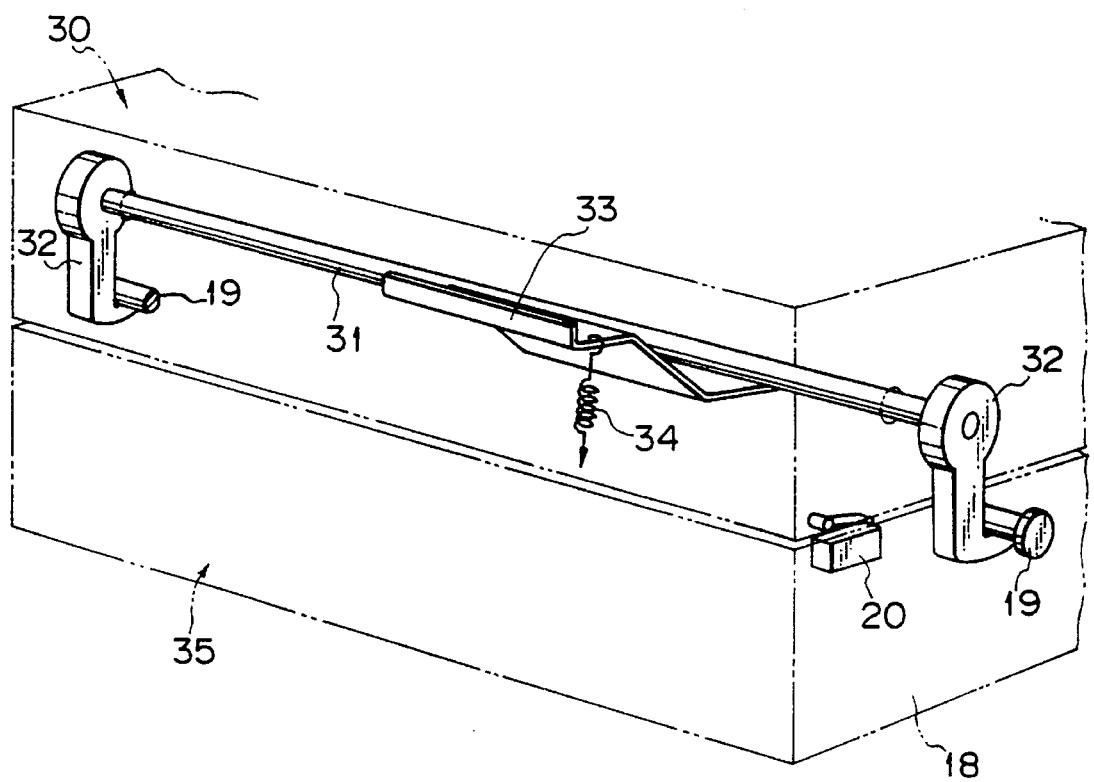
FIG. 27 is a perspective view of a mechanism included in the embodiment for locking and unlocking a scanner unit from the document table unit.
Figure 28:
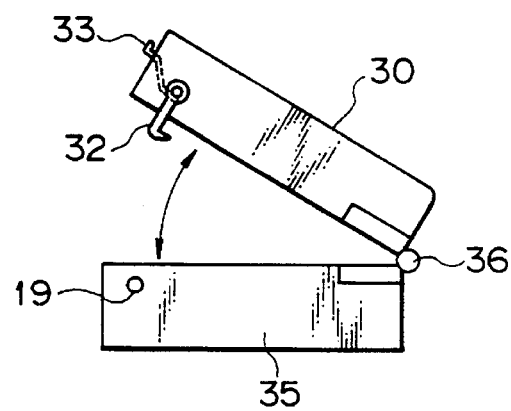
FIG. 28 is a side elevation of the locking and unlocking mechanism.

A mechanism for locking and unlocking, or closing and opening, the document table unit will be described with reference to FIGS. 27 and 28. As shown, in the illustrative embodiment, the TPS has the scanner unit 30 mounted on the document table unit 35. The two units 30 and 35 are connected to each other by a hinge 36 provided on the rear end of the TPS. The TPS, therefore, has a shell type structure which is openable at the front end thereof. The mechanism for opening and closing the document table unit 35 is arranged on the front end of the units 30 and 35. The lock pins 19 are studded on the side plates 18, as stated earlier. As shown in FIG. 27, a shaft 31 is journalled to opposite side walls of the scanner unit 30. The previously mentioned lock pawls 32 are mounted on opposite ends of the shaft 31 and rotatable integrally with the shaft 31. A lever 33 is mounted on the intermediate portion of the shaft 31. When the lever 33 is rotated, the lock pawls 32 are brought into or out of engagement with the lock pins 19 of the document table unit 35. A spring 34 constantly biases the lever 33 in such a direction that the lock pawls 32 engage with the lock pins 19. In this configuration, when the scanner unit 30 is closed, as shown in FIG. 27, the lock pawls 32 are engaged with the lock pins 19 to lock the scanner unit 30 to the document table unit 35. When the lever 33 is lifted against the action of the spring 34, the shaft 31 is rotated to release the lock pawls 32 from the lock pins 19. As a result, the scanner unit 30 is raised, or opened, away from the document table unit 35 about the hinges 36 to uncover the top of the unit 35 (table 1), as shown in FIG. 28.

The embodiment further includes a table press/fix switching device and a table retracting device, as follows. Each document table 1 is movable up and down via the link plate 10 and link arm 11 and constantly biased upward by the torsion spring 13, as stated previously. Therefore, when the scanner unit 30 is held in the closed position, FIG. 27, the tables 1 are constantly urged upward such that the book BO laid thereon in a spread position presses itself against the lower portion of the scanner unit 30. Usually, the scanning unit or carriage 200 included in the scanner unit 30 receives the pressure of the book BO. However, when the scanning unit 200 is moved away from the spread surface of the book BO, the table 1 and book BO protrude into the scanner unit 30 due to the tendency of the tables 1, preventing the unit 200 from moving smoothly. Therefore, it is necessary to fix, after the tables 1 have been raised to an adequate level, the tables 1 so as to prevent them and the book BO from protruding into the scanner unit 30 excessively. Furthermore, when the optical path for reading a document laid on the glass platen 206 is selected, it is necessary to retract the tables 1 to the lower portion of the document table unit 35, so that the upper surfaces of the tables 1 may not contact the lower portion of the scanning unit 200.

The document table press/fix switching device and document table retracting device are provided to meet the requirements stated above. FIGS. 29–34 show a specific construction implementing the functions of the two devices at the same time.

Figure 29:
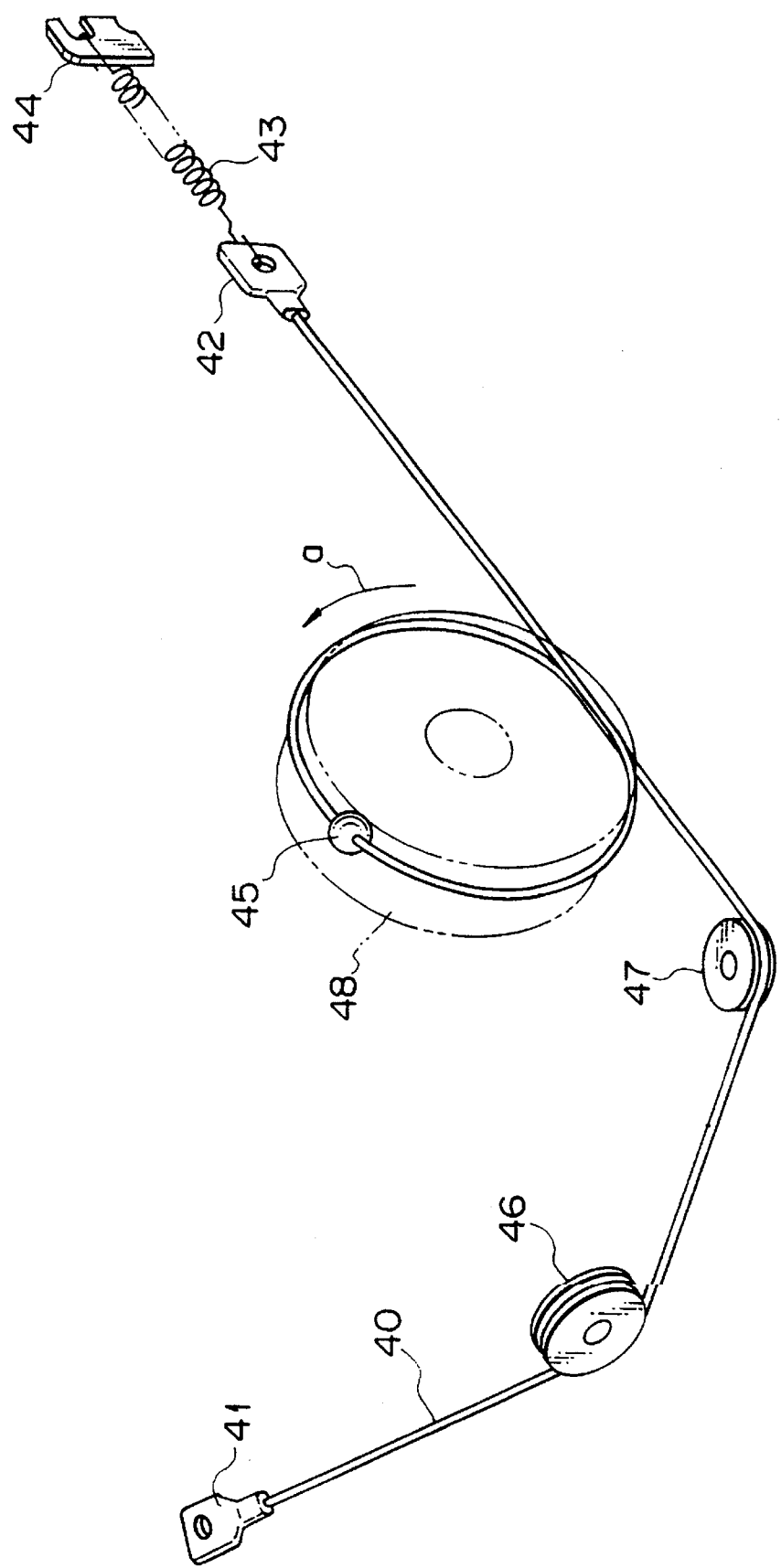
FIG. 29 is a perspective view of a table press/fix switching device included in the embodiment.
Figure 30:
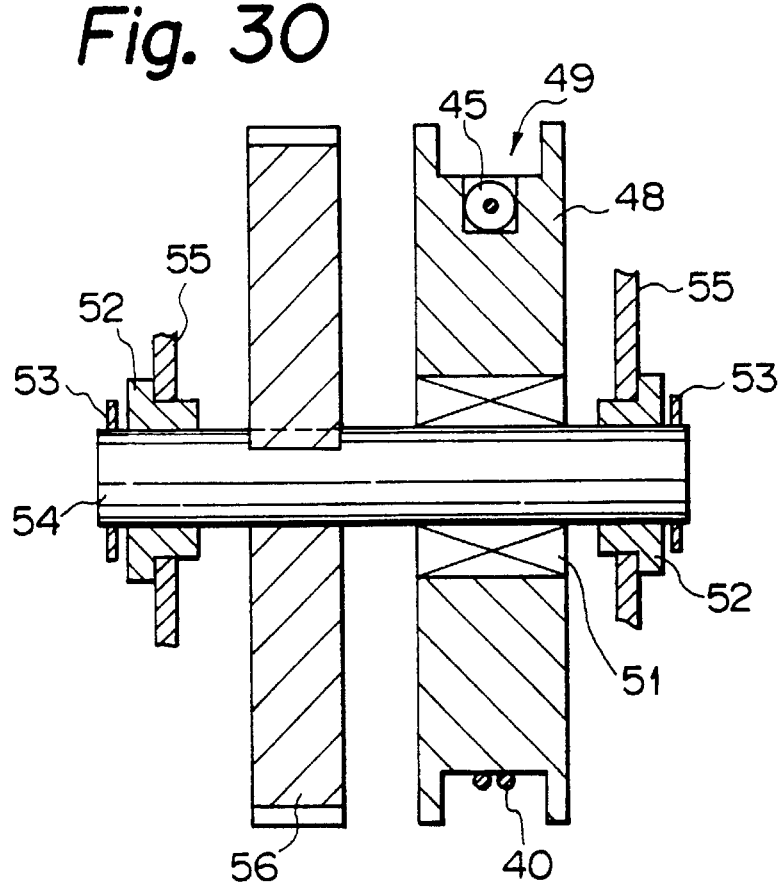
FIG. 30 is a section of the switching device.
Figure 31:
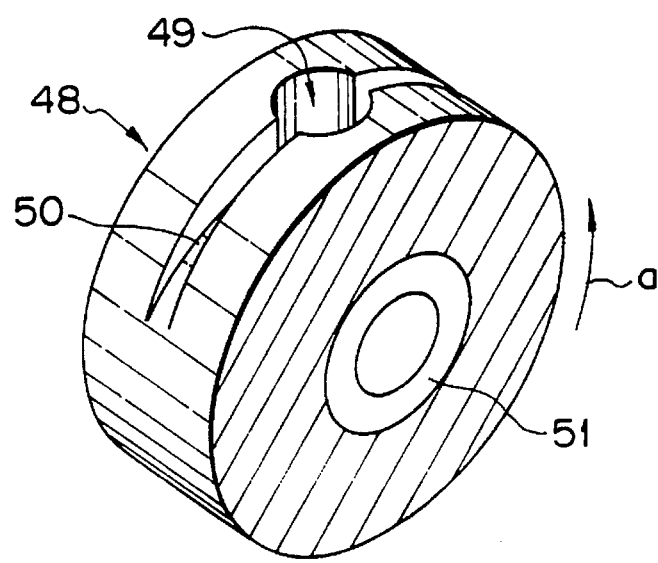
FIG. 31 is a fragmentary perspective view of the switching device.

As shown in FIG. 29, a control wire 40 is provided with hooks 41 and 42 at opposite ends thereof. A ball 45 is affixed to the control wire 40 at substantially the intermediate between opposite ends. The hook 41 is affixed to the outer end of the link plate 10, i.e., the end which moves up and down together with the table 1. The control wire 40 extending from the hook 41 is passed over pulleys 46 and 47 and wound around a control pulley 48. As shown in FIGS. 30 and 31, the control wire 40 is guided by a groove 50 formed in the control pulley 50, . The ball 45 affixed to the intermediate portion of the control wire 40 is received in a recess 49 also formed in the control pulley 50. This allows the movement of the control wire 40 to be surely converted to the rotary motion of the control pulley 48. A tension spring 43 is anchored at one end to the hook 42 and at the other end to a hook 44 which is affixed to the base 6 of the document table unit 35. Therefore, the control wire 40 is constantly pulled by the tension spring 43.

As shown in FIG. 30, the control pulley 48 is mounted on a shaft 54 via a one-way clutch 51. The shaft 54 is journalled to opposite side plates 55 by slide bearings 52. E-rings 53 are fitted on opposite ends of the shaft 54. In this configuration, the control pulley 48 is freely rotatable relative to the shaft 54 in a direction indicated by an arrow a in FIG. 31. However, the control pulley 48 is prevented from rotating relative to the shaft 54 in the other direction by the one-way clutch 51; the former is rotatable only integrally with the shaft 54. As a result, when the shaft 54 is held unrotatable by a mechanism which will be described, the control pulley 48 is rotatable only in the direction a (also shown in FIG. 29), i.e., in the direction in which the table 1 moves downward.

How the table press/fix switching device moves the tables 1 downward and automatically fix them in place is as follows. In FIGS. 29–31, assume that the shaft 54 is held unrotatable, and that the tables 1 are urged downward by some force, e.g., the weight of the book BO or the pressure exerted by the pages turned over. Then, the end portion of each control wire 40 adjoining the hook 41 slackens since the hook 41 is affixed to the table 1. At the same time, the control pulley 48 is pulled by the tension spring 43 and rotated in the direction a while absorbing the slack of the control wire 40. Consequently, the control wire 40 is moved toward the hook 44 while maintaining the initial tension thereof. At this instant, the control pulley 48 is prevented from rotating in the direction opposite to the direction a by the one-way clutch 51. Hence, even when the force urging the table 1 upward is greater than the force urging it downward, it does not cause the control pulley 48 to rotate in the direction opposite to the direction a. As a result, the control pulley 48 is held in a halt at the position rotated in the direction a. At the same time, the movement of the control wire 40 is stopped. This maintains the table 1 in the position lowered by the extraneous force.

Figure 32:
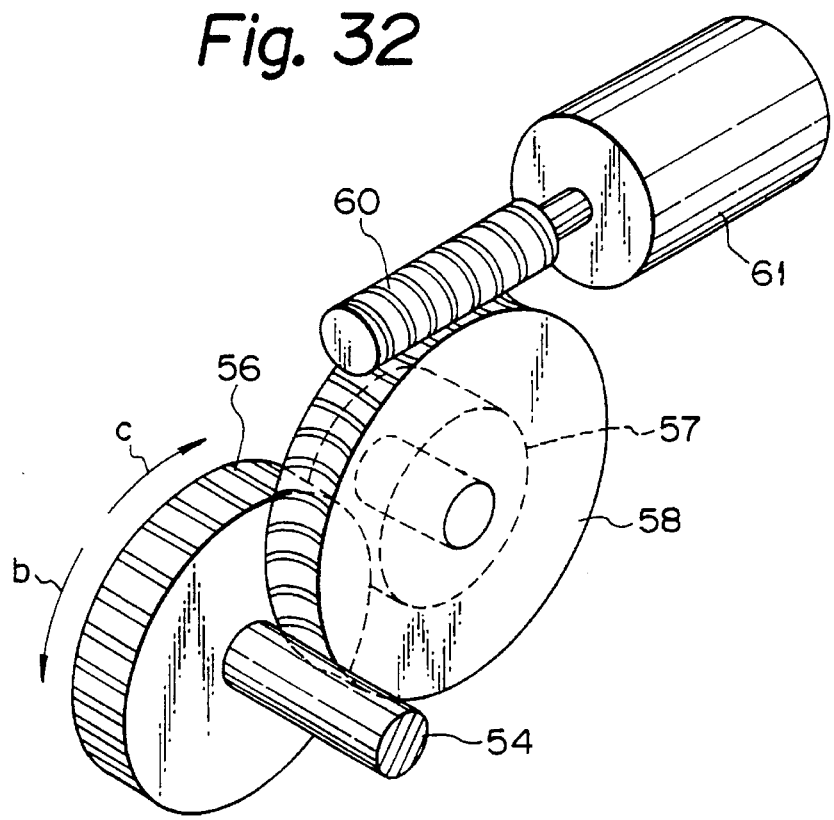
FIG. 32 is a perspective view of a section for driving the switching device.
Figure 33:
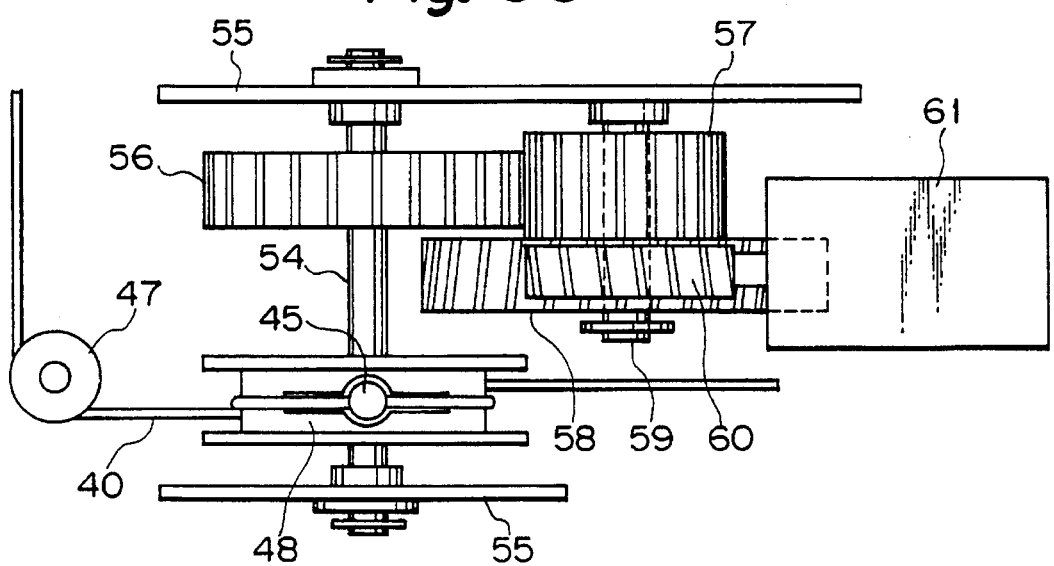
FIG. 33 is a plan view of the switching device.

A mechanism for raising and lowering the respective table 1 will be described. As shown in FIG. 32, a gear 56 is mounted on and rotatable integrally with the shaft 54. As shown in FIG. 33, the gear 56 is held in mesh with a gear 57 which is rotatably supported by a stud 59 which is in turn affixed to one of the side plates 55. The gear 57 is formed integrally with a worm wheel 58. A worm gear 60 is affixed to the output shaft of a motor 61 and held in mesh with the worm wheel 58. In this condition, when the motor 61 is not energized, the worm wheel 58 cannot rotate due to the engagement of the worm gear 60 and worm wheel 58. Hence, the shaft 54 connected to the worm wheel 58 via the gears 56 and 57 is prevented from rotating.

The operation for retracting the tables 1 to the lower portion of the document table unit 35 is as follows. In FIGS. 32–34, when the motor 61 is driven to rotate the gear 56 in a direction indicated by an arrow b, it causes the control pulley 48 and shaft 54 to rotate integrally with each other via the one-way clutch 51. As the control pulley 48 rotates in the direction a, FIG. 29, the control wire 40 is moved toward the hook 44. The wire 40, in turn, lowers the associated table 1, as shown in FIG. 34. As a result, the upper surfaces of the right and left tables 1 (in the embodiment, the spread surface of the book BO) are moved downward away from the scanning unit 200. Such a retracting operation is performed when a power switch, not shown, provided on the TPS is turned on, when the TPS is held in a stand-by condition, and when the TPS reads a document laid on the glass platen 206.

The tables 1 are urged toward the upper portion of the document table unit 1, as follows. In FIGS. 32–34, assume that the motor 61 is driven in the opposite direction to the direction stated above, causing the gear 56 to rotate in a direction c. Then, the shaft 54 is rotated in the direction opposite to the direction a, FIG. 29. This allows the control pulleys to freely rotate relative to the shaft 54 via the one-way clutch 51. In the illustrative embodiment, each torsion spring 13, biasing the associated table 1 upward, exerts a force greater than the force pulling the control wire 40 downward. Therefore, when the control pulley 48 is free to rotate in the direction opposite to the direction a, the control wire 40 is moved toward the hook 41 due to the action of the spring 13. Consequently, in FIG. 34, the right and left tables 1 are raised to urge the spread surface of the book BO against the scanning unit 200. When the motor 61 is continuously driven in such a condition, the shaft 54 becomes freely rotatable relative to the control pulley 48 via the one-way clutch 51 with the result that the surface of the book BO is continuously pressed against the scanning unit 200. This pressing operation is performed only when the scanning unit 200 is positioned above the tables 1.

As shown in FIG. 34, the right and left tables 1 are each provided with the above-described table press/fix switching device and table retracting device. These devices associated with the tables 1 are controlled independently of each other. Specifically, as shown in FIG. 21, two motors 61 are provided to drive the respective switching devices and retracting devices. The motors 61 are controlled by the TPS control board 110 independently of each other via respective table motor drivers 121.

Figure 35:
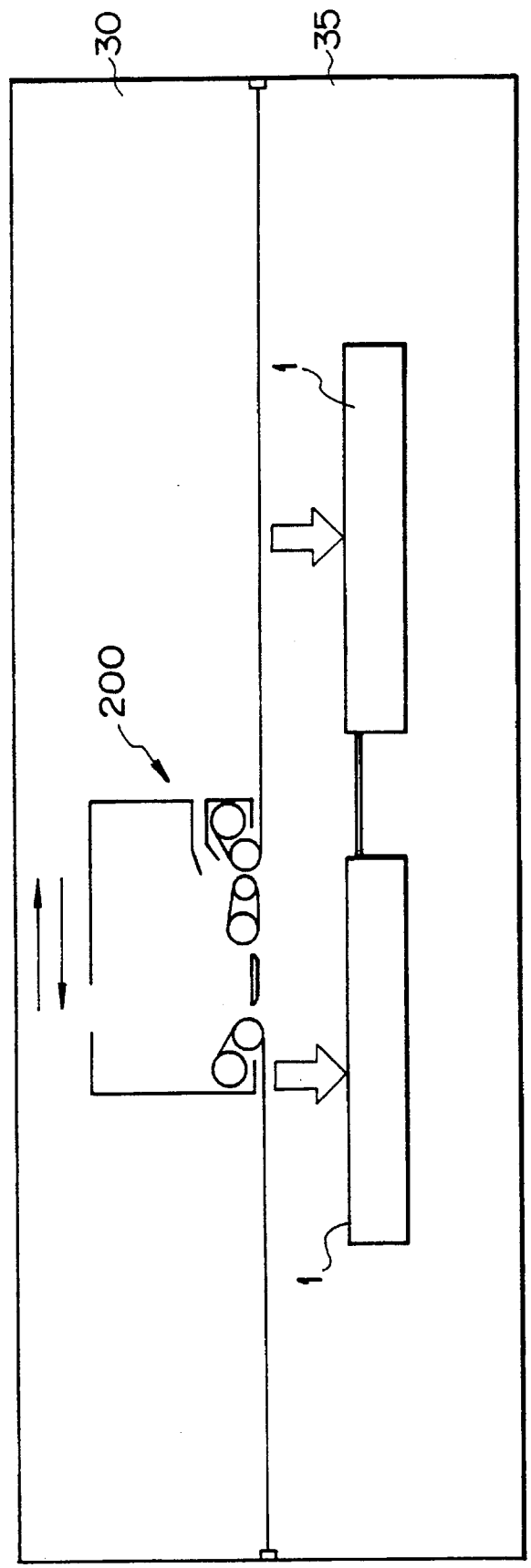
FIG. 35 is a side elevation showing how the document tables are lowered.
Figure 36:
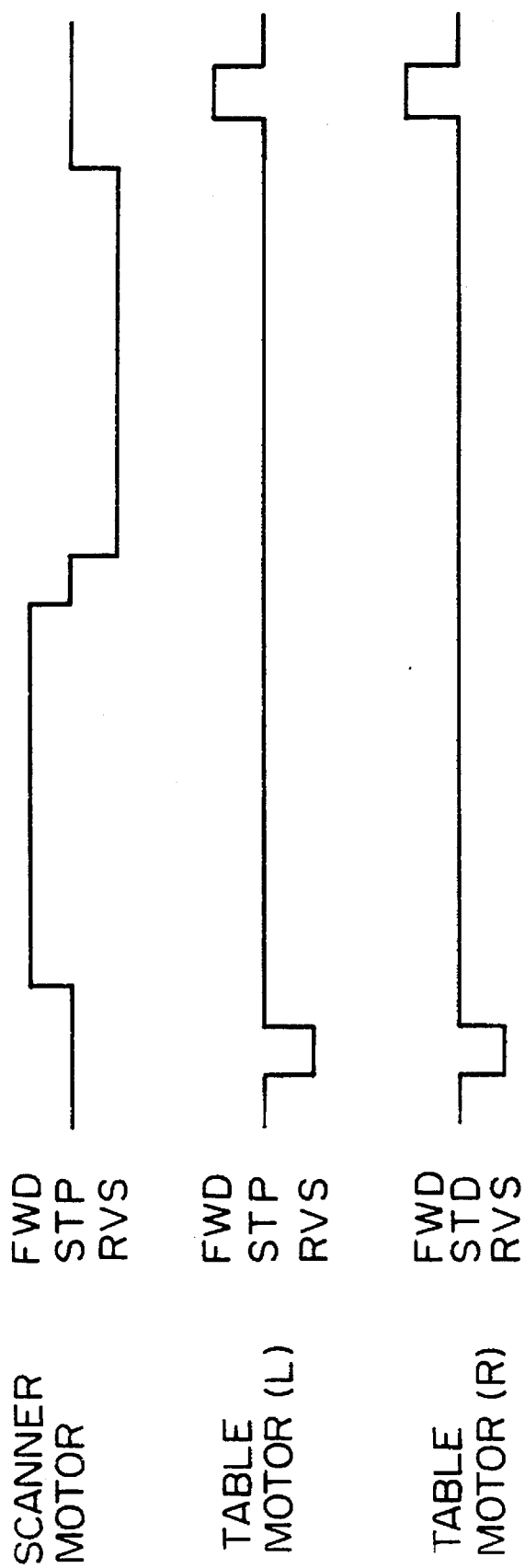
FIG. 36 is a timing chart associated with FIG. 35.

The downward movement of the document tables 1 in the retraction mode is shown in FIG. 35. FIG. 36 is a timing chart associated with FIG. 35. As shown in FIG. 36, before the scanning unit 200 starts moving, the right and left motors 61 are each reversed by a predetermined number of rotations. As a result, the right and left tables 1 are lowered, as shown in FIG. 35. Subsequently, the scanner motor 106 is driven to move the scanning unit 200 in the predetermined scanning direction. The scanning movement of the unit 200 is repeated, as needed. At the end of the retraction mode, the motors 61 are each rotated in the forward direction by a predetermined number of rotations, thereby raising the tables 1 to their original positions.

Figure 37:
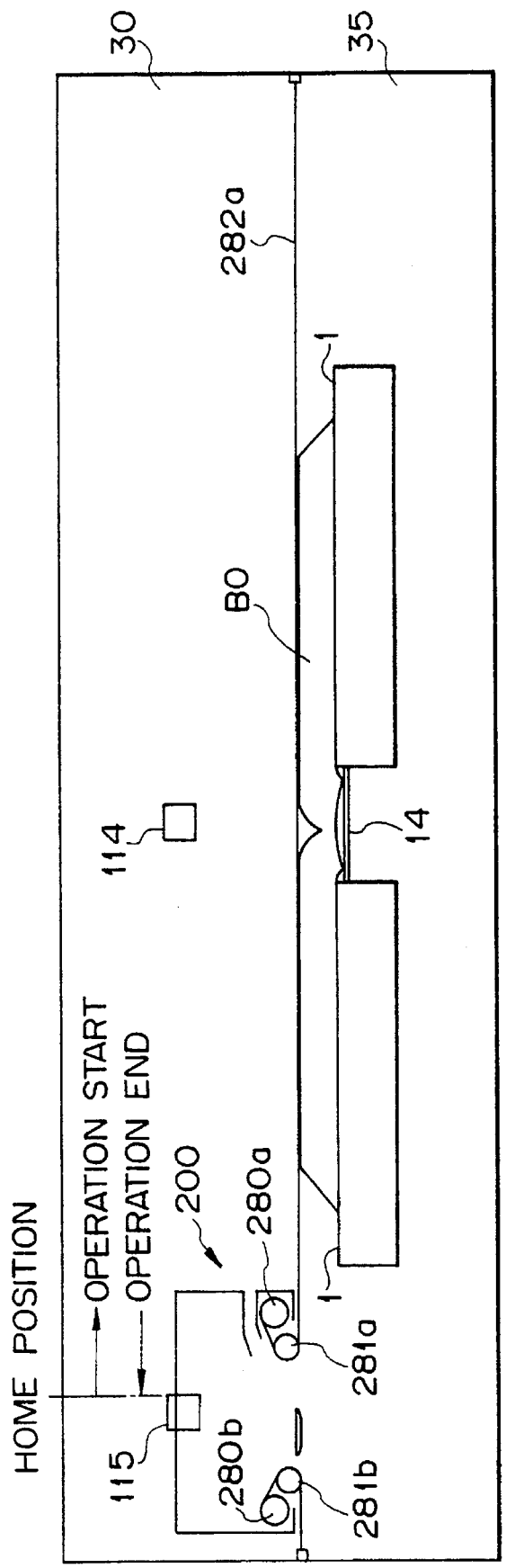
FIGS. 37–41 each show the scanning unit in a particular condition to occur during a table press/fix mode operation.
Figure 38:
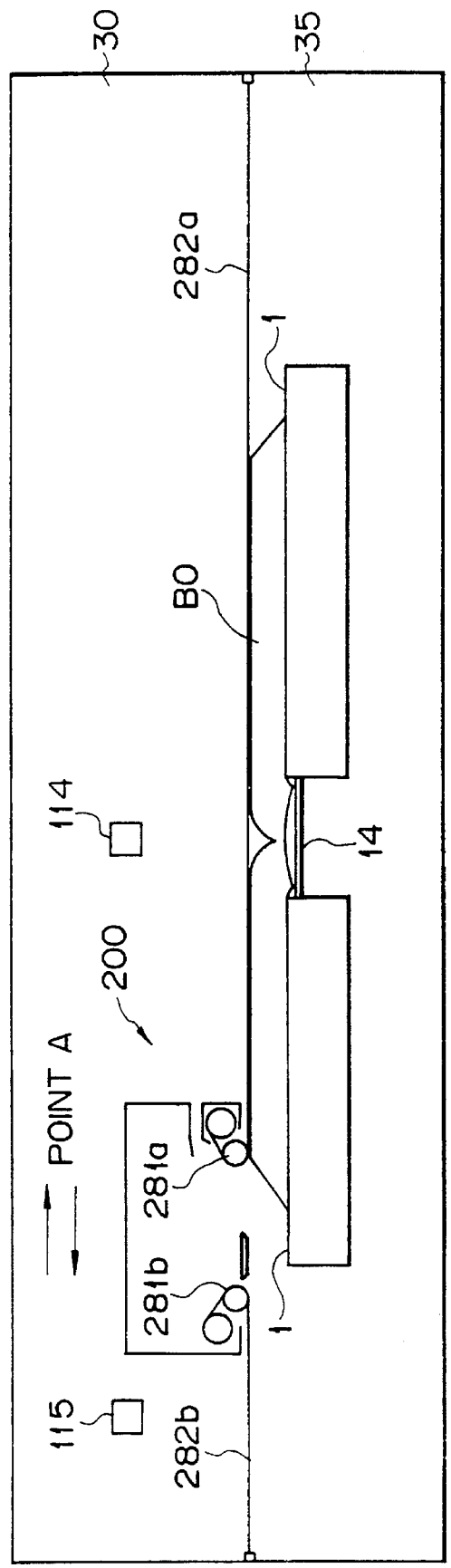

A mode for pressing or fixing the document tables 1 is as follows. As shown in FIG. 37, to set the book BO on the TPS, the operator puts the back of the book BO on the back support sheet 14, unlocks the size stops 27, FIG. 25, and moves the slide plates 3 in matching relation to the thickness of the book BO. As a result, the back of the book BO is held between the inner ends of the two tables 1. Subsequently, the operator fixes the slide plates in position by the associated size stops 27, opens the book BO to show the page to be read first, sets the book BO on the tables 1 in the spread position, and then closes the scanner unit 30. Consequently, as shown in FIG. 27, the lock pawls 32 are respectively caught by the lock pins 19, locking the scanner unit 30 to the document table unit 35 in the closed position. At this instant, the lock sensor 20 determines that the scanner unit 30 has been closed.

Figure 39:
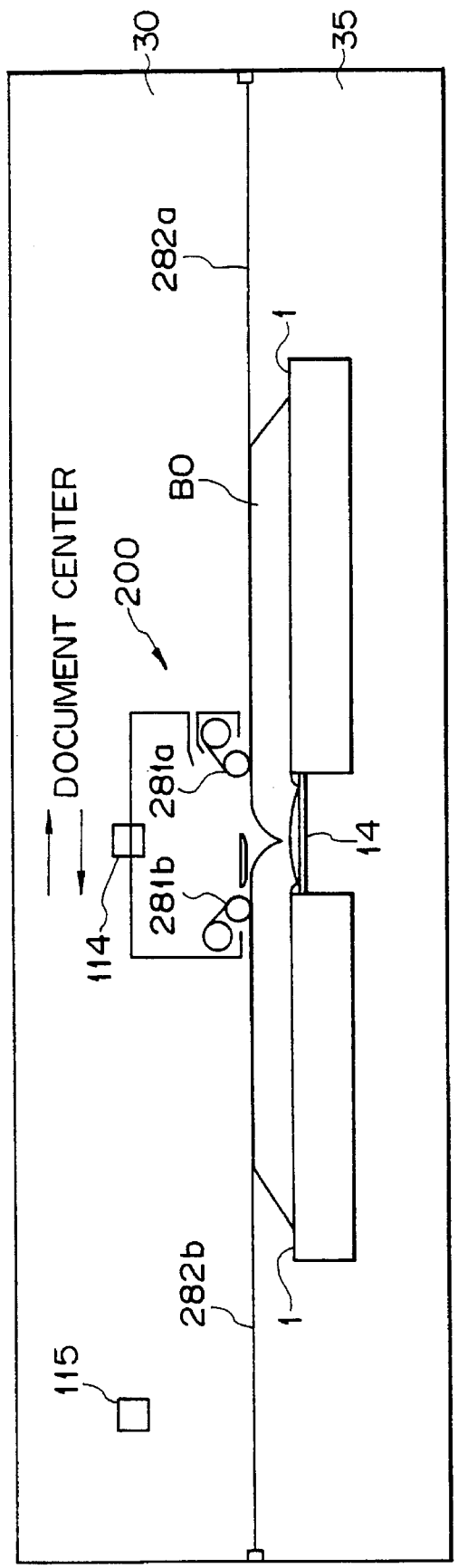

At the end of operation of the TPS, the scanning unit 200 is returned to the center home position, i.e., the center of the spread book BO, as shown in FIG. 39. Hence, even when the book BO is set on the TPS, the scanning unit 200 is located at the center home position. This allows the book BO to be positioned with the center of the TPS as a reference. It follows that when the scanner unit 30 is closed, the book BO can be surely pressed without regard to the size thereof. Moreover, since the book BO is set with the center as a reference, it is relatively easy to set up control timings (read start timing, read end timing, page turn timing, etc.) when the pages of the book BO are turned over on the tables 1. In addition, the center-based book setting scheme facilitates the detection of the edges of the book BO.

Assume that the TPS reads a document laid on the glass platen 206 of the scanner unit 30, i.e., in a sheet mode. In this case, the right edge of the scale 207 located at the left of the glass platen 206 defines a reference document set position, as shown in FIG. 34. Hence, the reference set position is the position for starting reading the document. Therefore, the document is set on the glass platen with the edge thereof serving as a reference. This allows the TPS to start reading a document at the same point at all times, thereby simplifying the control over the TPS.

When the TPS starts on a sheet mode operation for reading a document on the glass platen 206, it is moved to the left from the center home position and then stopped at the end home position, FIG. 37, where it is sensed by the end HP sensor. In this condition, the TPS waits until reading conditions have been input and a start button has been pressed.

In an alternative arrangement, the scale 207 is located at the right of the glass platen 206, i.e., the side where the TPS begins to turn the page of the book BO. Then, after documents have been loaded on both the document tables 1 and the glass platen 206, the scanning unit 200 can read the document on the glass platen 206 while turning over the page of the book BO spread on the tables 1. In this case, the optical path of the scanning unit 200 is switched over at the time when the page of the book BO should be turned over, as will be described later specifically. Then, the reading direction of the scanning unit 200 in the subscanning direction is identical on both the tables 1 and the glass platen 206, so that papers will be discharged in the same direction in the event of printing. This makes it needless to reverse the memory.

In another mode available with the TPS, the book BO and the sheet document SO are set on the document tables 1 and the glass platen 206, respectively. In this condition, the scanning unit 200 is moved from the end home position to read the book BO on the tables 1 and then returned while turning over the page of the book BO and reading the sheet document SO on the glass platen 206 at the same time. In this case, the sheet document SO can be set on the glass platen 206 and read even when the book BO is being read while having the pages thereof turned over.

Image data representative of the sheet document SO on the glass platen 206 are mirrored and then written to the frame memory 104 without regard to the side where the scale 207 is located on the glass platen 206.

Regarding the depthwise direction, the book BO and the sheet document SO are respectively set on the tables 1 and the glass platen 206 with their front edges abutted against reference members. This allows such documents to be positioned easily.

In the illustrative embodiment, when the scanning unit 200 starts moving, the center HP sensor 114 again determines whether the unit 200 is located at the center home position. When the operation and display control section 111, FIG. 21 sends a start signal, the scanning unit 200 is moved to the left from the center home position and then stopped at the end position to which the end HP sensor 115 is responsive.

Figure 42:
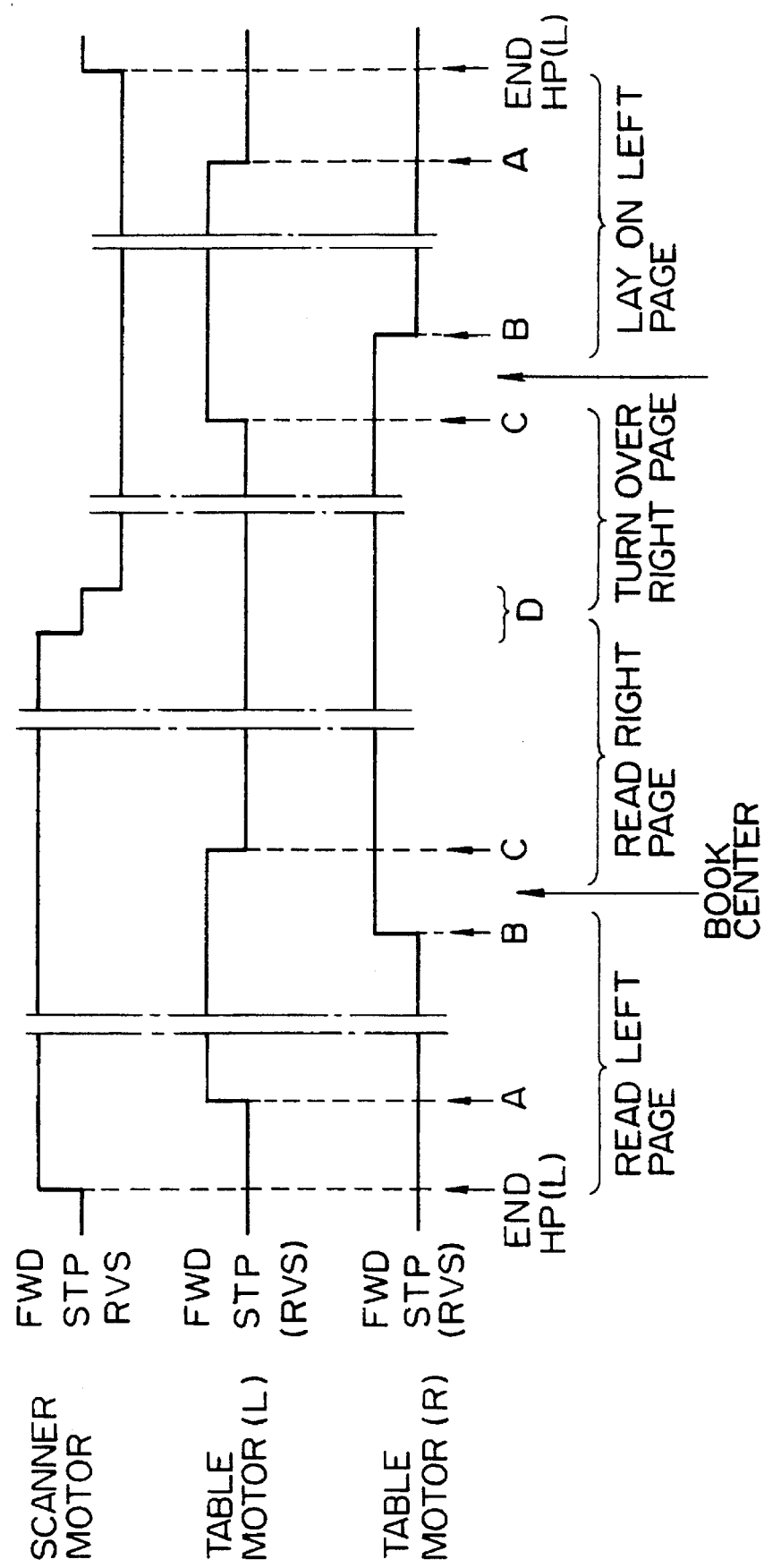
FIG. 42 is a timing chart representative of the operations of a scanner motor and a right and a left elevation motor to occur in the table press/fix mode.

FIGS. 37–41 demonstrate the movement of the scanning unit 200 in the table press/fix mode. FIG. 42 is a timing chart associated with FIGS. 37–41. As shown in FIG. 37, the end home position of the scanning unit 200 defines a point where the scanning unit 200 starts on a reading and page turning movement and a point where it ends such a movement. At the end home position, the scanning unit 200 does not overlie the table 1. In the table press/fix mode, the scanner motor 106 of the scanning unit 200 is driven in the forward direction to move the unit 200 to the right, as viewed in FIG. 37. When a right press roller 281a included in the scanning unit 200 arrives at the left edge of the book BO (point A, FIG. 38), the left table motor 61 is rotated in the forward direction to raise the left table 1. As a result, the book BO is pressed against the scanning unit 200 and, therefore, read in an optimal condition. As shown in FIG. 39, slightly before the scanning unit 200 arrives at the center of the book BO, the right press roller 281a reaches the left end of the right table 1 (point B, FIG. 42). At this time, the right table motor 61 is driven in the forward direction to raise the right table 1. Subsequently, the scanning unit 200 moves over the center of the book BO and starts reading the right page of the book BO. When a left press roller 281b arrives at the right end of the left table 1 (point C, FIG. 42), the left table motor 61 is deenergized to restore the right table 1 to the fixed state. As a result, the book BO is fixed in place by being pressed by a press sheet 282b and without protruding into the scanner unit 30. The book BO is held at this level until the scanning unit 200 moves over it again.

Figure 40:
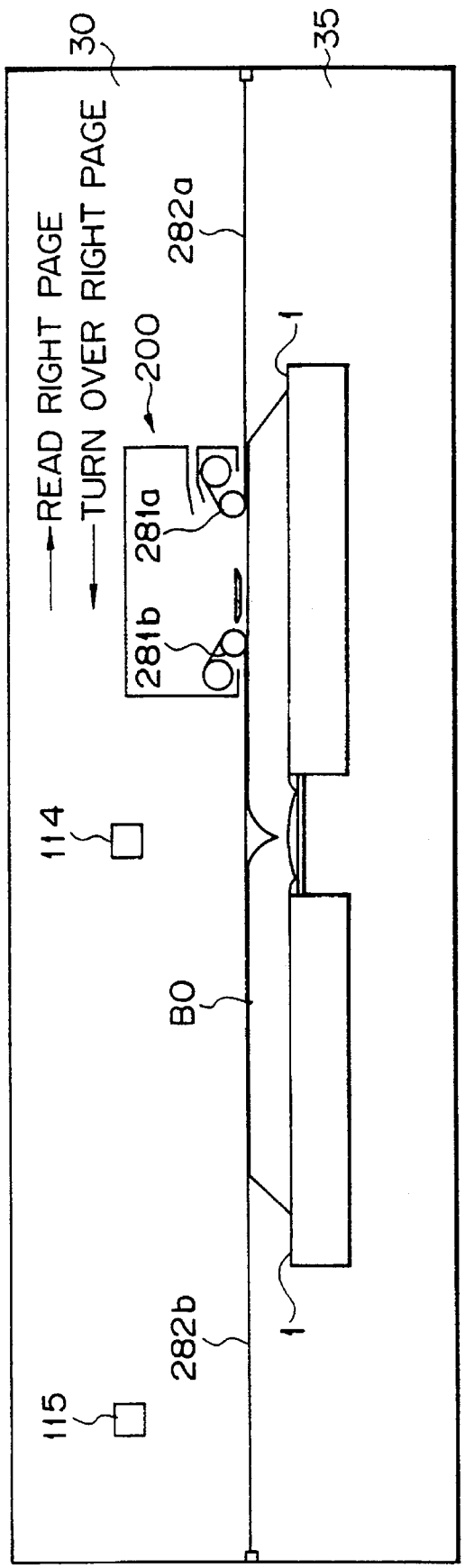
Figure 41:
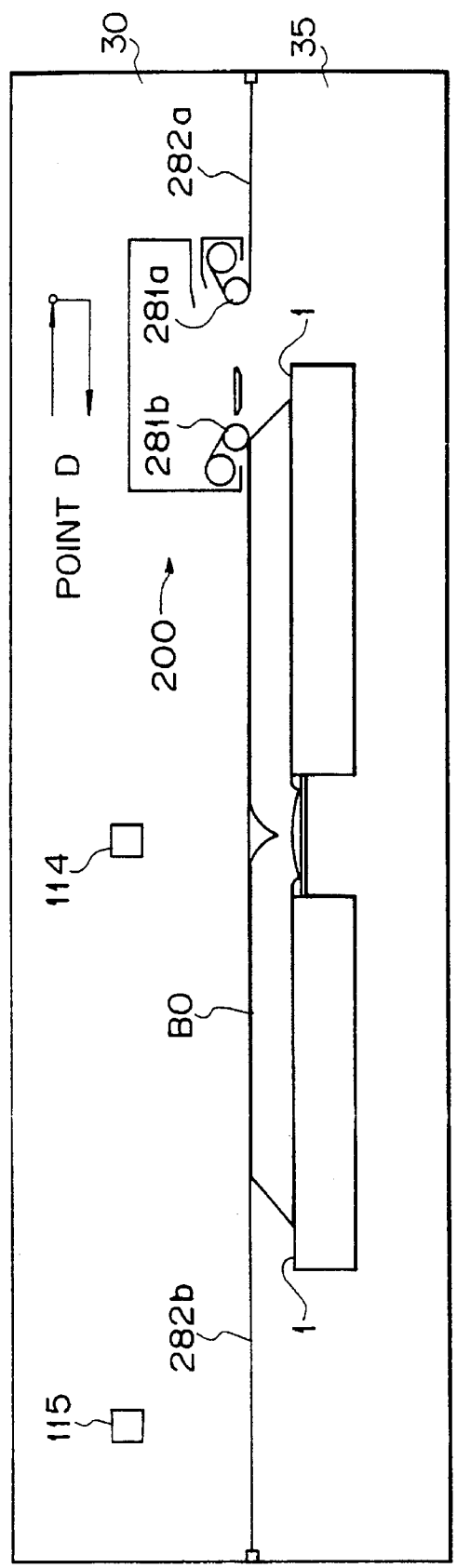

FIG. 40 shows the operation of the scanning unit 200 to occur when the unit 200 reads the right page of the book BO or turns the right page thereof. The scanning unit 200 read the right page of the book BO is brought to a stop when the left press roller 281b arrives at the right end of the right table 1 (point D, FIG. 41). Then, the scanner motor 106 is reversed to move the scanning unit 200 to the left, as viewed in FIG. 41. As a result, the scanning unit 200 moves to the left while carrying the right page or leaf of the book BO therewith. Slightly before the scanning unit 200 reaches the center of the book BO, FIG. 39, the left press roller 281b arrives at the right end of the left table 1 (point C). At this time, the left table motor 61 is driven in the forward direction to raise the left table 1. As the scanning unit 200 moves over the center of the book BO, it starts laying the right page on the left page. Subsequently, the right press roller 281a reaches the left end of the right table 1 (point B). At this time, the right table motor 61 is deenergized to restore the right table 1 to the fixed position. As a result, the book BO is fixed in place by being pressed by a press sheet 282a and without protruding into the scanner unit 30. The book BO is held at this level until the scanning unit 200 moves over it again. Finally, the scanning unit 200 is brought to a stop at the end home position shown in FIG. 37.

Figure 43:
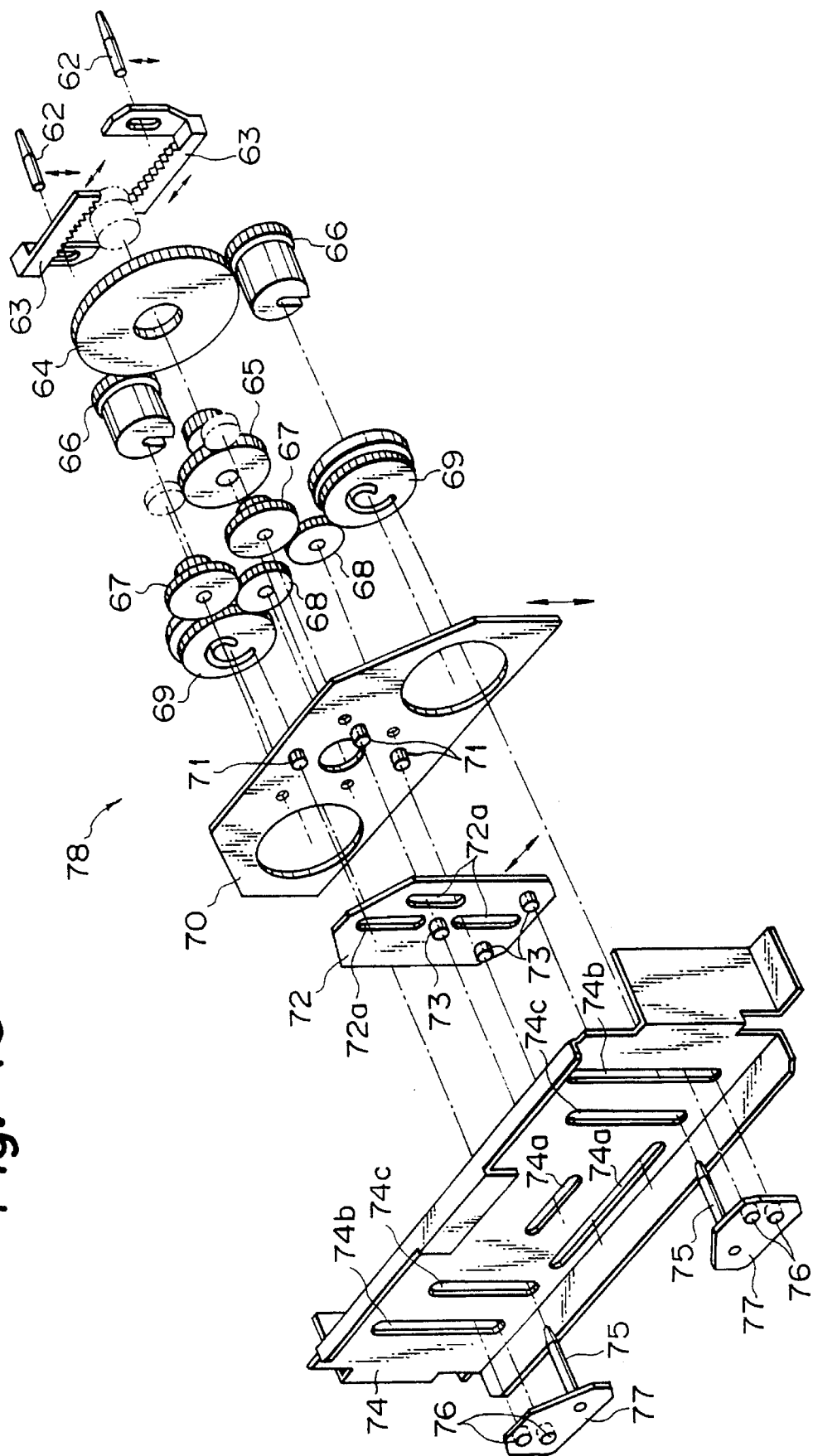
FIG. 43 is an exploded perspective view of a slider for determining the thickness of a book document laid on the document tables and a difference between the spread right and left parts of the document.
Figure 44:
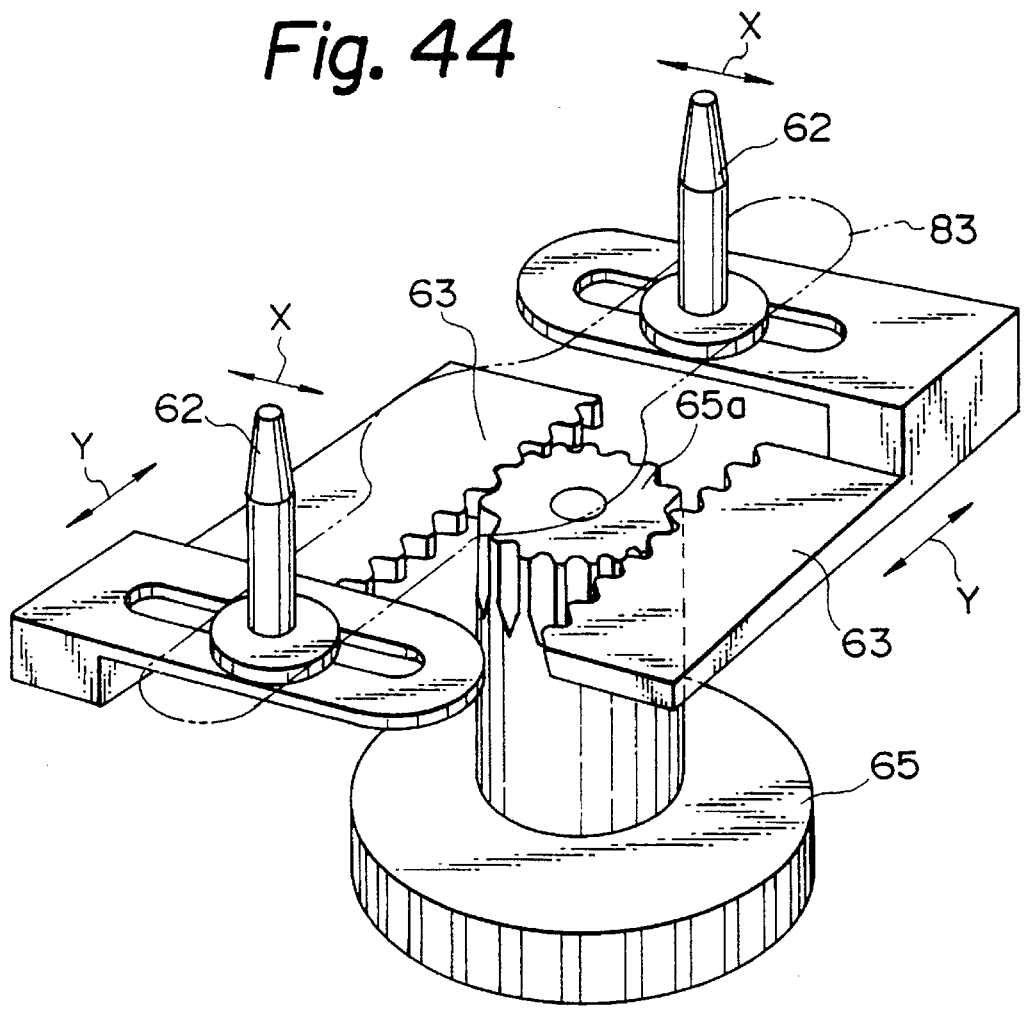
FIG. 44 is a perspective view of pins, racks and so forth forming an input section included in the slider.

FIG. 43 shows a slider 78 in an exploded perspective view. As shown, a pair of pins 62 play the role of a portion for sensing the thickness of the book BO and a difference between the right and left parts of the book BO in the spread position. The pins 62 are respectively mounted on a pair of racks 63 which are slidable relative to each other. The pins 62 are each movable in the direction perpendicular to the sliding direction of the associated rack 63. As shown in FIG. 44, the pins 62 and racks 63 face each other with the intermediary of a small gear 65a which forms a part of a stepped pinion gear 65. The racks 63 are held in mesh with the small gear 65a. In this configuration, as the pins 62 are moved toward or away from each other, the racks 63 are moved in opposite directions due to a change in the distance between the pins 62. As a result, the stepped pinion gear 65 is caused to rotate.

Figure 45:
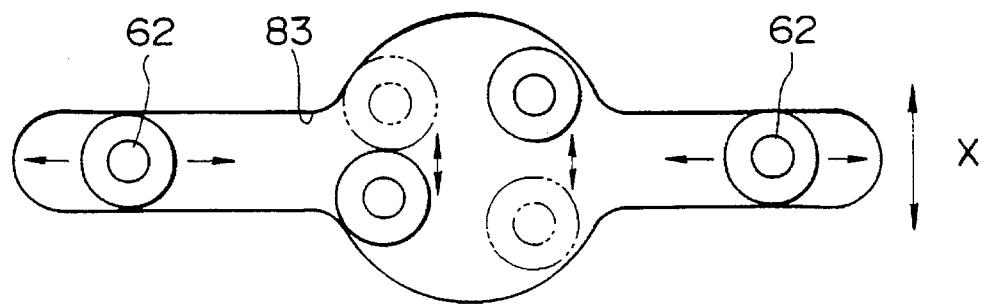
FIG. 45 is a view showing how the pins of the input section are driven.

The pins 62 are movable together with the respective racks 63 in a direction indicated by a double-headed arrow Y in FIG. 44. Since the racks 63 are held in mesh with the small gear 65a, the pins 62 are symmetrical to each other with respect to the axis of the stepped pinion gear 65. The pins 62 have their base ends received in a restricting slot 83 formed in a cover, not shown. As shown in FIG. 45, the pins 62 are not movable in a direction X when remote from each other or movable in the direction X when close to each other.

Figure 46:
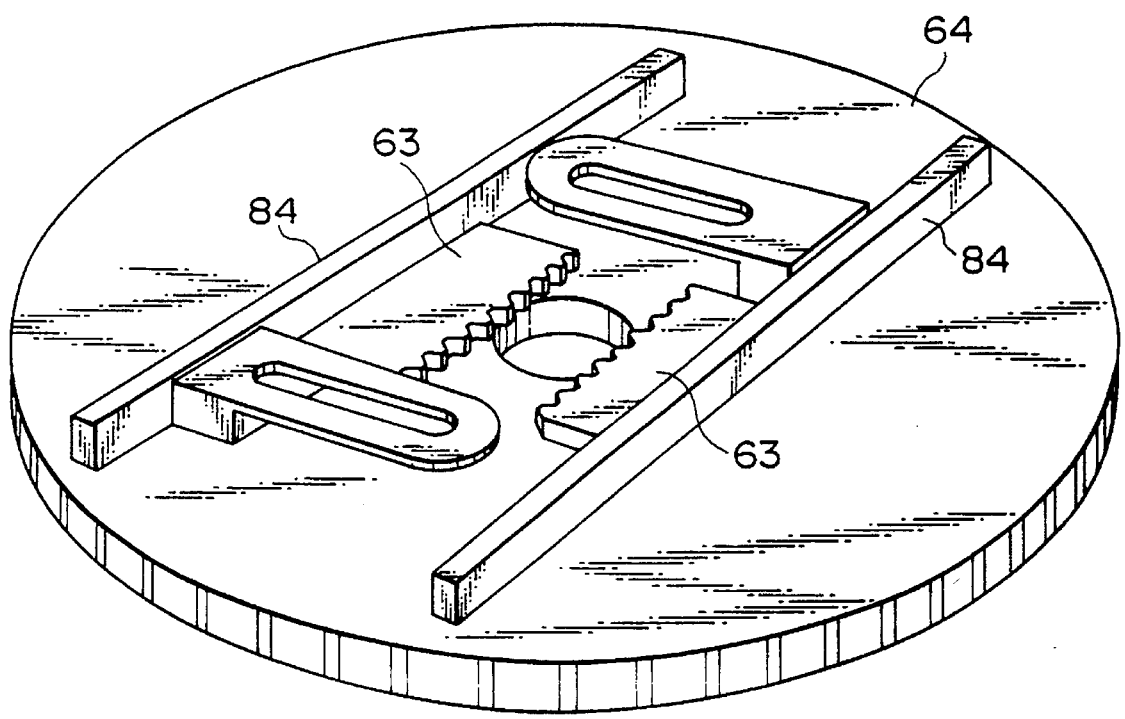
FIG. 46 is a perspective view showing a positional relation between the racks and a large gear.

As shown in FIG. 46, the racks 63 are respectively guided by a pair of guides 84 provided on a large gear 64. The racks 63 are slidable on and along the end face of the large gear 64.

Figure 47:
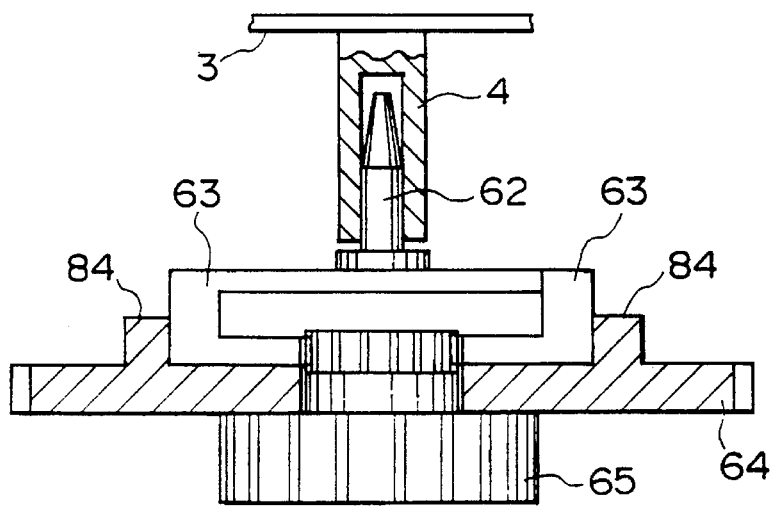
FIG. 47 is a section representative of the arrangement of the pins, racks and so forth.
Figure 48:
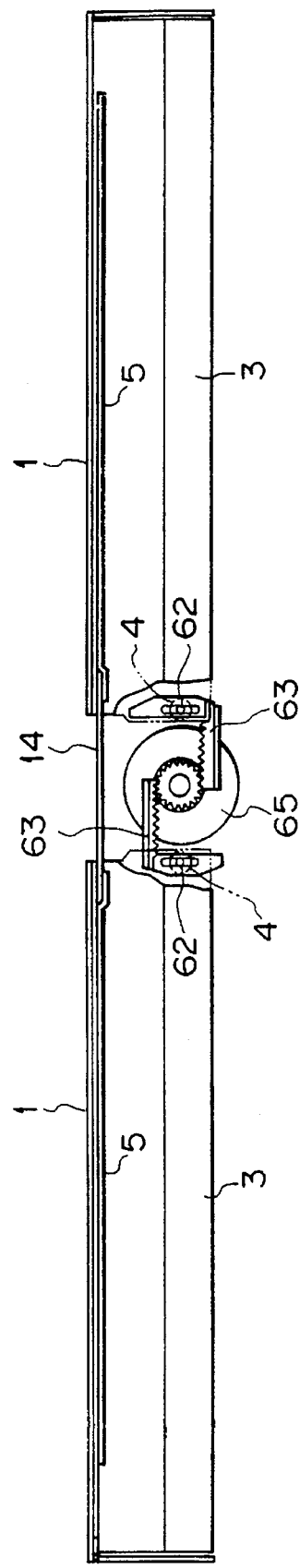
FIG. 48 is a side elevation showing a positional relation between the pins, racks and so forth and the right and left document tables.

FIG. 47 is a section showing a section where the slider 78 is connected to the tables 1. As shown, the large gear 64 is formed with a hole at the center thereof. The stepped pinion gear 65 is received in the hole of the gear 64 from the rear of the gear 64. The small gear 65a of the pinion gear 65 is held in mesh with the racks 63 at the front of the gear 64. As shown in FIGS. 47 and 48, the pins 62 are respectively received in holes formed in the adjust studs 4 which are respectively affixed to the slide plates 3 of the tables 1.

Figure 49:
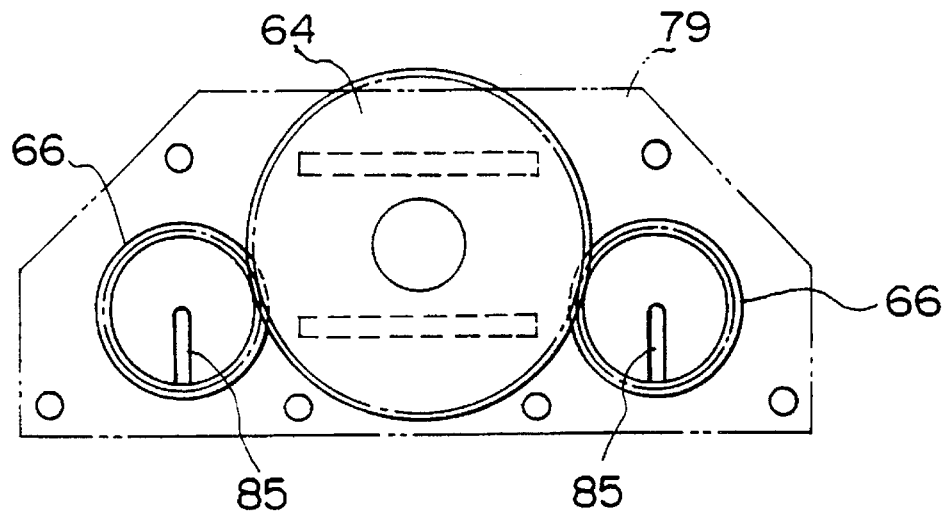
FIG. 49 is a side elevation showing a relation between the large gear and slide output gears.

As shown in FIG. 49, the large gear 64 is held in mesh with slide output gears 66. The gears 64 and 66 are rotatably mounted on a support plate 79. The gear ratio of the gear 64 to each gear 66 is selected to be 2:1.

Figure 50:
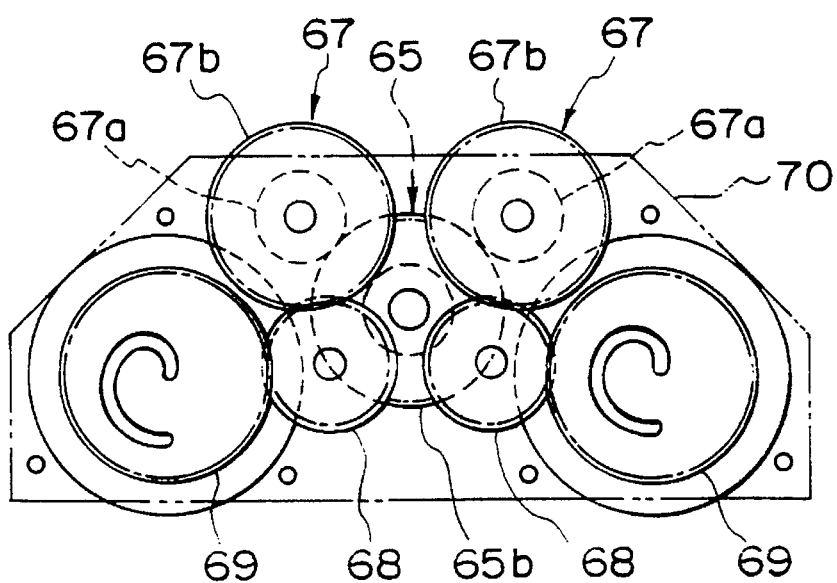
FIG. 50 is a side elevation showing a relation between a stepped pinion gear and cam gears.

As shown in FIG. 50, a large gear 65b forming the other part of the stepped pinion gear 65 is held in mesh with small gears 67a of a pair of stepped gears 67; the gear ratio of the former to the latter is 2:1. The gears 65 and 67 and idle gears 68 are each rotatably supported by a particular stud, not shown, which is affixed to a side plate 70. Further, a pair of cam gears 69 are also rotatably mounted on the support plate 79, FIG. 49.

Figure 51:
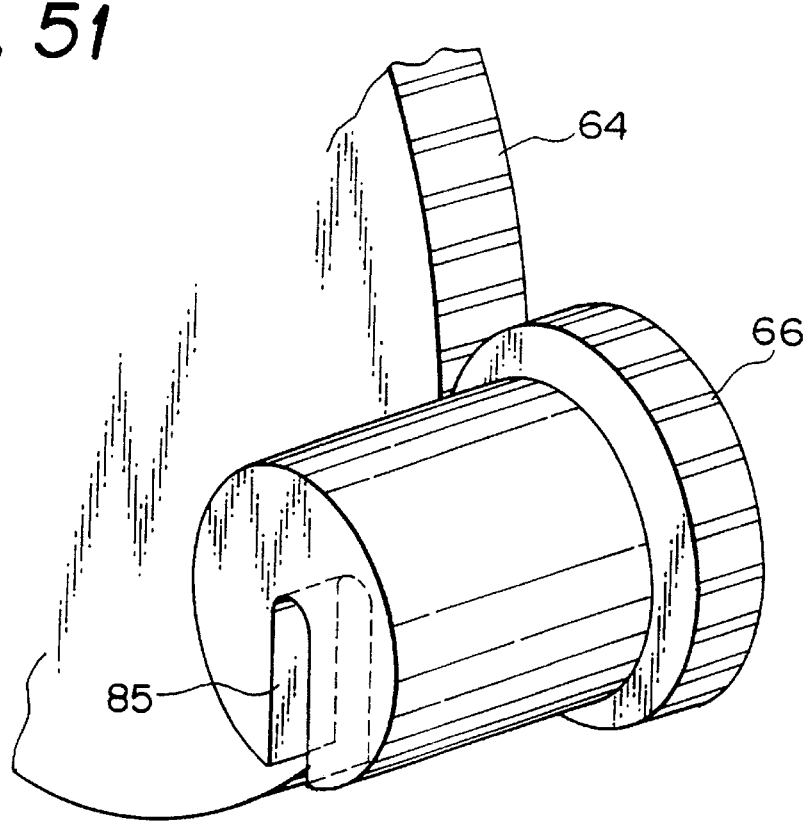
FIG. 51 is a perspective view showing a positional relation between the large gear and the slide output gear.
Figure 52:
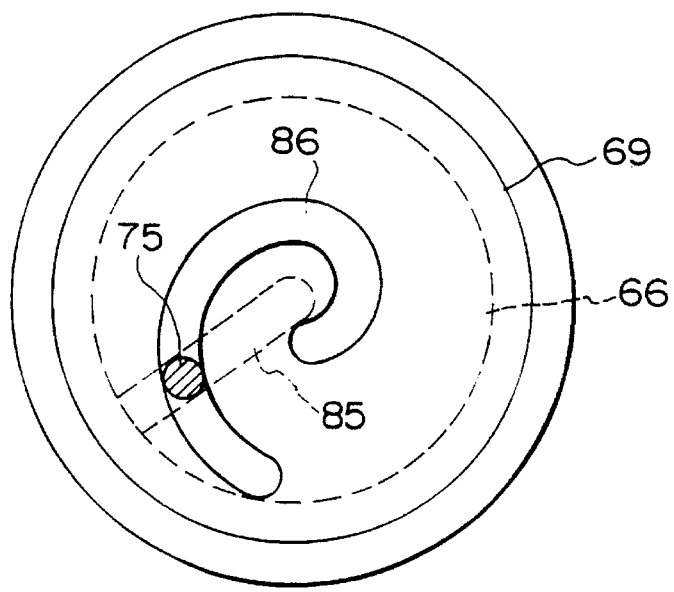
FIG. 52 is a plan view showing a positional relation between the slide output gear, cam gear and output pin.
Figure 53:
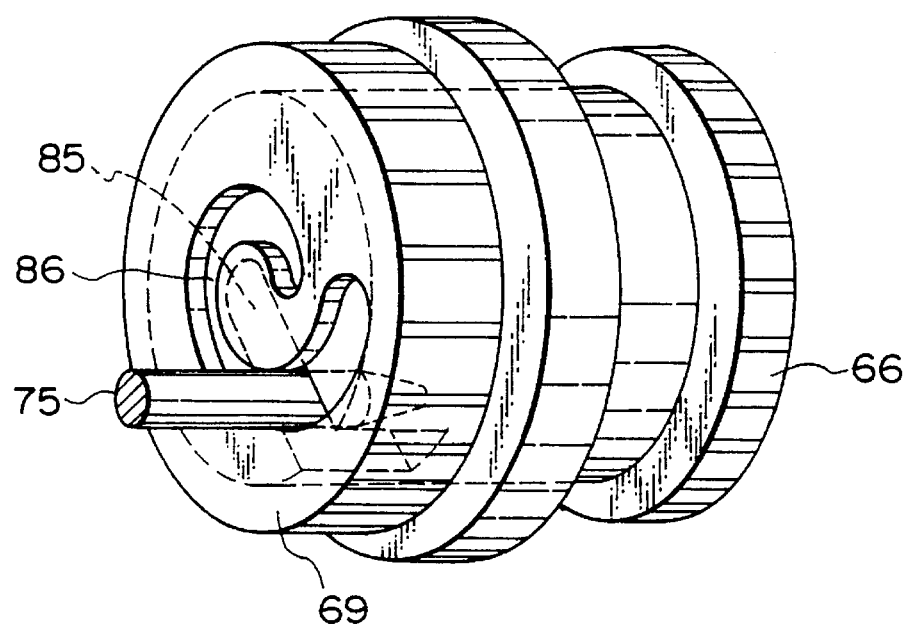
FIG. 53 is a perspective view showing a positional relation between the slide output gear, cam gear and output pin.

As shown in FIG. 51, each slide output gear 66 has a boss which is formed with an adjust groove 85. This groove 85 extends from the periphery of the boss to a point past of the axis of the boss. As shown in FIGS. 52 and 53, each cam gear 69 is provided with a hollow cylindrical configuration and formed with a spiral groove 86 in one end thereof. As also shown in FIGS. 52 and 53, the slide output gears 66 are respectively received in the hollow cam gears 69. The adjust groove 85 of each slide gear 66 and the spiral groove 86 of the associated cam gear 69 form an opening by intersecting each other. A pin 75, which will be described, is received in such an opening. This opening shifts due to the relative rotation of the cam gear 69 and slide output gear 66, moving the output pin 75. The displacement of the output pin 75 is selected to be one half of the displacement of the pins 62. Further, when the gears 69 and 66 are rotated at the same time, the opening defined by the intersecting grooves 85 and 86 moves in a circular motion whose radius is defined by the distance between the axis of the aligned gears 69 and 66 and the output pin 75. The radius of the circular motion is selected to be one half of the radius of the circular motion of the pin 62 caused by the rotation of the large gear 64.

Figure 54:
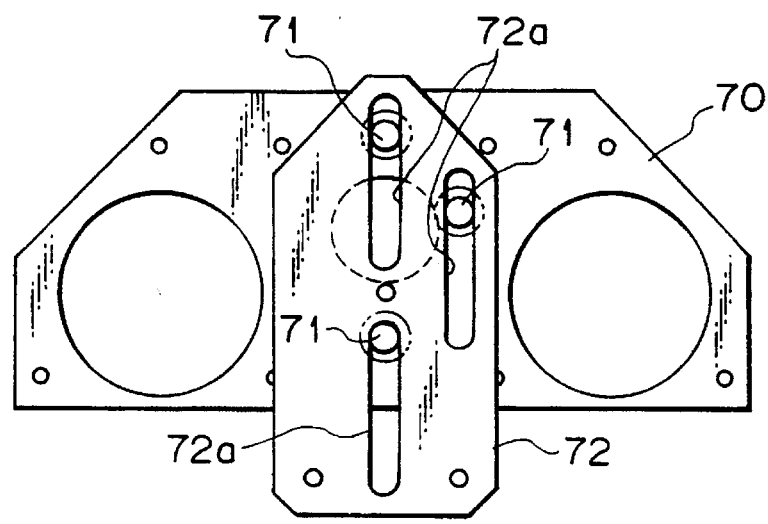
FIG. 54 is a side elevation showing a relation between a horizontal slide plate mounted on a slide side plate included in the slider.
Figure 55:
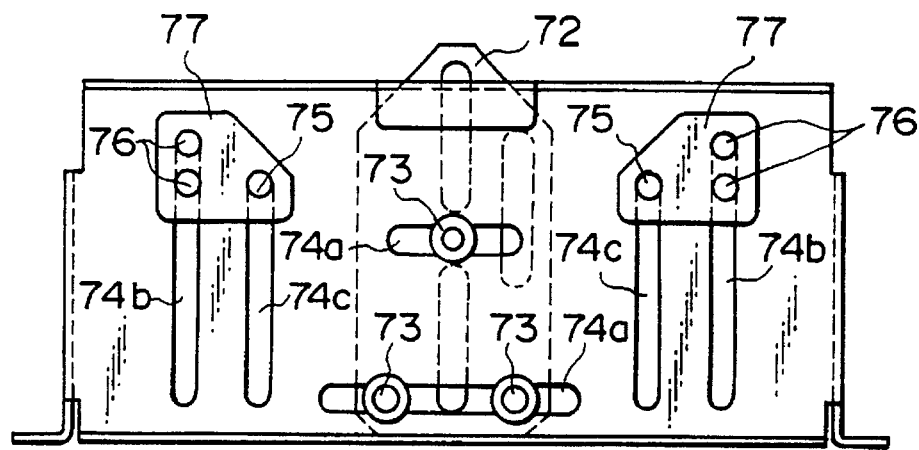
FIG. 55 is a side elevation showing a relation between the horizontal slide plate and pin holders.

As shown in FIG. 43, three vertical slide pins 71 are studded on the outer surface of the side plate 70. As shown in FIG. 54, a horizontal slide plate 72 is formed with three vertically extending slots 72a which respectively receive the vertical slide pins 71. In this configuration, the side plate 70 is movable up and down relative to the horizontal slide plate 72. Three horizontal slide pins 73 are studded on the outer surface of the horizontal slide plate 72. The pins 73 are slidably received in two horizontally extending slots 74a formed in a stationary plate 74, as best shown in FIG. 55. In this condition, the horizontal slide plate 72 is movable relative to the stationary plate 74 in the right-and-left direction.

As shown in FIGS. 43 and 55, the two output pins 75 are each studded on a respective pin holder 77 together with two vertical guide pins 76. The vertical guide pins 76 are respectively slidably received in vertically extending slots 74b formed in the stationary plate 74. The output pins 75 respectively extend throughout two vertical guide slots 74c formed in the stationary plate 74. Each output pin 75 is received in the previously mentioned opening defined by the intersecting grooves 85 and 86 of the gears 66 and 69. As a result, the pin holders 77 are each movable up and down relative to the stationary plate 74. It follows that the output pins 75 are movable up and down together with the previously stated gears.

The slider 78 having the above construction determines the thickness of the book BO and the difference in pages between the right and left parts of the spread book BO with the pair of pins 62 serving as an input section. At the same time, using the output pins 75 as an output section, the slider 78 moves the book BO together with the tables 1 such that the center of the spread book BO (bottom of the bound portion BOa) aligns with the predetermined position of the tables 1 at all times.

Figure 56:
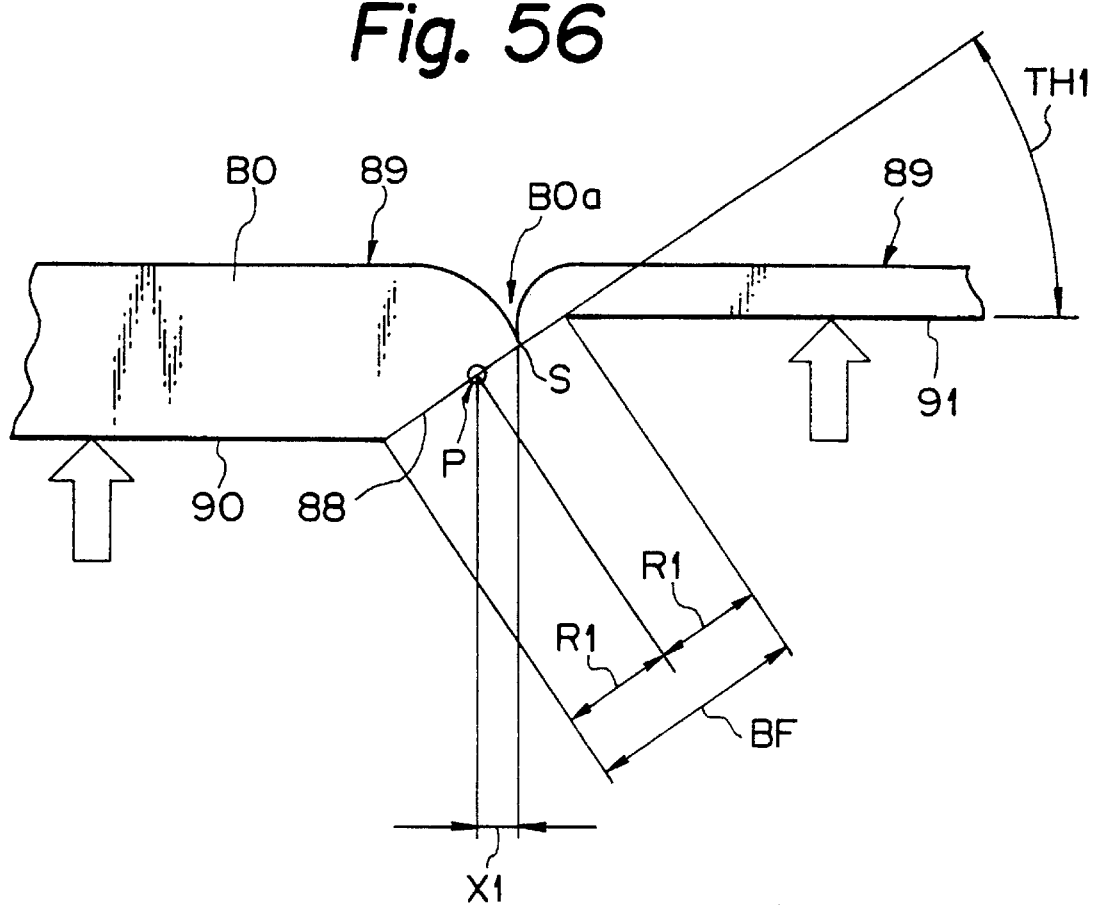
FIG. 56 is a side elevation representative of the bound portion of a book document set on the document tables.

The movement of the book BO and the operation of the slider 78 will be described hereinafter. As shown in FIG. 56, assume that the book BO laid in a spread position has the front cover 90 and rear cover 91 thereof pressed from below such that the surfaces of the right and left pages (reading surfaces 89) lie in the same plane. Then, the back 88 of the book BO is inclined due to the difference in pages between the right and left parts of the book BO. As a result, when the book BO is seen from above, the center S of the book BO (in the embodiment, bottom of the bound portion BOa) is displaced from the center P of the back 88 by a distance X1.in the horizontal direction.

By providing the scanning unit 200 with a particular reading range beforehand, as in the embodiment, it will be possible to simplify the control over the reading operation of the unit 200. This, however, brings about the following problem. Since the center of the reading range of the unit 200 is brought to the center P of the back 88 of the book BO at all times, the displacement X of the center S of the book BO from the center P of the back 88 causes the image read by the unit 200 to be displaced by the same amount X. In the illustrative embodiment, the previously stated slider 78 plays the role of means for correcting such a displacement of the center S of the book BO. Specifically, the slider 78 moves the entire tables 1, carrying the book BO thereon, by a distance X in the direction opposite to the direction in which the center S has been displaced, i.e., in the direction which brings the point S into coincidence with the point P.

As shown in FIG. 56, assume that the back 88 of the book BO is inclined by TH1, the book BO has a total thickness of BF and half a thickness of R1, and that the distance between the center S of the spread book BO and the center P of the back 88 in the horizontal direction is X1. Then, there holds an equation:

$$X1=(R1/2)\times\sin(2\times TH1).$$

The above equation means that the horizontal displacement X1 can be calculated if one half R1 of the total thickness BF of the book BO and the inclination TH1 of the back 88 are determined by the slider 78. Then, if the book BO is moved together with the tables 1 by the calculated distance X1, the reading range of the scanning unit 200 can be confined in a predetermined range, simplifying the control over the reading operation of the unit 200.

Figure 57:
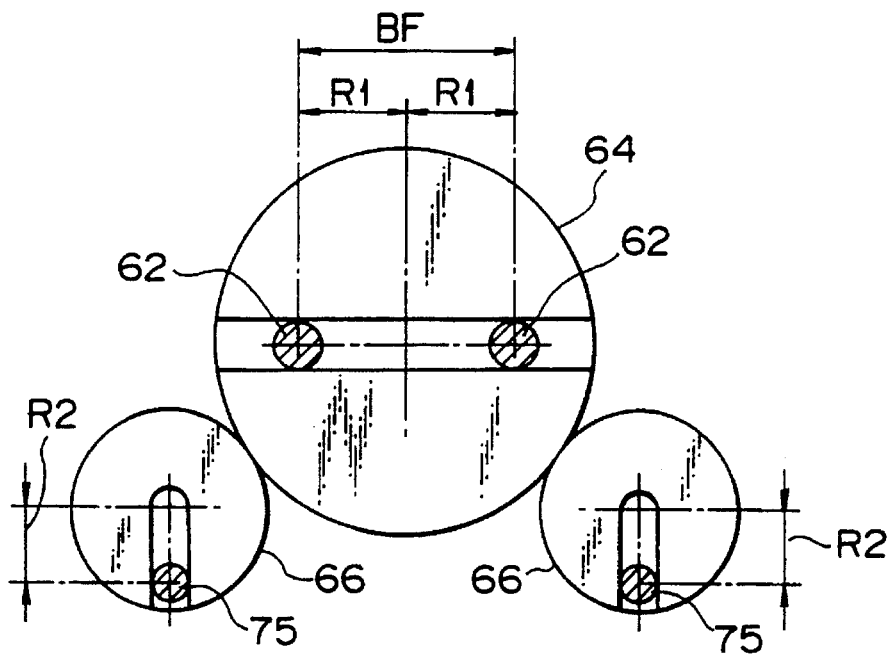
FIG. 57 is a side elevation showing a relation between the pins, large gear, slide output gears and output pins of the slider to occur when the back of the book document laid on the tables is horizontal.
Figure 58:
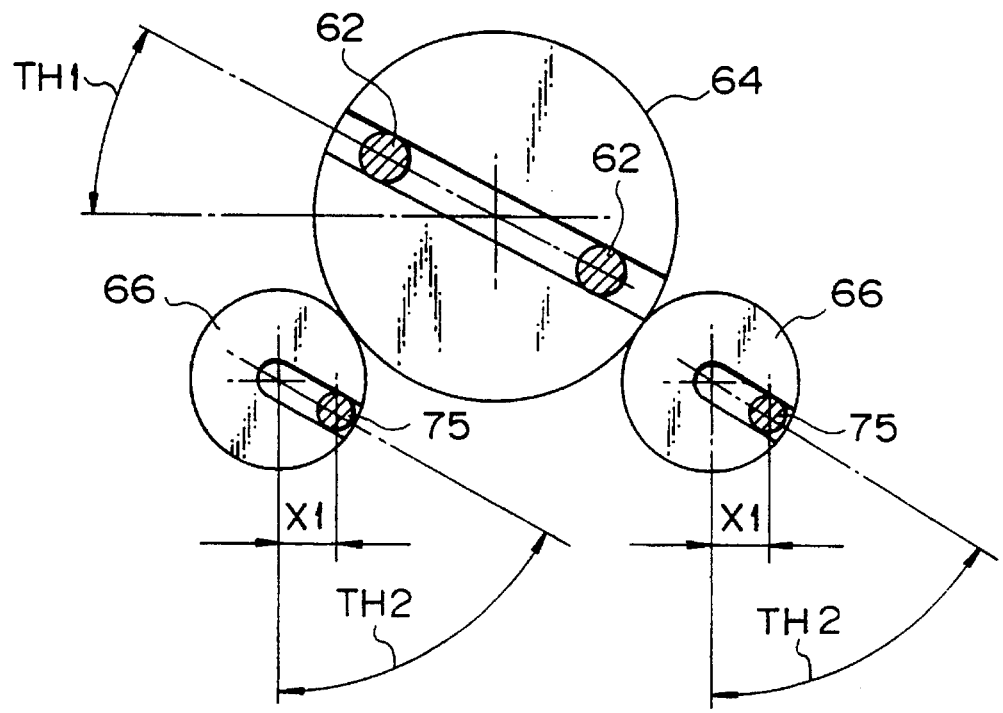
FIG. 58 is a view similar to FIG. 57, showing a relation to occur when the back of the book document is inclined.

In the illustrative embodiment, the slider 78 implements the correction of the displacement X1 of the center S by performing an operation shown in FIGS. 57 and 58. FIG. 57 shows a positional relation between the pins 62 and the output pins 75 to hold when the left and right parts of the book BO in the spread position are even. In FIGS. 57 and 58, the two pins 62 are spaced apart by a distance equal to the total thickness BF of the book BO. Specifically, the operator, intending to set the book BO on the right and left tables 1, unlocks the size stops 27, causes the inner ends of the tables 1 to nip the back 88 of the document BO, and then locks the size stops 27, as stated earlier. In this condition, the distance between the adjust studs 4 of the slide plates 3 is representative of the total thickness BF of the book BO. Hence, due to the operation of the cam gears 69 which will be described, the distance R2 between the center of each slide output gear 66 and the associated output pin 75 is representative of one-quarter of the thickness BF (R2=R1/2). The ratio of the large gear 64 to each slide output gear 66 in rotation angle is 1:2 due to the previously stated particular gear ratio. Therefore, as shown in FIG. 58, when the large gear 64 rotates an angle of TH1, each slide output gear 66 rotates an angle of TH2 which is two times the angle TH1. At this instant, the large gear 643 and the slide output gears 66 rotate in opposite directions to each other. It follows that the distance {R2×sin(TH2)} between each slide output gear 66 and the associated output pin 75 in the horizontal direction matches (kR1/2)×sin(2×TH1) of the previous equation and, therefore, represents the distance X1 between the centers S and P. The output pins 75 are prevented from moving in the horizontal direction by the pin holder 77 and stationary plate 74, as shown in FIG. 55. Therefore, when the output pins 75 are rotated, the slider 78 is bodily moved together with the tables 1 and document BO by the above-mentioned distance X1 horizontally in the direction opposite to the direction of deviation.

Figure 59:
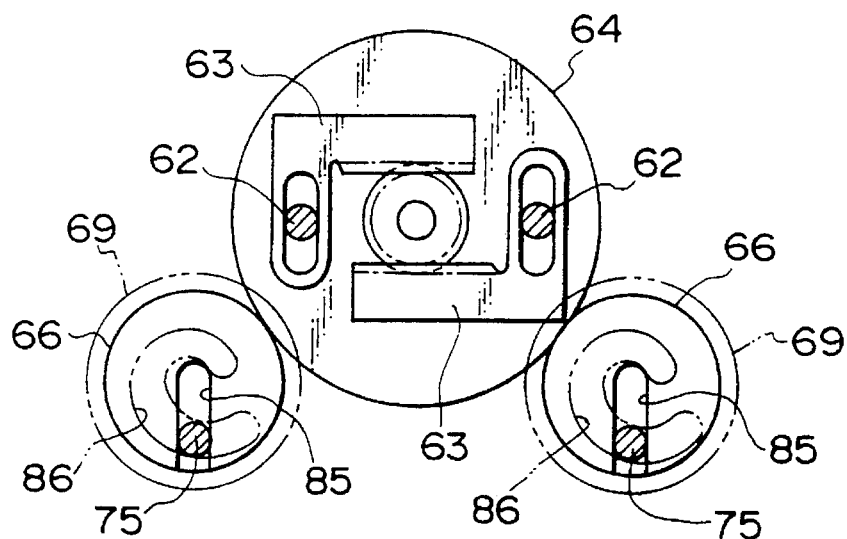
FIG. 59 is a side elevation of a motion transmission mechanism associated with the input section and an output section included in the slider.

FIG. 59 illustrates a relation between the pins 62 and the output pins 75 with respect to displacement. The pins 62 are respectively received in the holes of the adjust studs 4 which are respectively affixed to the slide plates 3 of the tables 1, as shown in FIGS. 47 and 48. When one of the pins 62 is moved toward the center of the TPS by a distance F, the other pin 62 is also moved toward the center of the TPS by the same distance F due to the operation of the racks 63 and stepped pinion gear 65. At this instant, the rotation of the pinion gear 65 is transmitted to the cain gears 69 by the previously stated gears with the result that each cam gear 69 is rotated by a two times greater angle than the gear 65 and in the opposite direction to the gear 65. As a result, the spiral grooves 86 of the cam gears 69 respectively rotate relative to the adjust grooves 75 of the slide output gears 66. This causes the intersecting position of the associated grooves 86 and 75, i.e., the position of the output pin 75 to move toward the center by an amount which is one half of the displacement F of the pin 62. It is to be noted that the sizes of the racks 63 and various gears and the spiral configuration of the grooves 86 are so determined as to satisfy the above conditions.

In the above construction, assume that the large gear 64 is rotated without the distance between the pins 62 being changed, causing the stepped pinion gear 65 to rotate integrally therewith. Then, the slide output gears 66 and cam gears 69 rotate in the same direction and over the same angle as each other. Hence, the intersecting point of the grooves 96 and 85 of the associated cam gear 69 and slide output gear 66, i.e., the position of the output pin 75 received in the intersecting point is angularly moved, but not moved in the radial direction of the gear 66 (without R2 being changed). In this way, the center S of the book BO to be read can be brought to the predetermined position P at all times.

The groove 83, FIG. 45, for restricting the pins 62 is enlarged at the intermediate portion thereof, as indicated by a phantom line in the figure. When the book BO is thin and, therefore, the distance between the pins 62 is small, the load attributable to the correction of the center S of the spread book BO is heavy. In such a case, the enlarged portion of the groove 83 allows the pins 62 to freely move up and down. This makes it needless for the individual tables 1 to be corrected.

Figure 60:
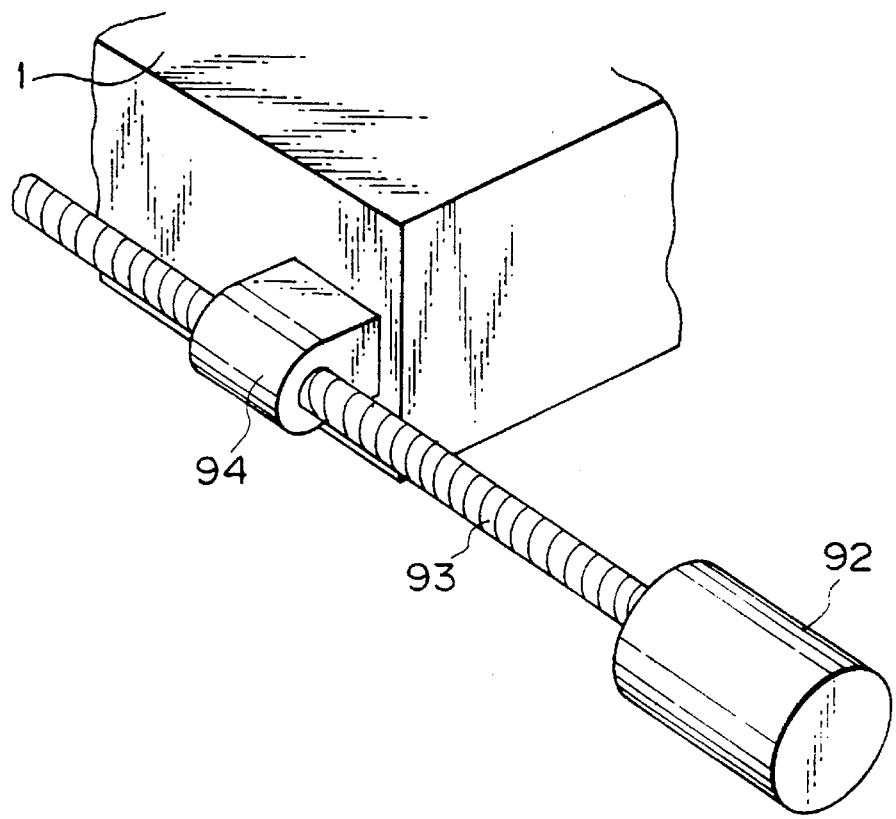
FIG. 60 is a perspective view showing alternative means for moving the tables.

The center S of the book BO in the spread position may be corrected by an implementation other than the slider 78 described above. For example, use may be made of a device for inputting or automatically sensing the thickness of the book BO, a device for detecting the positions of the tables 1 or for detecting the inclination of the back of the book BO, and a device for moving the tables 1 in the horizontal direction. With these devices, it is possible to calculate a displacement X1 based on the previous equation and then move the tables 1 the calculated distance X1. FIG. 60 shows a specific arrangement of the device for moving the tables 1 in the horizontal direction. As shown, a motor 92 with an encoder rotates a feed screw 93 which extends horizontally in the direction in which the tables 1 move. The feed screw 93, in turn, moves a female screw 94 mounted thereon. The tables 1 are each constructed integrally with the respective female screw 94. However, the slider 78, which does not rely on any electrical device, reduces the running cost and, therefore, the cost of the correcting device.

Hereinafter will be described the construction of the scanner unit 30 included in the embodiment. Referring again to FIG. 34, the TPS has the glass platen 206 on the top thereof. When a sheet document or a thick book document is set on the glass platen 206 by a cover plate, not shown, the scanning unit 200 is capable of reading the document by scanning it after the optical path thereof has been switched over, as will be described later. The upper half of the TPS is constituted by the scanner unit 30. The scanning unit 200 is movable in the right-and-left direction, as viewed in FIG. 34, within the scanner unit 30.

Figure 61:
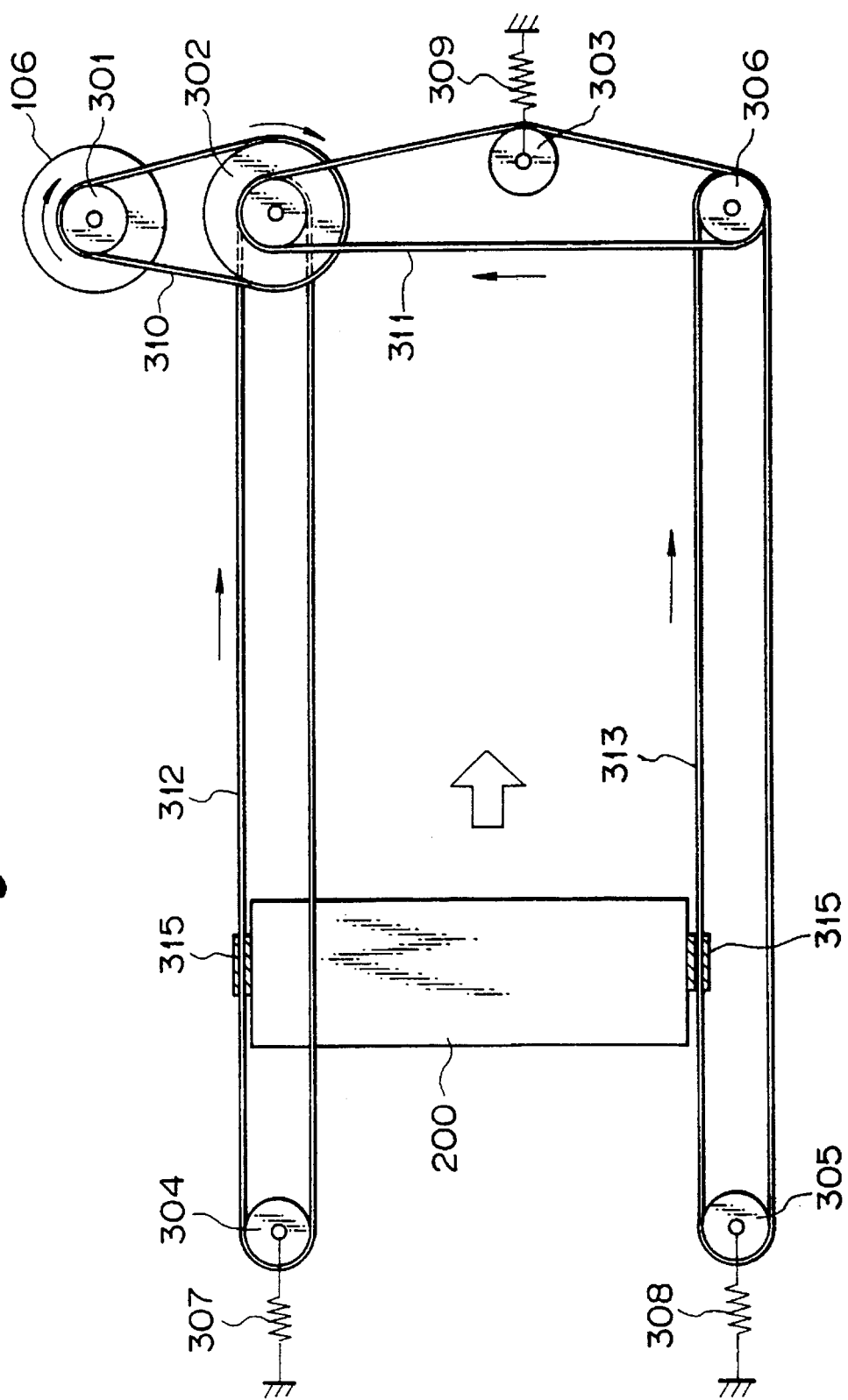
FIG. 61 is a plan view of a mechanism for driving the scanning unit.

FIG. 61 shows a system for driving the scanning unit 200 in a view as seen from above the TPS. As shown, a timing belt 312 is passed over pulleys 304 and 302 and extends in the right-and-left direction at the rear side of the TPS. Another timing belt 313 is passed over a pulley 305 and a stepped pulley 306 and extends in the right-and-left direction at the front side of the TPS. Springs 307 and 308 respectively support the shafts of the pulleys 304 and 305, thereby exerting a predetermined tension on the timing belts 312 and 313. A three-step pulley 302 is connected to a motor pulley 301 by the timing belt 310 and to the two-step pulley 306 by a timing belt 311. An idler 303 is constantly biased outward by a spring 309 so as to exert a predetermined tension on the timing belt 311. The scanning unit 200 have the front and rear sides thereof affixed to the timing belts 312 and 313 by clamps 315, respectively. When the scanner motor 106 is energized, the motor pulley 301 is rotated with the result that the scanning unit 200 is driven via the timing belts 312 and 313.

Figure 62:
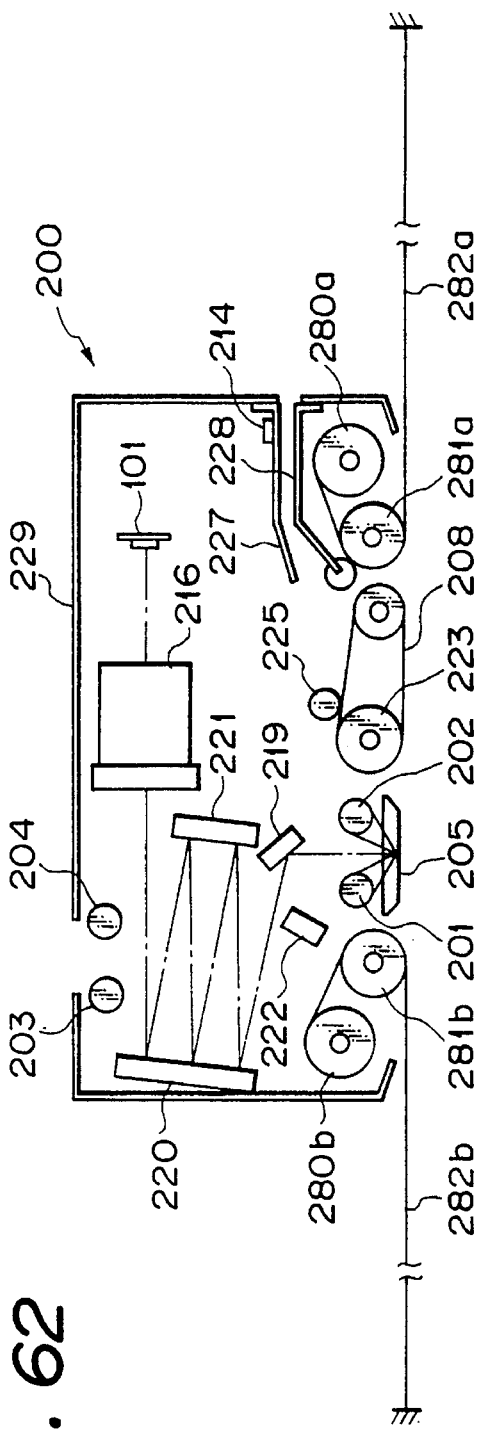
FIG. 62 is a section of the scanning unit.

FIG. 62 shows the construction of the scanning unit 200. As shown, the previously mentioned right and left press rollers 281a and 281b are rotatably mounted on the underside of the scanning unit 200. A right and a left take-up roller 280a and 280b, respectively, are also rotatably mounted on the underside of the scanning unit 200 outboard of the press rollers 281a and 281b, respectively. The right and left press sheets 282a and 282b, which are separate from each other, have their inner ends wrapped around the take-up rollers 280a and 280b, respectively. The outer ends of the sheets 282a and 282b are respectively affixed to the side walls of the scanner unit 30. The sheets 282a and 282b are each implemented by a fabric of Tetron yarns; a rubber-based resin is melted into opposite surfaces of the fabric. Undulations or marks of yarns appearing on the surfaces of the fabric prevent electrostatic adhesion due to charges from easily acting on the fabric.

Figure 63:
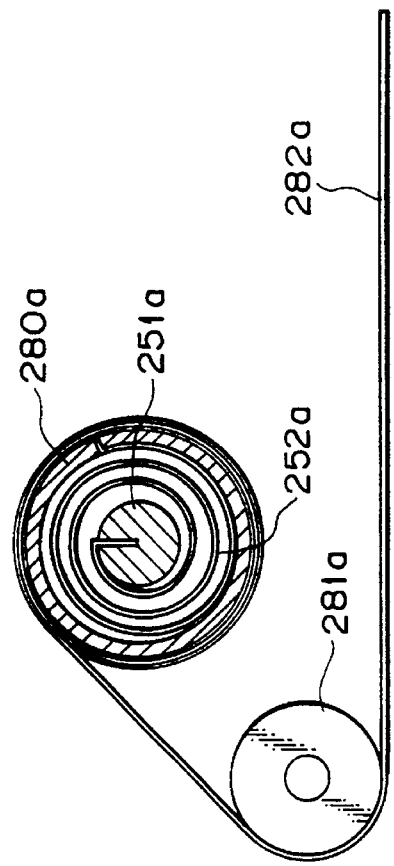
FIG. 63 is a section showing the structure of a take-up roller included in the scanning unit.

FIG. 63 shows one of the identical take-up rollers 280a and 280b specifically. As shown, the take-up roller 280a has a shaft 251a, a hollow cylinder 280a surrounding the shaft 251a, and a spiral spring 252a anchored to the shaft 251a and cylinder 280a at opposite ends thereof. When the shaft 251a is further rotated from a position which stretches the associated press sheet 282a, a certain degree of tension can be exerted on the sheet 282a by the action of the spiral spring 252a. The other take-up roller 280b also has a shaft 251b, a hollow cylinder 280b, and a spiral spring 252b.

Figure 64:
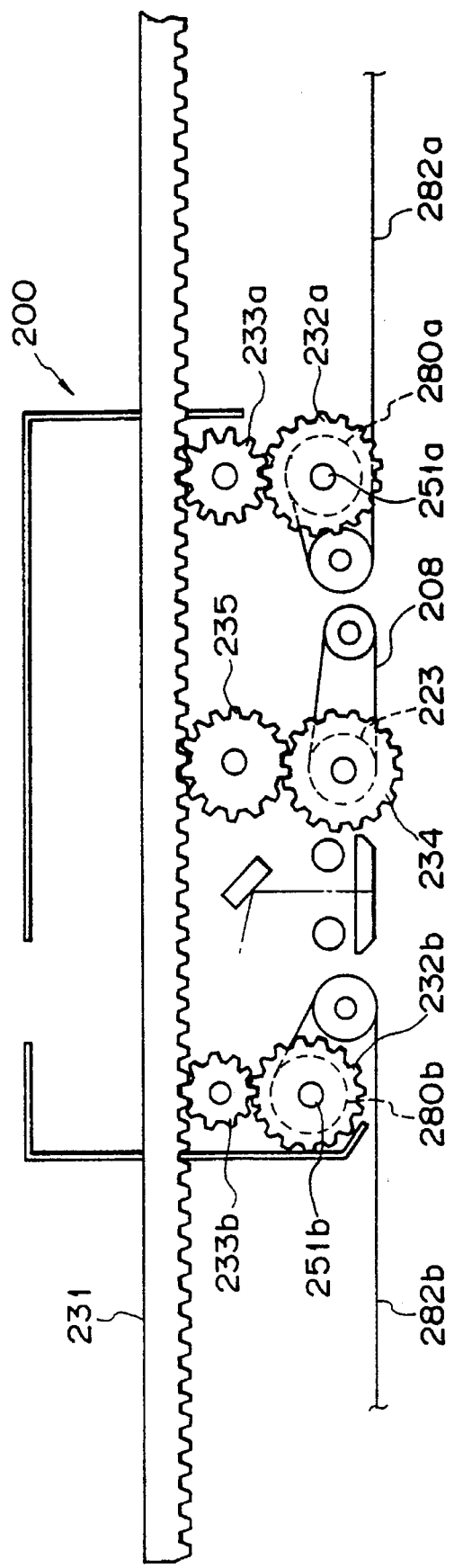
FIG. 64 is a side elevation of a mechanism for driving take-up rollers and turn rollers included in the scanning unit.

As shown in FIG. 64, take-up gears 232a and 232b are respectively mounted on the outer ends of the shafts 251a and 251b. A drive rack 231 is affixed to opposite side walls of the scanner unit 30 and formed with teeth over substantially the entire length thereof. The take-up gears 232a and 232b are held in mesh with the rack 231 via idle gears 233a and 233b, respectively. In this configuration, when the scanning unit 200 is moved, the take-up gears 232a and 232b rotate together with the associated idle gears 233a and 233b. As a result, the press sheets 282a and 282 are paid out or taken up via the shafts 251a and 251b, spiral springs 252a and 252b, and hollow cylinders 280a and 280b, respectively. Therefore, the tensions of the right and left take-up rollers 280a and 280b are substantially maintained constant. At this instant, the outermost periphery of the sheet 282a wrapping around the roller 280a and that of the sheet 282b wrapping around the roller 280b, as measured in the radial direction, differ from each other depending on the position of the scanning unit 200, since the sheets 282a and 282b each has a certain thickness. However, this difference is successfully absorbed by the spiral springs 252a and 252b.

Referring again to FIG. 62, the glass platen 205 for reading the book BO and the turn belt 208 for turning the pages of the book BO are located between the press rollers 281a and 281b. In the illustrative embodiment, the glass platen 205 and the turn belt 208 are respectively positioned at the upstream side and the downstream side in the direction in which the scanning unit 200 reads the book BO. This increases the distance available for the approach run of the scanning unit 200 and, therefore, stabilizes the scanning of the unit 200. In addition, the embodiment locates the page turning mechanism in the lower portion of the scanning unit 200 and the optics in the tipper portion of the same unit 200, thereby reducing the overall size of the PTS.

Figure 65:
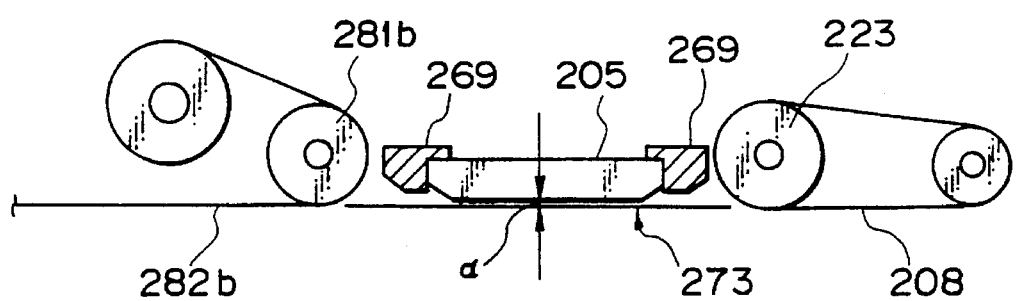
FIG. 65 is a section showing a positional relation between press rollers and a glass platen positioned at the reading section of the scanning unit.

Moreover, the scanning unit 200 can read the surface of the book BO (reading surface 273) which is pressed by the left press roller 281b and a belt drive roller 223 and positioned between them. This insures an optimal image. As shown in FIG. 65, to accommodate some rise of the book surface, the lower surface of the glass platen 205 is disposed slightly above a horizontal plane (reading surface 273) in which the lowermost point of the left press roller 281b and that of the belt drive roller 223 lie; that is, a gap $\alpha$ is defined therebetween. The gap $\alpha$ is selected such that $2\alpha$ is smaller than the depth of a focus of the optics, and it is determined in conformity to the reduction ratio of the optics.

Figure 66:
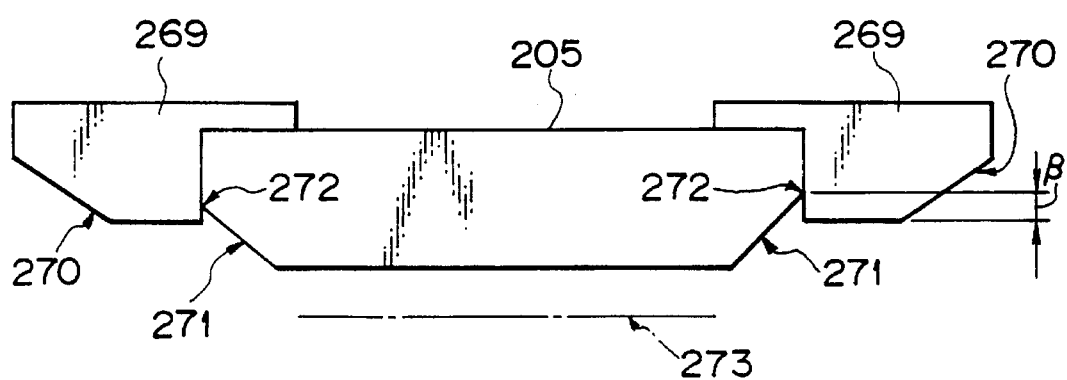
FIG. 66 is a section showing a positional relation between the glass platen and glass holders holding it.

As shown in FIG. 66, the glass platen 205 is supported by glass holders 269 at opposite sides thereof. The glass platen 205 has chambers 271 at opposite ends of the underside while the glass holders 269 each has a chamfer 270 at the outer end of the underside. The upper corner 272 of each chamber 271 is higher than the underside of the glass holders 269 by a small distance $\beta$, so that the ends of the glass platen 205 may not catch the edges of pages.

As shown in FIG. 62, the fluorescent lamps 201 and 202 are disposed above the glass platen 205 and at the right and left sides of the reading section. As the lamps 201 and 202 illuminate the book BO, the resulting imagewise reflection is reflected by a first mirror 219, reflected by a second mirror 220 and a third mirror 221 alternately, and then routed through a lens 216 to the CCD image sensor 101 to form a reduced image.

The turn belt 208 is passed over the previously mentioned belt drive roller 223 and a roller 224. A charge roller 225 is held in contact with the upper run of the turn belt 208 at a position slightly spaced apart from the belt drive roller 224.

As shown in FIG. 64, a drive gear 234 is mounted on the shaft of the belt drive roller 223 and operatively connected to the drive rack 231 by an idle gear 235. When the scanning unit 200 is moved, the drive gear 234 rotates along the drive rack 232 together with the idle gear 235. Consequently, the drive roller 223 is rotated to cause the turn belt 208 to rotate at the same speed as the scanning unit 200.

Figure 67:
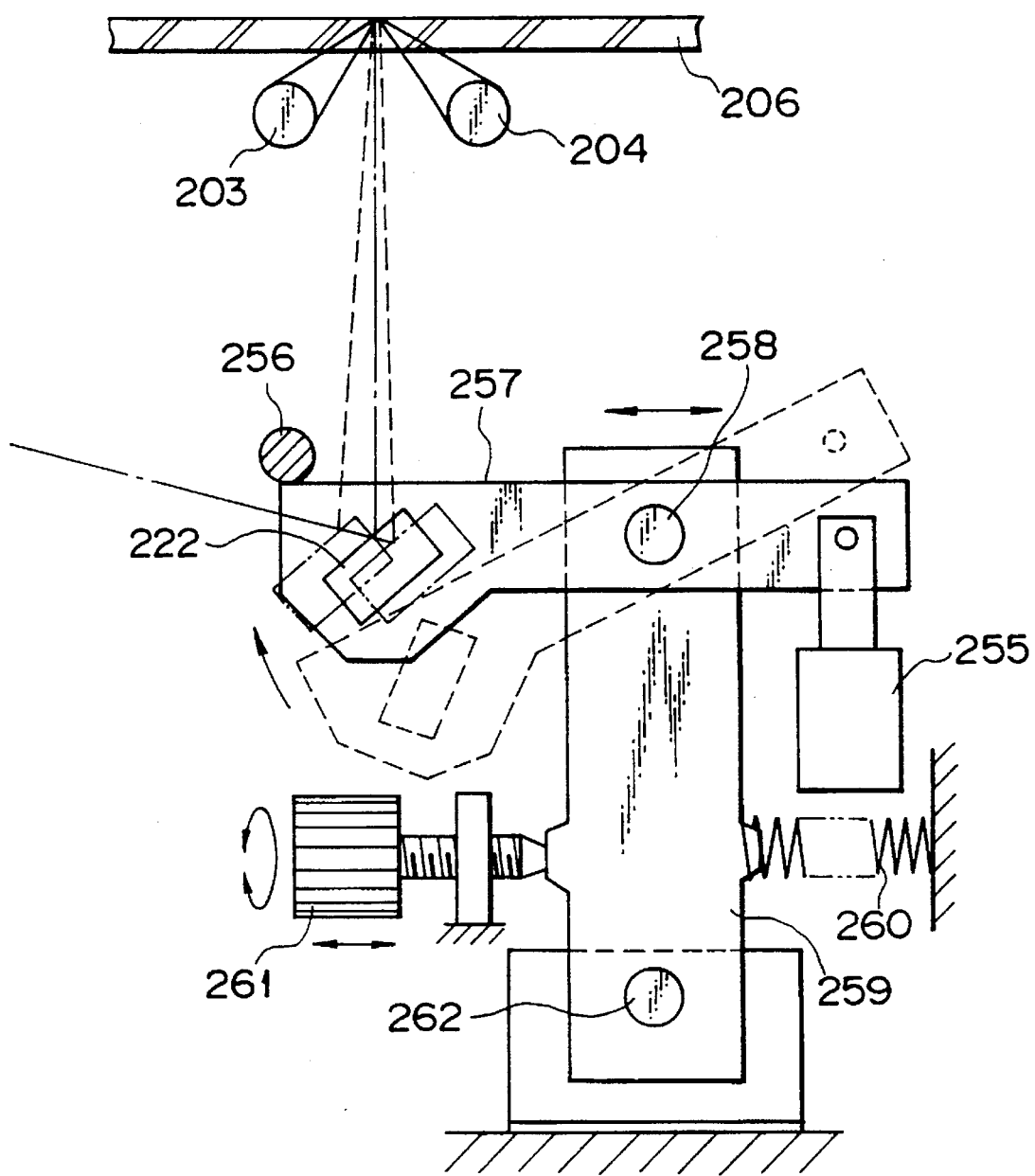
FIG. 67 is a side elevation showing means disposed in the scanning unit for driving a switch mirror and means for adjusting an optical path.
Figure 68:
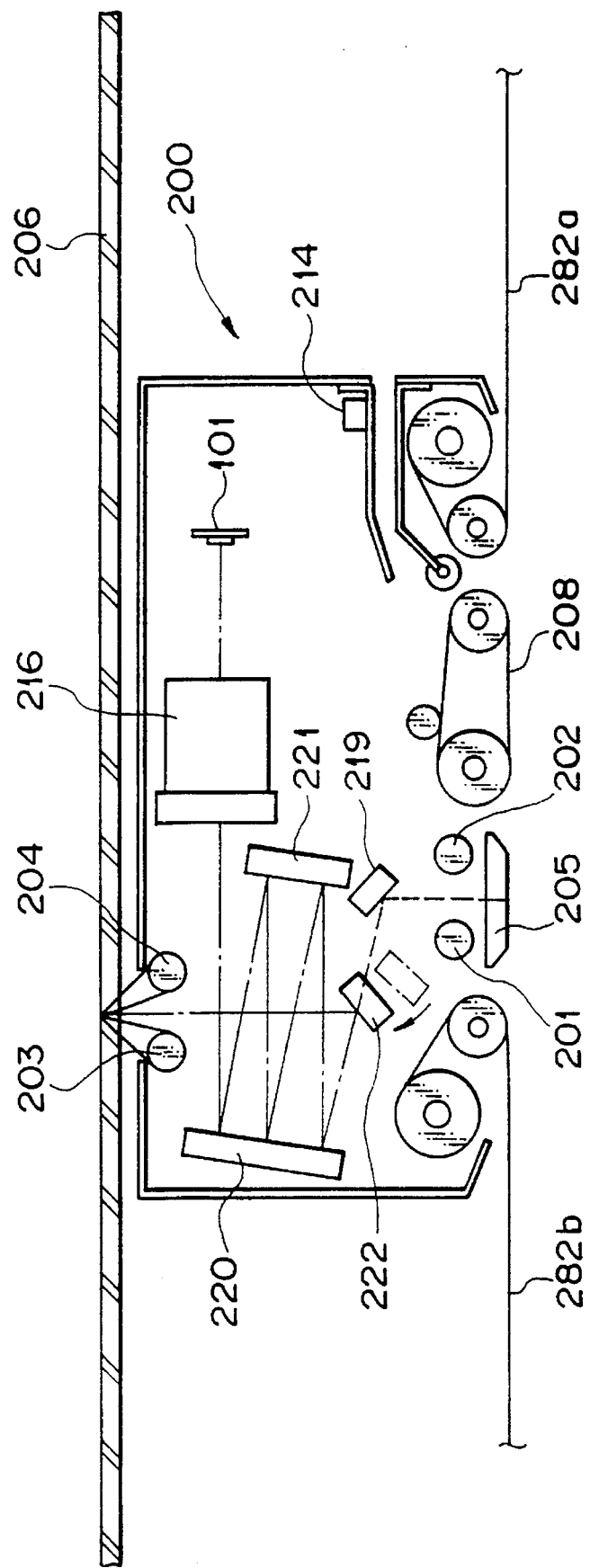
FIG. 68 is a section showing the scanning unit in a particular condition set up by the means shown in FIG. 67.

As shown in FIG. 62, a switch mirror 222 is usually held in a position retracted from the optical path of the scanning unit 200. When the scanning unit 200 is to read a document laid on the glass platen 206, a keep solenoid 255 shown in FIG. 67 is energized to move the switch mirror 222 from the retracted position into the optical path of the scanning unit 200. As a result, as shown in FIG. 68, the optical path between the first and second mirrors 219 and 220 is switched from the glass platen 205 side (dashed line) to the glass platen 206 side (solid line). In this condition, when the fluorescent lamps 203 and 204 illuminate the document on the glass platen 206, the resulting reflection is reflected by the second and third mirrors 220 and 221 alternately and then routed through the lens 216 to the image sensor 101 to form a reduced image.

As shown in FIG. 67, the switch mirror 222 is supported by a bracket 257 which is in turn supported by an adjust plate 259 in such a manner as to be rotatable about an upper fulcrum 258. The keep solenoid 255 is connected to one end of the bracket 257 remote from the other end which supports the mirror 222. When the keep solenoid 255 is selectively energized or deenergized, the bracket 257 is angularly moved to a position indicated by a solid line in FIG. 67 or to a position indicated by a dashed line. In this way, the switch mirror 222 is movable to the retracted position shown in FIG. 62 or to the advanced position shown in FIG. 68. The retracted position of the switch mirror 222 (dashed line, FIG. 67) is dependent solely on the motion of the keep solenoid 255. However, the advanced position (solid line, FIG. 67) is strictly regulated by a pin 256, i.e., the angular movement of the bracket 257 is restricted by the pin 256.

In the illustrative embodiment, the mirror 222 is capable of adjusting the optical path selected. Specifically, as shown in FIG. 67, the adjust plate 259 is rotatable about a lower fulcrum 262 relative to the body of the scanning unit 200. A spring 260 and an adjust screw 261 respectively abut against opposite sides of the adjust plate 259 between the upper and lower fulcrums 258 and 262, thereby supporting the plate 259 in a substantially vertical position. The spring 260 constantly biases the adjust plate 259 such that the upper fulcrum 258 tends to move to the mirror 222 side. The adjust screw 261 abuts against the other side of the adjust plate 259 at the tip thereof to restrict the rotation of the adjust plate 259 due to the spring 260. When the adjust screw 261 is rotated, the adjust plate 259 is rotated about the lower fulcrum 262 to change the position of the upper fulcrum 258. As a result, the bracket 257 and, therefore, the switch mirror 222 is displaced to adjust the optical path selected.

In the embodiment, the mirrors other than the switch mirror 222 are not provided with the above-described path adjusting function. In the book mode, the optical path is adjusted by adjusting the position of the CCD image sensor 101. With this construction, the embodiment reduces the number of parts of the optics which need adjustment, thereby facilitating the assembly and maintenance of the TPS. Moreover, since the keep solenoid 255 and elements associated therewith are accommodated in the scanning unit 200, they can be replaced or repaired together with the optical elements only if the unit 200 is bodily replaced.

Figure 69:
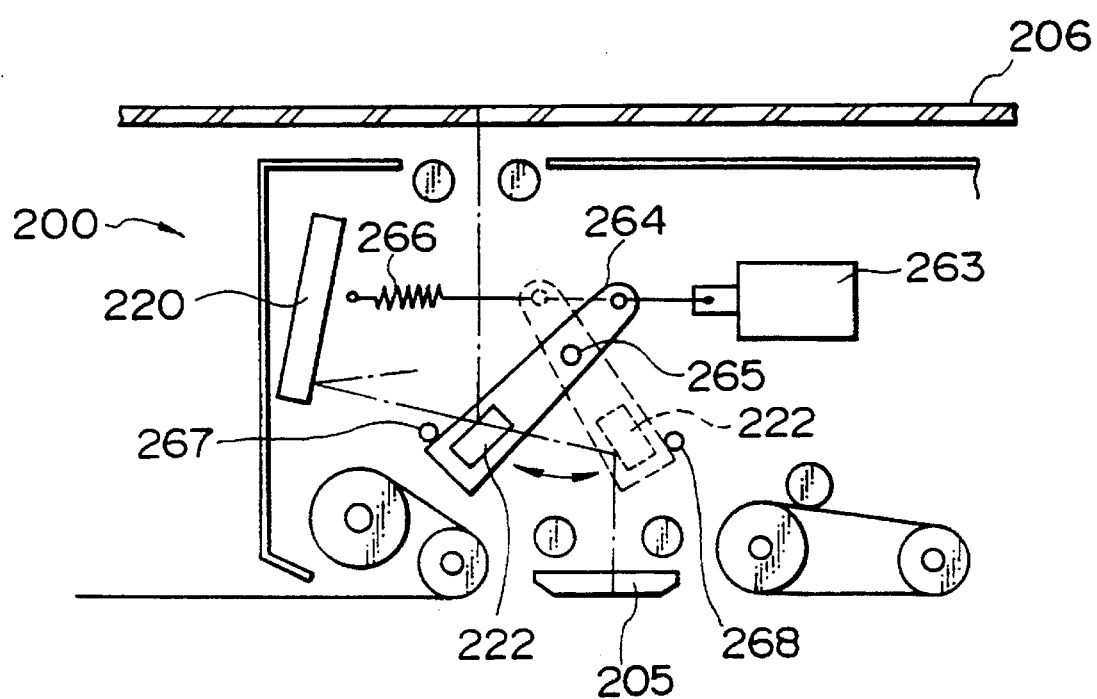
FIG. 69 is a section showing another means for driving the switch mirror.

FIG. 69 shows an alternative arrangement for switching the optical path of the optics. A bracket 264 supports the switch mirror 222 and is rotatable about a fulcrum 265 relative to the body of the scanning unit 200. A solenoid 263 is connected to the end of the bracket 264 remote from the switch mirror 222. A spring 266 constantly pulls the bracket 264 away from the solenoid 263. The bracket 264 is rotatable about the fulcrum 265 to a position indicated by a dashed line in FIG. 69 or to a position indicated by a solid line, based on the operation of the solenoid 263 and the action of the spring 266. As a result, the mirror 222 is selectively moved to a book reading position indicated by a dashed line in FIG. 69 or to a sheet document reading position indicated by a solid line. To read the book BO via the glass platen 205, the switch mirror 222 is caused to abut against a pin 268 and stopped at the dashed line position of FIG. 69. To read a sheet document via the glass platen 206, the switch mirror 222 is caused to abut against another pin 267 and stopped at the solid line position of FIG. 69.

Figure 70:
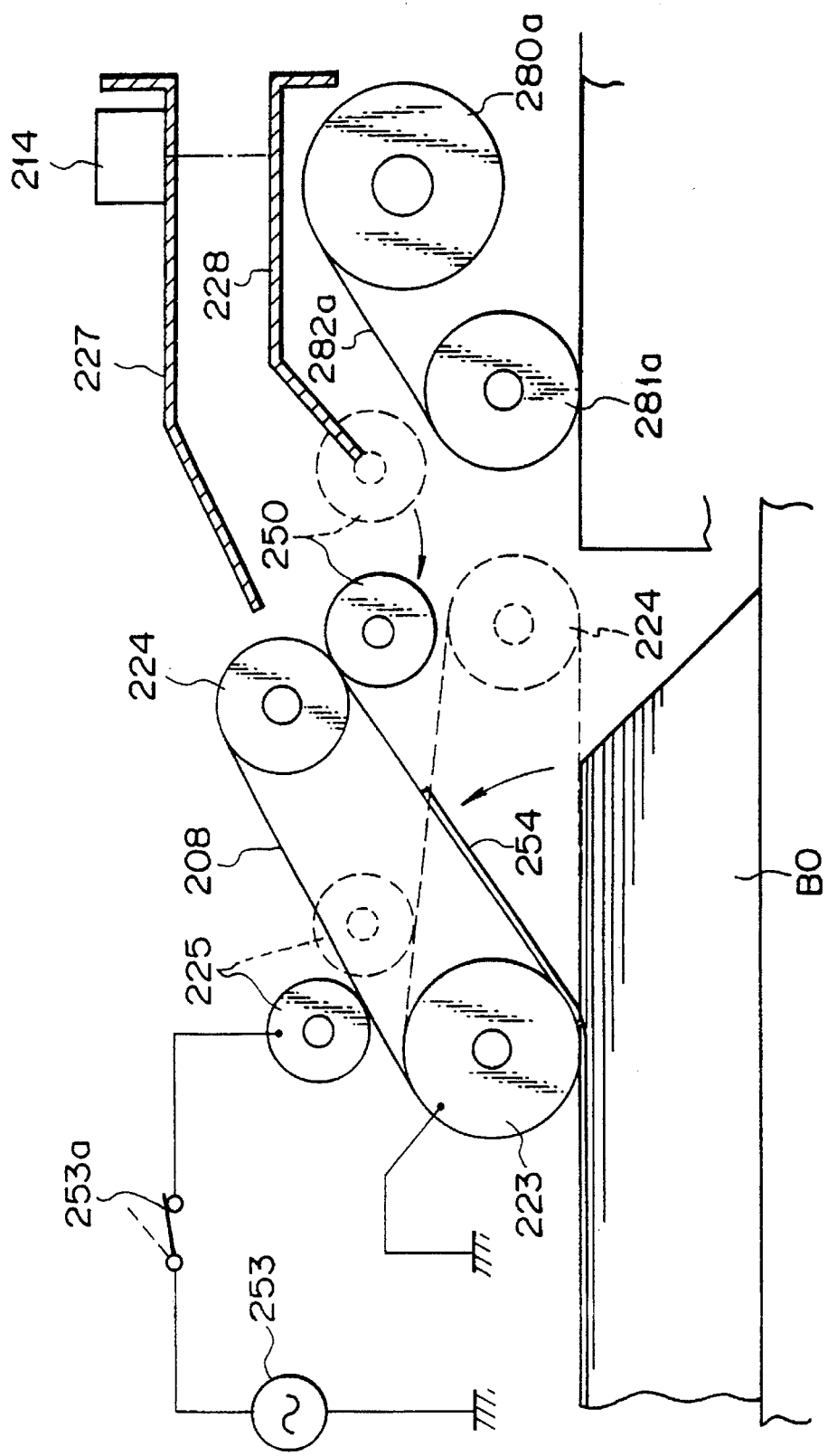
FIG. 70 is a fragmentary section of the scanning unit, demonstrating how the scanning unit lifts the leaf of a book document.

Referring to FIG. 70, the page turning operation of the scanner unit 30, i.e., scanning unit 200 will be described. In the illustrative embodiment, the turn belt 208 is made of PET, PC or PVC by way of example and made up of a surface layer and a back layer. The surface and back layers respectively have a surface resistance of higher than $10^{14}\ \Omega$ and a surface resistance of lower than $10^{8}\ \Omega$. The belt drive roller 223 is constituted by a metallic roller connected to ground and covered with conductive rubber, thereby implementing sure belt drive and grounding. Further, the charge roller 225 is implemented by a metallic roller. An AC power source 253 applies a high voltage of $\pm 2$ kV to the charge roller 225 via a switch 253$a$ at a predetermined timing. In this configuration, the switch 253$a$ is turned on at a particular timing, which will be described later, while the scanning unit 200 is in travel and the turn belt 208 is in rotation. Then, the voltage of $\pm 2$ kV from the AC power source 253 is applied to the charge roller 225 with the result that an alternating electric field is generated on the surface of the belt 208. The electric field produces on the surface of the belt 208 a force causing the uppermost leaf 254 of the book BO, which is in contact with the belt 208, to electrostatically adhere to the belt 208.

Figure 71:
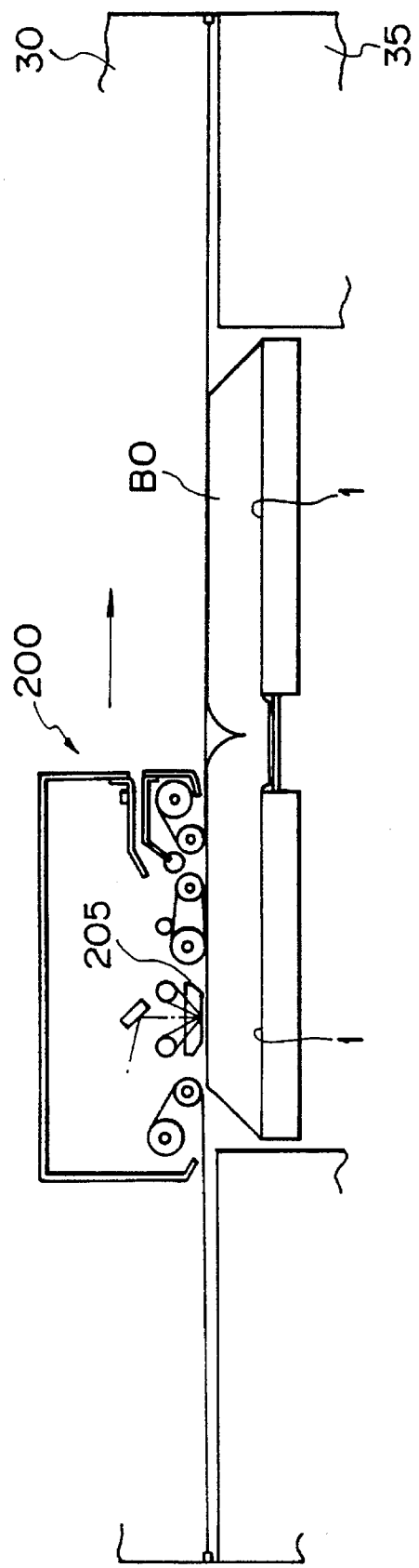
Figure 72:
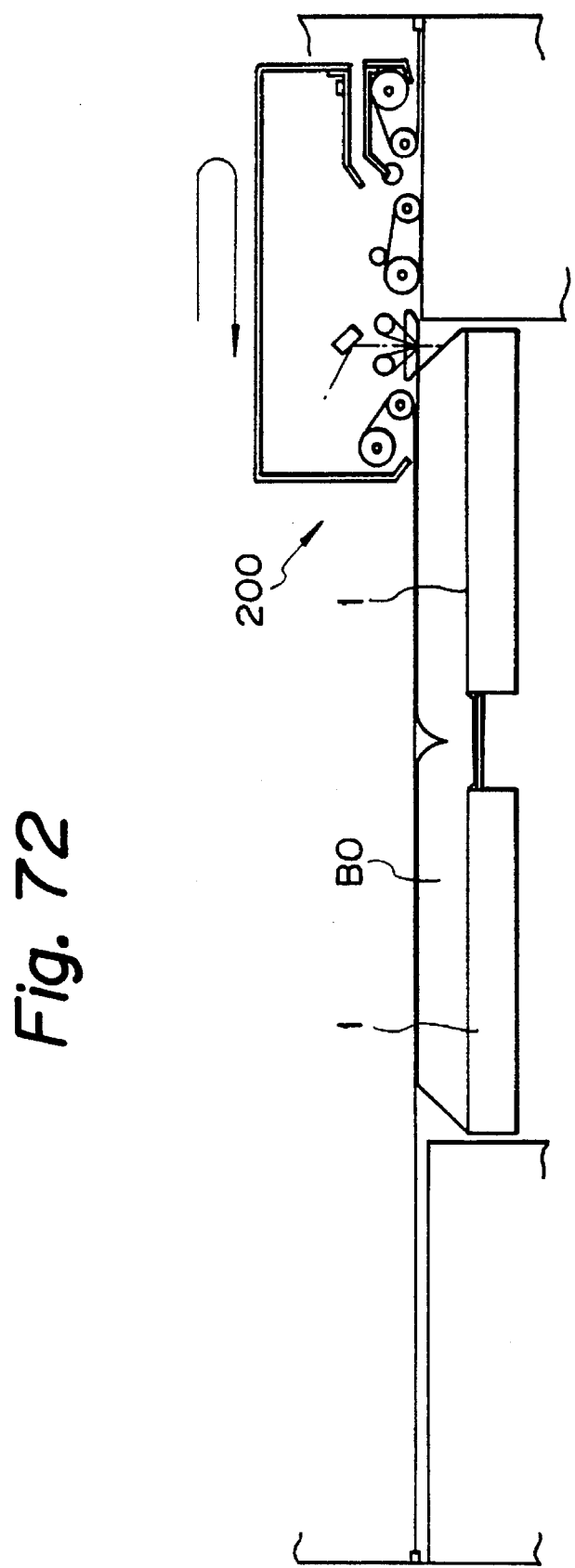

Specifically, to read the book BO, the scanning unit 200 starts moving from the left end home position of the scanner unit 30 to the right, as viewed in FIG. 37. When the reading position of the glass platen 205 arrives at the left page of the book BO, the optics of the scanning unit 200 starts reading the book BO and sequentially reads the left page and right page in this order, as shown in FIG. 71. At this instant, the position where the scanning unit 200 starts reading the book BO depends on the size of the book BO and differs from the read start position associated with the glass platen 206 (reference end of the scale 207). As the optics fully reads the book BO up to the edge of the right page, the scanning direction of the scanning unit 200 is reversed, as shown in FIG. 72. Then, the scanning unit 200 starts on an operation for turning the right page of the book BO.

Figure 73:
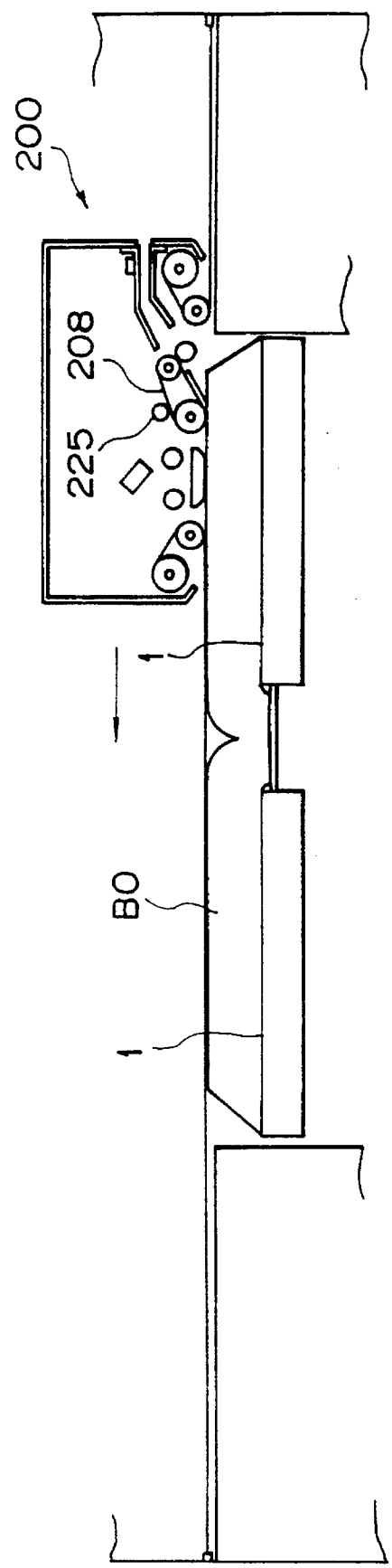

At the beginning of the page turning operation, the turn belt 208 and a page feed roller 250, which will be described, are held at positions indicated by dashed lines in FIG. 70. Before the operation begins, the charge pattern formed on the surface of the turn belt 208 is laid on the uppermost page or leaf 254 of the book BO. In this condition, as soon as the center of the lower run of the turn belt 208 moves away from the edge of the leaf 254, the belt 208 and page feed roller 250 are moved to positions indicated by solid lines in FIG. 70 by a solenoid, not shown, as shown in FIG. 73. As a result, only the page 254 adheres to the turn belt 208 due to the unequal electric field of the charge pattern formed on the belt 208, and it is lifted together with the belt 208. The adhering force generated by the unequal electric field does not cause the leaves underlying the leaf 254 to adhere to the turn belt 208.

As shown in FIG. 77, the embodiment starts charging the turn belt 208 when the scanning unit starts returning at the same time as it has read the book BO. This eliminates the wasteful operation of the scanning unit 200 and, therefore, enhances efficient operation. As shown in FIG. 77, assume that the distance L1 between the reading position of the scanning unit 200 and the lowermost point of the drive roller 223 is selected to be greater than the distance L2 (L1≧L2) between the point where the charge roller 225 contacts the belt 208 and the lowermost point of the roller 223. Then, the belt 208 may begin to be charged after the scanning unit 200 has started returning.

Figure 74:
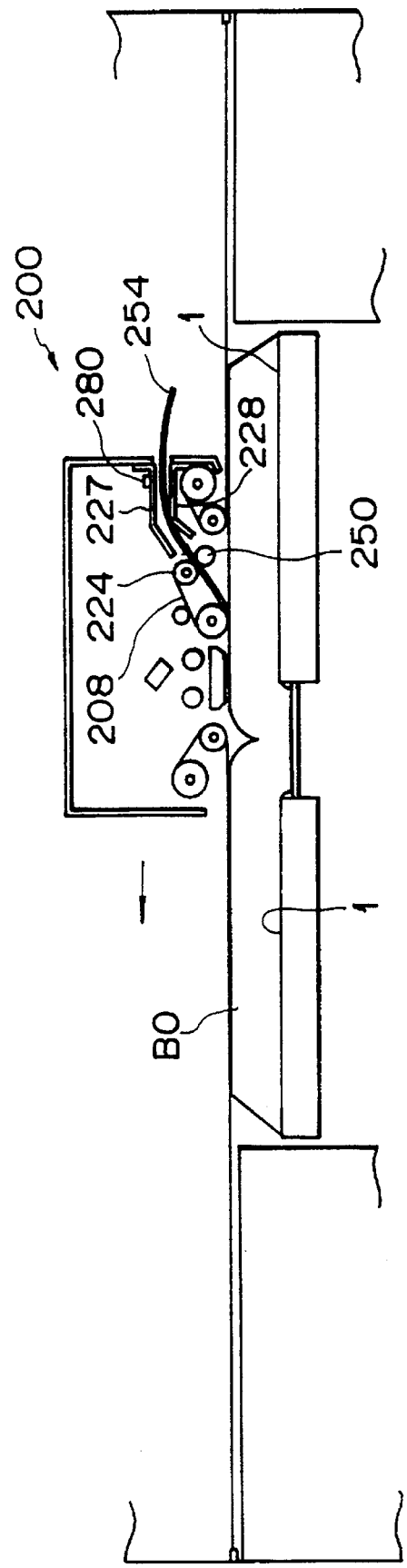

After the scanning unit 200 has lifted the uppermost leaf 254 of the book BO, it is moved toward the end home position, as shown in FIG. 73. Then, as shown in FIG. 74, the leaf 254 is surely conveyed by being nipped by the turn roller 224 and page feed roller 250. The edge of the leaf 254 is sequentially driven out to the right of the scanning unit 200 via an tipper and a lower leaf guide 227 and 228, FIG. 62. The leaf guides 227 and 228 are located at the right portion of the scanning unit 200. At this instant, the turn sensor 214, FIG. 62, mounted on the upper leaf guide 227 senses the leaf 254 driven out of the scanning unit 200. The resulting output of the sensor 214 indicates that the page 254 has been correctly turned over.

It will be seen that the scanning unit 200 having turned over the page 254 does not roll or bend it and, therefore, does not damage it. In addition, since it is not necessary to provide the scanning unit 200 with means for accommodating the leaf being turned over, the scanning unit 200 is small size.

Figure 75:
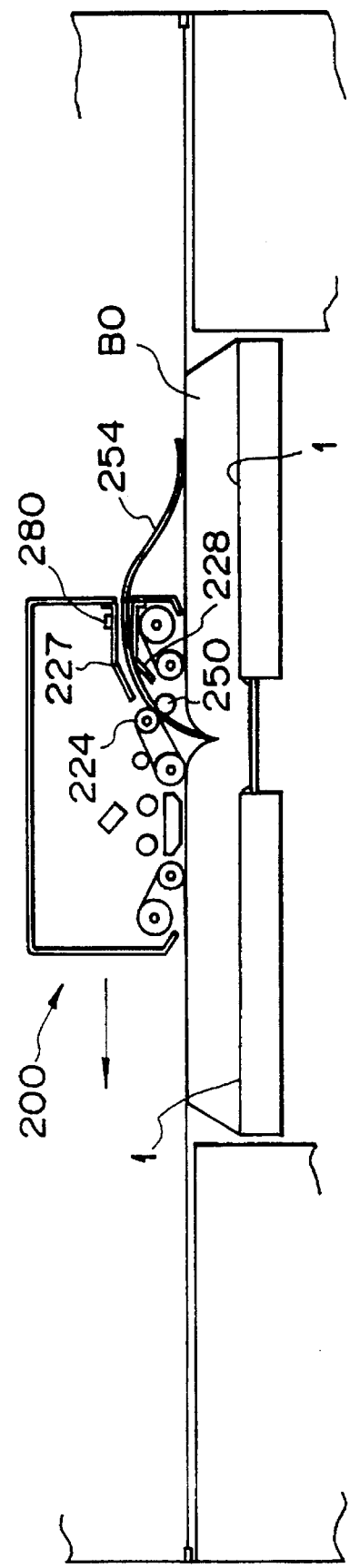

As shown in FIG. 75, when the scanning unit 200 has lifted the leaf 254 up to the bound portion BOa of the book BO, the turn belt 208 and page feed roller 250 are restored to their original positions (dashed lines, FIG. 70). In this condition, as the scanning unit 200 is further moved toward the end home position, the bound portion BOa of the book BO pulls the leaf 254. As a result, the leaf 254 is sequentially returned to the outside of the scanning unit 200 via the leaf guides 227 and 228 and laid on the left page of the book BO, as shown in FIG. 76.

When the leaf 254 is entirely laid on the left page of the book BO, a single document reading and page turning cycle of the scanning unit 200 ends. Assume that such a reading and paging turning cycle should be repeated, or that only the reading movement or the page turning movement should be repeated. Then, the moving direction of the scanning unit 200 is reversed at the same time as the leaf 254 is entirely laid on the left page of the book BO. This allows the scanning unit 200 to move in a reciprocating motion over the shortest course.

Figure 78:
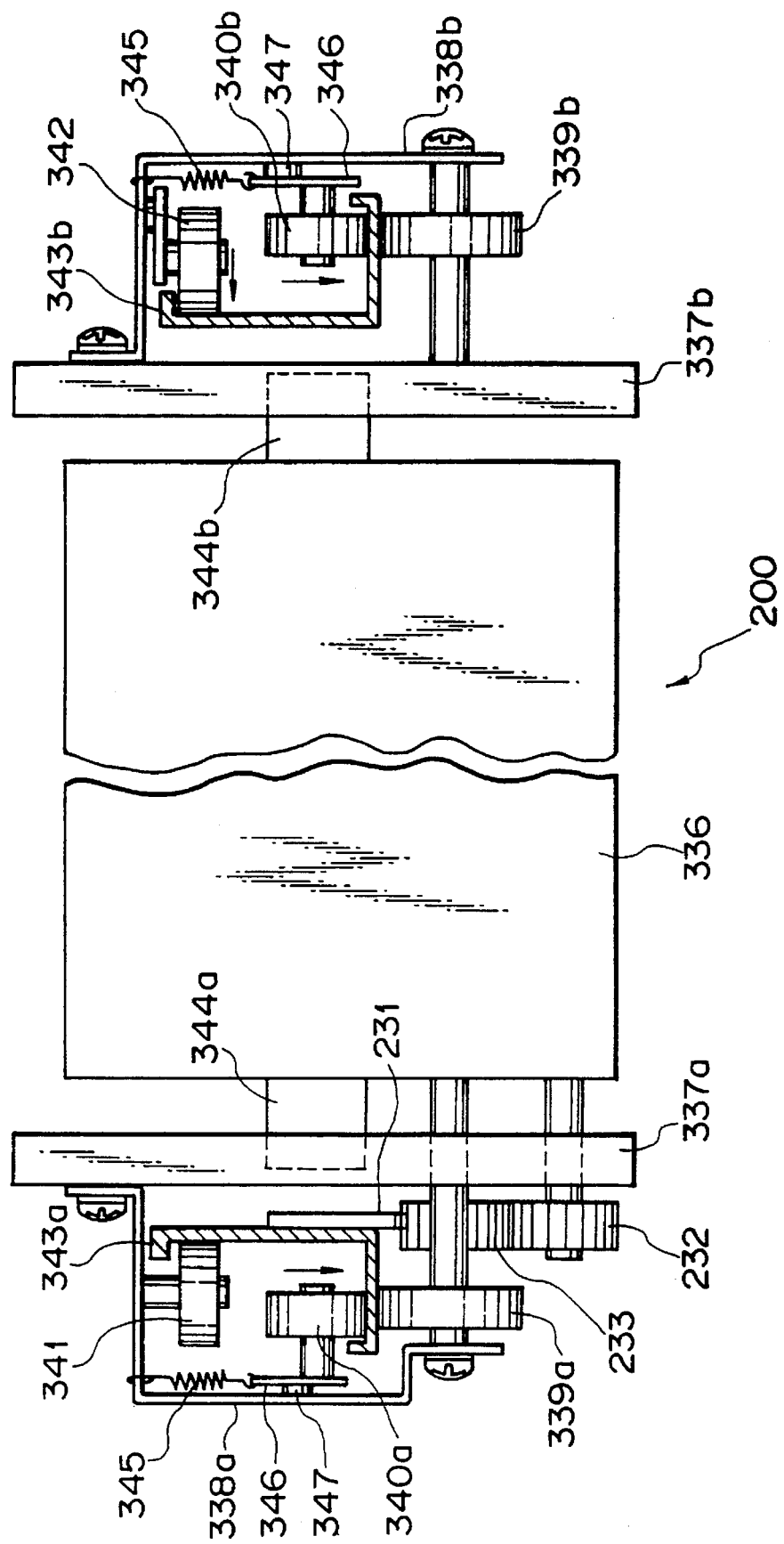
FIG. 78 is a side elevation showing a structure in which the scanner unit supports the scanning unit.

A rail arrangement for guiding the scanning unit 200 will be described hereinafter. As shown in FIG. 78, the scanning unit 200 includes an optics unit 336 accommodating the previously stated optics. The optics unit 336 is rotatably supported by a pair of side plates 337a and 337b, which are respectively positioned at the front and the rear of the scanner unit 30, via two front support rods 344a and one rear support rod 344b. In this configuration, the optics unit 336 follows only the front side plate 337a, but it does not follow the relative torsion of the side plates 337a and 337b.

Two parallel rails 343a and 343b are respectively affixed to the front and rear side plates 337a and 337b at the right and left ends thereof. The rails 343a and 343b each has a generally L-shaped cross-section. Roller brackets 228a and 338b are respectively affixed to the side plates 337a and 337b in such a manner as to surround the rails 343a and 343b. Rollers 339a and 340a are rotatably mounted on the inner periphery of the bracket 338a and hold a horizontal portion included in the rail 343a therebetween. Likewise, rollers 339b and 340b are mounted on the bracket 338b and hold a horizontal portion included in the rail 343b therebetween. The rollers 339a and 339b position the scanning unit 200 in the up-and-down direction during book reading and page turning. The side plates 337a and 337b are each provided with two such rollers 339a or 339b.

Figure 79:
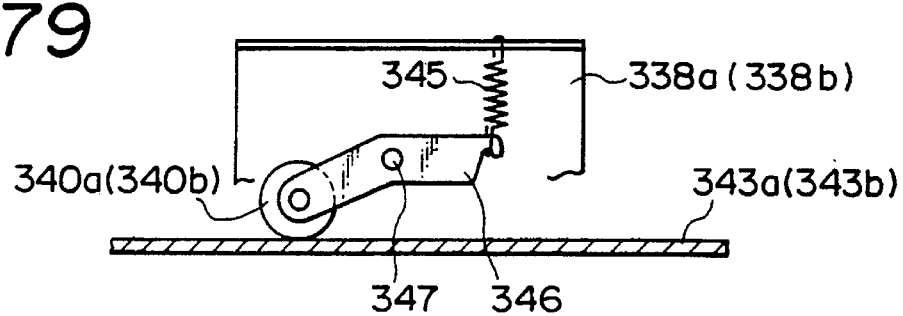
FIG. 79 is a side elevation showing a relation between rails and rollers included in a mechanism for supporting the scanning unit on the scanner unit.

The rollers 340a and 340b respectively press the horizontal portions of the rails 343a and 343b from above. Specifically, as shown in FIG. 79, the rollers 340a and 340b are each rotatably supported by the free end of a respective bracket 346 which resembles a bell crank in shape. The bracket 346 is rotatably supported by a stud 347 provided on the bracket 338a or 338b at the intermediate portion thereof. A tension spring 345 is anchored to the base end of the bracket 346 and the associated bracket 338a or 338b. Hence, the roller 340a or 340b is constantly biased to press the horizontal portion of the rail 343a or 343b frown above. The pressures exerted by the rollers 340a and 340b on the rails 343a and 343b, respectively, provide the scanning unit 200 with a tendency to move upward in the scanner unit 30. As a result, the rollers 339a and 339b respectively abut against the lower surfaces of the horizontal portions of the rails 343a and 343b, thereby positioning the scanning unit relative to the scanner unit 30. To position the scanning unit 200 in the depthwise direction, there are provided rollers 341 and 342. The roller 341 is rotatably mounted on the front bracket 338a. The roller 342 presses the rear bracket 338b inward with the same structure as the rollers 340a and 340b. The rollers 341 and 342 are so arranged as to press horizontal portions included in the rails 343a and 343b toward each other.

Figure 80:
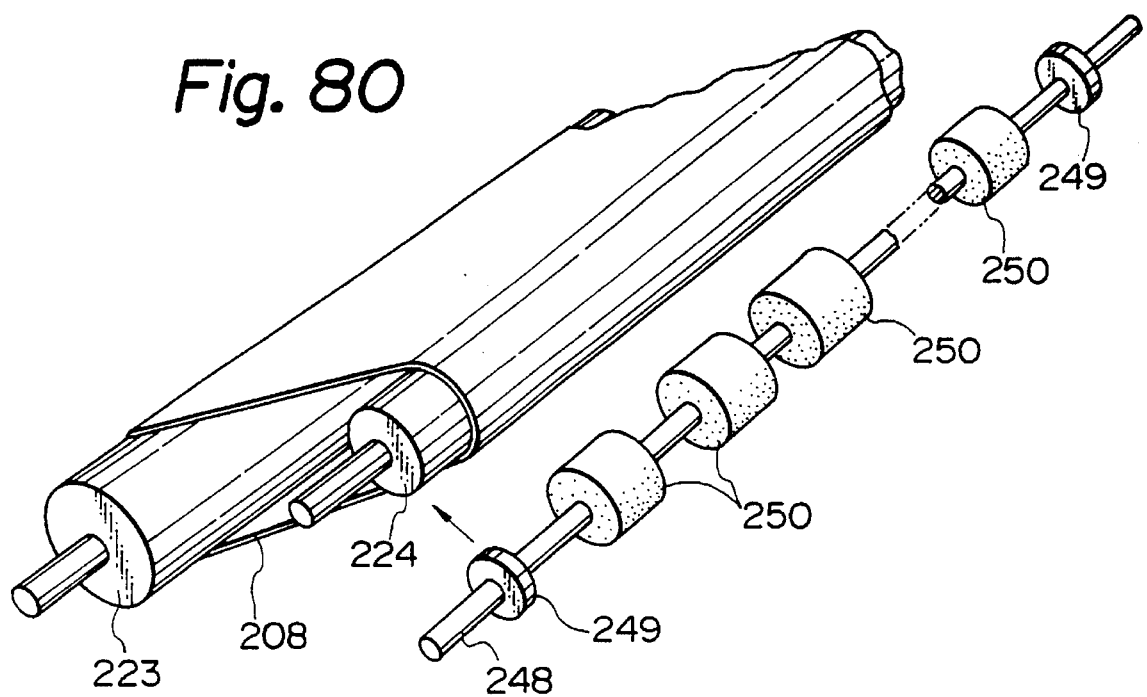
FIG. 80 is a perspective view showing a positional relation between the turn belt and a page feed roller disposed in the scanning unit.
Figure 81:
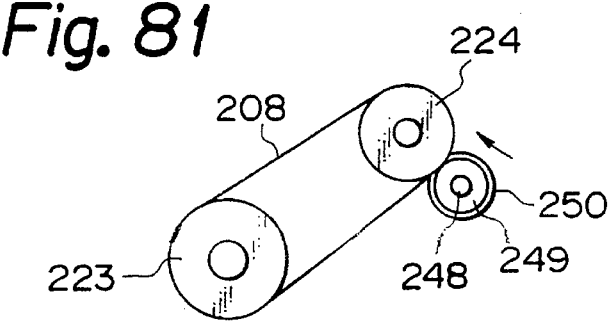
FIG. 81 is a side elevation showing the page feed roller contacting the turn belt.

The page feed roller 250 is constructed and arranged as will be described with reference to FIGS. 80–83. As shown in FIGS. 80 and 81, the roller 250 has a shaft 248 and a plurality of roller elements mounted on the shaft at predetermined intervals over the width of the turn belt 208. The roller elements 250 are made of foam polyurethane or similar soft resin, rubber, or similar elastic material. As shown in FIG. 80, the turn roller 224 has a greater width than the turn belt 208 and protrude from the belt 208 at opposite ends thereof. Drive rollers 249 are mounted on the shaft 248, and each has a diameter slightly smaller than the diameter of the roller elements 250. The drive rollers 249 respectively face the opposite ends of the turn roller 224 and are made of, for example, rubber harder than the roller elements 250.

The lower page guide 228, FIG. 70, has a comb-like edge thereof adjoining the page feed roller 250. When the page feed roller 250 is held at the retracted position (dashed line, FIG. 70), the roller elements thereof are respectively received in the recesses of the comb-like edge of the guide 228, i.e., the former is aligned with the latter when seen in a side elevation. When the turn belt 208 is elevated to the position indicated by a dashed line in FIG. 70, the roller 250 is also brought to the position indicated by a solid line. In this position, the drive rollers 249 mounted on the shaft 248 abut against opposite ends of the turn roller 224, so that a part of the periphery of the roller 250 is slightly pressed by the turn belt 208. As a result, as shown in FIG. 81, the roller elements of the roller 250 are deformed due to the difference between their diameter and the diameter of the drive rollers 249. In this condition, a force for conveying the leaf lifted by the turn belt 208 is applied to the roller elements 250. Also, the rotation of the turn roller 224 is transferred to the roller elements 250 via the drive rollers 249 which contact the roller 224. At this instant, while the drive rollers 249 rotate at the same peripheral speed as the turn roller 224, the roller elements 250 rotate at a higher peripheral speed than the roller 224 since their diameter is greater than the diameter of the drive rollers 249. Therefore, the linear velocity of the rollers 250 is equal to or higher than the linear velocity of the turn belt 208, insuring the conveyance of the leaf lifted by the belt 208.

On the other hand, when the leaf lifted by the turn belt 208 is to be released from the scanning unit 200, as shown in FIG. 76, the page feed roller 250 and turn belt 208 are retracted to their positions indicated by dashed lines in FIG. 70.

Figure 82:
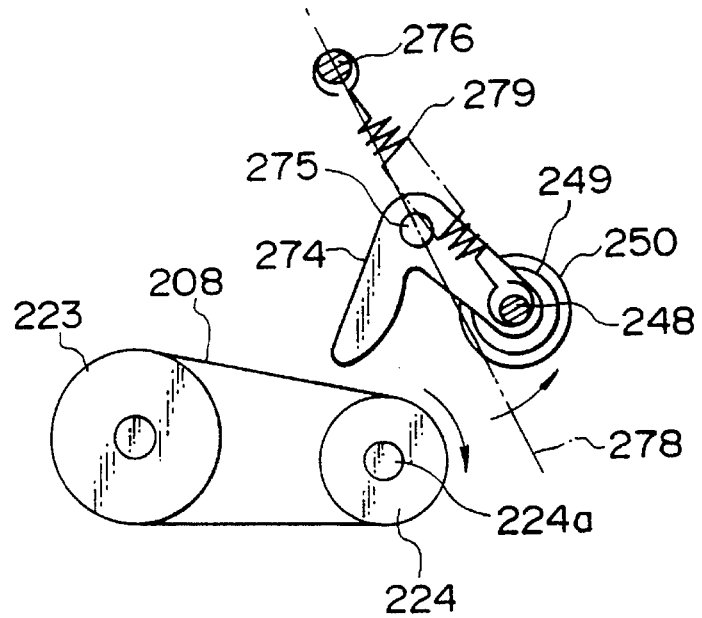
FIG. 82 is a side elevation showing the page feed roller retracted from the turn belt by a toggle joint device in association with the movement of the turn belt.
Figure 83:
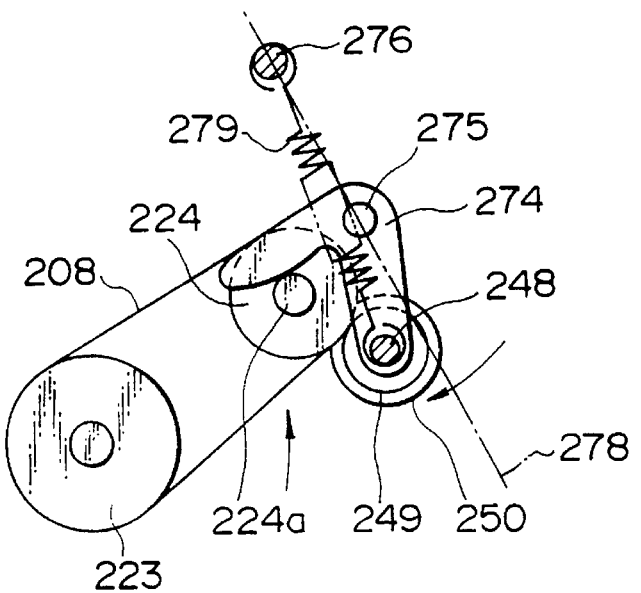
FIG. 83 is a side elevation showing the page feed roller brought into contact with the turn belt by the toggle joint.

FIGS. 82 and 83 show a toggle joint device for controlling the above-described motion of the leaf feed roller 250. As shown, the shaft 248 of the roller 250 is rotatably supported by one end of a toggle lever 274 which resembles a bell crank. The toggle lever 274 is journalled to the body of the scanning unit 200 via a fulcrum 275. A pin 276 is studded on the body of the scanning unit 200. A tension spring 279 is anchored to the pin 276 and shaft 248 at opposite ends thereof. This implements a toggle mechanism having an imaginary neutral line 278 extending through the pin 276 and fulcrum 275.

As shown in FIG. 82, the toggle mechanism usually maintains the turn belt 208 and page feed roller 250 in the dashed line positions, i.e., retracted positions shown in FIG. 70. As the turn roller 224 starts rising toward the dashed line position of FIG. 70, the shaft 224a of the turn roller 224 abuts against the other end of the toggle lever 274. As a result, the turn roller 224 further rises while rotating the toggle lever 274 about the fulcrum 275. Before the shaft 248 moves over the neutral line 278, the page feed roller 250 tends to return to the original position due to the action of the tension spring 279. However, once the shaft 248 moves away from the neutral line 278, the force of the spring 279 acts in such a direction that the page feed roller 250 abuts against the turn roller 224. As a result, when the turn roller 224 has fully risen to the dashed line position of FIG. 70, the drive rollers 249 abut against opposite ends of the turn roller 24 due to the action of the spring 279. In this condition, a part of the periphery of the page feed roller 250 is slightly pressed by the turn belt 208.

On the other hand, when the leaf lifted by the turn belt 208 is to be released from the scanning unit 200, as shown in FIG. 76, the turn roller 224 is lowered toward the dashed line position of FIG. 70 while urging the drive rollers 249 away from the position shown in FIG. 83. When the shaft 248 moves over the neutral line 278, the force of the spring 279 acts in such a direction that the paper feed roller 250 retracts to the dashed line position of FIG. 70. Consequently, the roller 250 is retracted to the position shown in FIG. 82, and the turn roller 224 is restored to the original position.

As stated above, the page feed roller 250 is interlocked with the turn belt 208 such that the former moves into contact with the latter due to the elevation of the latter. This reduces the cost and size of the mechanism for driving the page feed roller 250. Further, the roller 250 starts moving on the elapse of a predetermined period of time after the start of elevation of the belt 208 (during the latter half of the elevation of the belt 208). Hence, even when the edge of the leaf lifted by the belt 208 is protruded from the belt 208, it can be surely nipped by the belt 208 and roller 250. This provides the scanning unit 200 with an increased margin in respect of page turning operation.

In summary, it will be seen that the present invention provides a PTS capable of reading an image or turning the pages of a document stably. Since the TPS prevents the surface of a document from rising above the scanning surface of a scanning unit, the scanning unit has an improved scanning ability in the event of continuous scanning. The scanning unit is allowed to move surely and accurately relative to members supporting it and can, therefore, surely read a document. Furthermore, the scanning unit can follow the undulations of the surface of a book document accurately, while the resistance to the scanning movement is reduced. In addition, the PTS is small size and can read an image or turn the pages of a book stably.

Various modifications will become possible for those skilled in the art after receiving the teachings of the present disclosure without departing from the scope thereof.

What is claimed is:

1. A device for reading a book document and turning a page of said book document, comprising:

a document table for setting the book document in a spread position face up;

a scanning unit for reading an image from a surface of the book document;

means for turning a page of said book document; and means for restricting a movement of said scanning unit in an up-and-down direction with respect to an image-reading direction such that said scanning unit is not movable up-and-down and pressing said document table upward thereby to cause said scanning unit to receive the surface of the book document which is raised by said document table.

2. A device for reading a book document, comprising:

a document table made up of a right table and a left table for setting the book document in a spread position face up;

image reading means for reading a surface of the book document laid on said document table;

a scanning unit supporting said image reading means such that said image reading means scans the surface of the book document;

supporting means for supporting said scanning unit in such a manner as to prevent the movement of said scanning unit in a vertical direction and to allow said scanning unit to freely scan the surface of the book document;

biasing means for constantly biasing said right table and said left table upward independently thereby to press the surface of the book document against said scanning unit; and fixing means for selectively fixing, when said scanning unit is moved to read the surface of the book document, said right table or said left table, where image reading is not under way, in an up-and-down direction.

3. A device for reading a book document, comprising:

a document table for setting the book document in a spread position face up;

pressing means for pressing said document table upward;

a scanning unit disposed above said document table for scanning a surface of the book document, said scanning unit in contact with said surface of the book document;

image reading means disposed in said scanning unit for reading, when said scanning unit is moved, an image of the surface of the book document by illuminating said surface; and supporting means for supporting said scanning unit such that said scanning unit is freely movable relative to the surface of the book document;

said supporting means comprising:

rail members extending horizontally in parallel to said document table;

pressing members respectively positioned at opposite sides of said scanning unit to be movable up and down and rotatable, said pressing members respectively pressing upper surfaces of said rail members thereby to provide said scanning unit with a tendency to move upward; and positioning members rotatably positioned at opposite sides of said scanning unit and respectively contacting, due to the tendency of said scanning unit, lower surfaces of said rail members thereby to position said scanning unit in a raised position relative to said surface of the book document.

4. A device for reading a book document and turning pages of said book document, comprising:

document table means for setting the book document in a spread position face up; and a scanning unit for reading an image of the book document set on said document table, said document table means comprising a right table and a left table;

said device being selectively operable in a press mode for causing said right table and said left table to press the book document upward independently of each other, or in a fix mode for causing said right table and said left table to fix said book document in place without pressing said book document, wherein either of said press mode and said fix mode is set up depending on a scanning position of said scanning unit.

* * * * *